United States Patent [19]

Andersen et al.

[11] Patent Number: 5,662,731
[45] Date of Patent: Sep. 2, 1997

[54] COMPOSITIONS FOR MANUFACTURING FIBER-REINFORCED, STARCH-BOUND ARTICLES HAVING A FOAMED CELLULAR MATRIX

[75] Inventors: Per Just Andersen; Simon K. Hodson, both of Santa Barbara, Calif.

[73] Assignee: E. Khashoggi Industries, Santa Barbara, Calif.

[21] Appl. No.: 327,524

[22] Filed: Oct. 21, 1994

Related U.S. Application Data

[63] Continuation-in-part of Ser. No. 288,664, Aug. 9, 1994, and Ser. No. 288,667, Aug. 9, 1994, which is a continuation-in-part of Ser. No. 218,971, Mar. 25, 1994, Ser. No. 109,100, Aug. 18, 1993, abandoned, Ser. No. 95,662, Jul. 21, 1993, Pat. No. 5,385,764, and Ser. No. 982,383, Nov. 25, 1992, abandoned, each is a continuation-in-part of Ser. No. 929,898, Aug. 11, 1992, abandoned, said Ser. No. 288,664, is a continuation-in-part of Ser. No. 929,898.

[51] Int. Cl.[6] ............................ C04B 14/38; C08L 3/02
[52] U.S. Cl. .................... 106/206.1; 106/217.01; 106/400; 521/68; 521/84.1; 536/102; 536/107; 523/128
[58] Field of Search .................. 524/442, 445, 524/449, 493; 521/68, 84.1; 536/102, 107; 523/128; 106/206.1, 217.01, 400

[56] References Cited

U.S. PATENT DOCUMENTS

| | | |
|---|---|---|
| 2,432,971 | 12/1947 | Ruthman et al. . |
| 2,968,561 | 1/1961 | Bimkrant . |
| 3,042,578 | 7/1962 | Denning . |
| 3,052,595 | 9/1962 | Pye . |
| 3,117,014 | 1/1964 | Klug . |
| 3,493,382 | 2/1970 | Ryan et al. . |
| 3,759,729 | 9/1973 | Fahn . |
| 3,914,359 | 10/1975 | Bevan . |
| 3,949,145 | 4/1976 | Otey et al. . |
| 3,962,155 | 6/1976 | Usamoto et al. . |
| 3,968,004 | 7/1976 | Coffey et al. . |
| 4,017,324 | 4/1977 | Eggers . |
| 4,043,862 | 8/1977 | Roberts . |
| 4,044,166 | 8/1977 | Koizumi . |
| 4,070,196 | 1/1978 | Kraak et al. . |
| 4,076,547 | 2/1978 | Lester et al. . |
| 4,080,213 | 3/1978 | Mori et al. . |
| 4,089,691 | 5/1978 | Cummisford et al. . |
| 4,124,550 | 11/1978 | Kobayashi et al. . |
| 4,133,784 | 1/1979 | Otey et al. . |
| 4,149,550 | 4/1979 | Green et al. . |
| 4,172,154 | 10/1979 | von Rymon Lipinski . |
| 4,210,490 | 7/1980 | Taylor . |

(List continued on next page.)

FOREIGN PATENT DOCUMENTS

| | | |
|---|---|---|
| 0118240 B1 | 9/1984 | European Pat. Off. . |
| 0265745 A2 | 5/1988 | European Pat. Off. . |
| 0304401 B1 | 2/1989 | European Pat. Off. . |
| 0271853 B2 | 2/1989 | European Pat. Off. . |
| 0340707 A2 | 11/1989 | European Pat. Off. . |
| 0405146 B1 | 1/1990 | European Pat. Off. . |
| 0370913 B1 | 5/1990 | European Pat. Off. . |
| 0447797 A2 | 9/1991 | European Pat. Off. . |
| 0453980 A2 | 10/1991 | European Pat. Off. . |
| 0546956 A2 | 6/1993 | European Pat. Off. . |
| 0551954 A2 | 7/1993 | European Pat. Off. . |
| 0608031 A1 | 7/1994 | European Pat. Off. . |
| 0609983A2 | 8/1994 | European Pat. Off. . |

(List continued on next page.)

OTHER PUBLICATIONS

Bishop, *Cotton, Wool and Silk, Make Way For Soybeans,* Wall Street Journal (Jan. 14, 1993).
Clark, *The Incredible, Edible Plastic,* Ag Consultant (May 1993).
Howard, *Universities Make Plea For Cash, . . .* Register (Feb. 11, 1993).
Iowa State University, *Crop Utilization Research/Crop Products Pilot Plant,* Utilization Center for Agricultural Products, Ames, Iowa. (no date).
Lane, *SoyDiesel: Promising New Market For Soy Oil/Soybeans Come Callin' On Utensils,* Soybean Digest, vol. 54, No. 11 (Dec. 1994).
Lucht, *Product Research Aimed At Propping Up Crop Prices,* Iowa Farmer Today, NW Edition (Jan. 16, 1993).
McMurray, *For People Without Livestock, Growing Children Should Do Fine,* The Wall Street Journal (Mar. 31, 1993).
United Soybean Board, *New Uses For Soybeans/The Best Is Yet To Be.* (no date).
Zinkand, *New EcoPLA Plastic Stetches Corn Use,* Iowa Farmer Today, NW Edition (Apr. 2, 1994).

(List continued on next page.)

*Primary Examiner*—Marion E. McCamish
*Assistant Examiner*—Blaine Copenheaver
*Attorney, Agent, or Firm*—Workman, Nydegger & Seeley

[57] ABSTRACT

Compositions, methods, and systems for manufacturing articles, particularly containers and packaging materials, having a fiber-reinforced, starch-bound cellular matrix. Suitable mixtures used to form the articles are prepared by first preparing a viscous preblended mixture comprising water, a gelatinized starch-based binder, and fibers having an average length greater than about 2 mm. The highly viscous preblended mixture effectively transfers the shearing forces of the mixer to the fibers. The final moldable mixture is then prepared by mixing into the preblended mixture the remaining starch-based binder, water, and other desired admixtures, e.g., mold-releasing agents, inorganic filler rheology-modifying agents, plasticizers, coating materials, and dispersants, in the correct proportions to form an article which has the desired performance criteria. The moldable mixtures are heated between molds at an elevated temperature and pressure to produce form-stable articles having a desired shape and a selectively controlled foamed structural matrix. The articles may be manufactured to have properties substantially similar to articles presently made from conventional materials like paper, paperboard, polystyrene, plastic, or other organic-based materials and have especial utility in the mass-production of containers, particularly food and beverage containers.

31 Claims, 25 Drawing Sheets

U.S. PATENT DOCUMENTS

| | | |
|---|---|---|
| 4,225,247 | 9/1980 | Hodson. |
| 4,225,383 | 9/1980 | McReynolds. |
| 4,229,225 | 10/1980 | Kraszewski et al.. |
| 4,230,502 | 10/1980 | Lustig et al.. |
| 4,249,991 | 2/1981 | Baes et al.. |
| 4,303,690 | 12/1981 | Haas, Sr. et al.. |
| 4,306,059 | 12/1981 | Yokobayashi et al.. |
| 4,328,136 | 5/1982 | Blount. |
| 4,329,177 | 5/1982 | George. |
| 4,377,440 | 3/1983 | Gasland. |
| 4,378,271 | 3/1983 | Hargreaves et al.. |
| 4,394,930 | 7/1983 | Korpman. |
| 4,410,571 | 10/1983 | Korpman. |
| 4,438,685 | 3/1984 | Haas, Sr. et al.. |
| 4,445,970 | 5/1984 | Post et al.. |
| 4,454,268 | 6/1984 | Otey et al.. |
| 4,456,625 | 6/1984 | Durst. |
| 4,462,835 | 7/1984 | Car. |
| 4,482,386 | 11/1984 | Wittwer et al.. |
| 4,508,595 | 4/1985 | Gasland. |
| 4,511,585 | 4/1985 | Durst. |
| 4,529,653 | 7/1985 | Hargreaves et al.. |
| 4,529,662 | 7/1985 | Lancaster et al.. |
| 4,529,663 | 7/1985 | Lancaster et al.. |
| 4,543,370 | 9/1985 | Porter et al.. |
| 4,545,854 | 10/1985 | Gomez et al.. |
| 4,552,463 | 11/1985 | Hodson. |
| 4,588,443 | 5/1986 | Bache. |
| 4,595,623 | 6/1986 | Du Pont et al.. |
| 4,613,627 | 9/1986 | Sherman et al.. |
| 4,623,150 | 11/1986 | Moehlman et al.. |
| 4,648,314 | 3/1987 | Plight et al.. |
| 4,655,840 | 4/1987 | Wittwer et al.. |
| 4,673,438 | 6/1987 | Wittwer et al.. |
| 4,710,422 | 12/1987 | Fredenucci. |
| 4,711,669 | 12/1987 | Paul et al.. |
| 4,735,811 | 4/1988 | Skarra et al.. |
| 4,749,583 | 6/1988 | Branch. |
| 4,753,710 | 6/1988 | Langley et al.. |
| 4,755,494 | 7/1988 | Ruben. |
| 4,781,932 | 11/1988 | Skarra et al.. |
| 4,789,244 | 12/1988 | Dunton et al.. |
| 4,814,012 | 3/1989 | Paul et al.. |
| 4,833,191 | 5/1989 | Bushway et al.. |
| 4,863,655 | 9/1989 | Lacourse et al.. |
| 4,872,913 | 10/1989 | Dunton et al.. |
| 4,889,428 | 12/1989 | Hodson. |
| 4,912,069 | 3/1990 | Ruben. |
| 4,919,758 | 4/1990 | Wagle et al.. |
| 4,921,250 | 5/1990 | Ayres. |
| 4,923,665 | 5/1990 | Andersen et al.. |
| 4,925,530 | 5/1990 | Sinclair et al.. |
| 4,927,655 | 5/1990 | Ito. |
| 4,927,656 | 5/1990 | Ito. |
| 4,941,922 | 7/1990 | Snyder. |
| 4,944,595 | 7/1990 | Hodson. |
| 4,950,490 | 8/1990 | Ghiasi et al.. |
| 4,952,278 | 8/1990 | Gregory et al.. |
| 4,957,558 | 9/1990 | Ueda et al.. |
| 4,957,754 | 9/1990 | Munk et al.. |
| 4,963,603 | 10/1990 | Felegi, Jr. et al.. |
| 4,979,992 | 12/1990 | Bache. |
| 5,035,930 | 7/1991 | Lacourse et al.. |
| 5,039,003 | 8/1991 | Gordon et al.. |
| 5,039,378 | 8/1991 | Pommier et al.. |
| 5,043,196 | 8/1991 | Lacourse et al.. |
| 5,059,642 | 10/1991 | Jane et al.. |
| 5,061,346 | 10/1991 | Taggart et al.. |
| 5,071,512 | 12/1991 | Bixler et al.. |
| 5,076,985 | 12/1991 | Koch et al.. |
| 5,082,500 | 1/1992 | Nachtman et al.. |
| 5,095,054 | 3/1992 | Lay et al.. |
| 5,104,487 | 4/1992 | Taggart et al.. |
| 5,104,669 | 4/1992 | Wolke et al.. |
| 5,106,880 | 4/1992 | Miller et al.. |
| 5,108,677 | 4/1992 | Ayres. |
| 5,108,807 | 4/1992 | Tucker. |
| 5,110,413 | 5/1992 | Steer. |
| 5,122,231 | 6/1992 | Anderson. |
| 5,124,161 | 6/1992 | van Lengerich et al.. |
| 5,126,013 | 6/1992 | Wiker et al.. |
| 5,126,014 | 6/1992 | Chung. |
| 5,132,155 | 7/1992 | Singh et al.. |
| 5,134,179 | 7/1992 | Felegi, Jr. et al.. |
| 5,141,797 | 8/1992 | Wheeler. |
| 5,153,037 | 10/1992 | Altieri. |
| 5,156,718 | 10/1992 | Neubert. |
| 5,160,368 | 11/1992 | Begovich. |
| 5,160,676 | 11/1992 | Singh et al.. |
| 5,162,126 | 11/1992 | Thorner et al.. |
| 5,178,730 | 1/1993 | Bixler et al.. |
| 5,185,382 | 2/1993 | Neumann et al.. |
| 5,186,990 | 2/1993 | Starcevich. |
| 5,194,206 | 3/1993 | Koch et al.. |
| 5,206,087 | 4/1993 | Tokiwa et al.. |
| 5,208,267 | 5/1993 | Neumann et al.. |
| 5,209,776 | 5/1993 | Bass et al.. |
| 5,221,435 | 6/1993 | Smith, Jr.. |
| 5,224,595 | 7/1993 | Sugimoto et al.. |
| 5,234,978 | 8/1993 | Delrue et al.. |
| 5,240,561 | 8/1993 | Kaliski. |
| 5,248,702 | 9/1993 | Neumann et al.. |
| 5,252,271 | 10/1993 | Jeffs. |
| 5,256,711 | 10/1993 | Tokiwa et al.. |
| 5,258,430 | 11/1993 | Bastioli et al.. |
| 5,262,458 | 11/1993 | Bastioli et al.. |
| 5,264,030 | 11/1993 | Tanabe et al.. |
| 5,266,368 | 11/1993 | Miller. |
| 5,268,187 | 12/1993 | Quinlan. |
| 5,269,845 | 12/1993 | Grunau et al.. |
| 5,272,181 | 12/1993 | Boehmer et al.. |
| 5,273,821 | 12/1993 | Olson et al.. |
| 5,275,774 | 1/1994 | Bahr et al.. |
| 5,277,764 | 1/1994 | Johansson et al.. |
| 5,278,194 | 1/1994 | Tickner et al.. |
| 5,279,658 | 1/1994 | Aung. |
| 5,280,055 | 1/1994 | Tomka. |
| 5,284,672 | 2/1994 | Ito. |
| 5,288,318 | 2/1994 | Mayer et al.. |
| 5,288,765 | 2/1994 | Bastioli et al.. |
| 5,290,350 | 3/1994 | Besnard. |
| 5,296,180 | 3/1994 | Hayes et al.. |
| 5,296,526 | 3/1994 | Delrue et al.. |
| 5,298,273 | 3/1994 | Ito. |
| 5,300,333 | 4/1994 | Wilkerson et al.. |
| 5,308,879 | 5/1994 | Akamatu et al.. |
| 5,314,754 | 5/1994 | Knight. |
| 5,317,037 | 5/1994 | Golden et al.. |
| 5,317,119 | 5/1994 | Ayres. |
| 5,320,669 | 6/1994 | Lim et al.. |
| 5,324,351 | 6/1994 | Oshlack et al.. |
| 5,346,541 | 9/1994 | Goldman. |
| 5,352,709 | 10/1994 | Tarrant et al.. |
| 5,356,467 | 10/1994 | Oshlack et al.. |
| 5,360,473 | 11/1994 | Fleche et al.. |
| 5,360,586 | 11/1994 | Wyatt et al.. |
| 5,360,828 | 11/1994 | Morrison. |
| 5,360,844 | 11/1994 | Delrue et al.. |
| 5,362,776 | 11/1994 | Barenberg et al.. |
| 5,362,777 | 11/1994 | Tomka. |
| 5,367,067 | 11/1994 | Frische et al.. |
| 5,372,877 | 12/1994 | Kannankeril. |

| | | |
|---|---|---|
| 5,376,320 | 12/1994 | Tiefenbacher et al. . |
| 5,378,418 | 1/1995 | Berger et al. . |
| 5,382,285 | 1/1995 | Morrison . |
| 5,382,611 | 1/1995 | Stepto et al. . |
| 5,389,322 | 2/1995 | Kim et al. . |
| 5,393,333 | 2/1995 | Trouve . |
| 5,393,804 | 2/1995 | George et al. . |
| 5,395,438 | 3/1995 | Baig et al. . |
| 5,397,834 | 3/1995 | Jane et al. . |
| 5,405,437 | 4/1995 | Leake et al. . |
| 5,405,564 | 4/1995 | Stepto et al. . |
| 5,415,827 | 5/1995 | Tomka et al. . |
| 5,419,962 | 5/1995 | Robertson et al. . |
| 5,427,614 | 6/1995 | Wittwer et al. . |
| 5,428,150 | 6/1995 | DeBock et al. . |
| 5,432,000 | 7/1995 | Young, Sr. et al. . |
| 5,436,078 | 7/1995 | Buhler et al. . |
| 5,447,604 | 9/1995 | Johansson et al. . |
| 5,454,863 | 10/1995 | Foran et al. . |
| 5,456,933 | 10/1995 | Lee . |
| 5,462,980 | 10/1995 | Bastioli et al. . |
| 5,470,382 | 11/1995 | Andou . |
| 5,474,856 | 12/1995 | Tamagawa et al. . |
| 5,476,621 | 12/1995 | Kustner . |
| 5,480,923 | 1/1996 | Schmid et al. . |
| 5,487,813 | 1/1996 | Vinson et al. . |
| 5,494,509 | 2/1996 | Kruythoff et al. . |
| 5,496,440 | 3/1996 | Carre et al. . |
| 5,501,771 | 3/1996 | Bourson . |
| 5,501,774 | 3/1996 | Burke . |
| 5,512,090 | 4/1996 | Franke et al. . |
| 5,512,135 | 4/1996 | Carre et al. . |
| 5,512,378 | 4/1996 | Bastioli et al. . |
| 5,523,293 | 6/1996 | Jane et al. . |
| 5,525,281 | 6/1996 | Lorcks et al. . |
| 5,569,514 | 10/1996 | Ayres . |

FOREIGN PATENT DOCUMENTS

| | | |
|---|---|---|
| 1278195 | 10/1961 | France . |
| 2642731 | 8/1990 | France . |
| 3346970 A1 | 7/1985 | Germany . |
| 3346970 | 7/1985 | Germany . |
| 3420195 A1 | 12/1985 | Germany . |
| 4008862 C1 | 4/1991 | Germany . |
| 51-73143 | 6/1976 | Japan . |
| 60-35052 | 2/1985 | Japan . |
| 60-235624 | 11/1985 | Japan . |
| 5-320401 | 12/1993 | Japan . |
| 6-32386 | 2/1994 | Japan . |
| 4-185468 | 2/1994 | Japan . |
| 6-192577 | 7/1994 | Japan . |
| 9100590 | 11/1992 | Netherlands . |
| 2050459 | 1/1981 | United Kingdom . |
| 1584387 | 2/1981 | United Kingdom . |
| 2214516 | 6/1989 | United Kingdom . |
| 2208651 | 12/1989 | United Kingdom . |
| WO87/00828 | 2/1987 | WIPO . |
| WO89/02225 | 3/1989 | WIPO . |
| WO90/10671 | 9/1990 | WIPO . |
| WO91/12186 | 8/1991 | WIPO . |
| WO92/04408 | 3/1992 | WIPO . |
| WO93/01242 | 1/1993 | WIPO . |
| WO93/22048 | 11/1993 | WIPO . |
| WO94/03543 | 2/1994 | WIPO . |

OTHER PUBLICATIONS

*ISU Researcher Foams At New Breakthrough*, Times–Republican (Jul. 16, 1994).
*An Inventive End To A Daily Grind: Do In The Dishes.* (no date).
Andersen, *Control and Monitoring of Concrete Production—A Study of Particle Packing and Rheology*, The Danish Academy of Technical Sciences (1990).
Andersen, *Effect of Organic Superplasticizing Admixtures and Their components on Zeta Potential and Related Properties of Cement Materials*, Pennsylvania State University (1987).
Davidson et al, *Water–Soluble Resins*, New York: Reinhold Publishing Corp., Chapman & Hall, Ltd., London. (no date).
Fedors and Landel, *An Empirical Method of Estimating the Void Fraction in Mixtures of Uniform Particles of Different Size*, Powder Technology, 23, 225–231 (1979).
Furnas, *Grading Aggregates. I–Mathematical Relations for Beds of Broken Solids of Maximum Density*, Industrial and Engineering Chemistry (Sep. 1931).
Greminger, Jr. and Krumel, *Alkyl and Hydroxyalkylalkylcellulose*, Dow Chemical U.S.A., Midland, Oregon. (no date).
Johansen et al., *Particle Packing and Concrete Properties*, Materials Science of Concrete II, 111–147. (no date).
McGeary, *Mechanical Packing of Spherical Particles*, Journal of the American Ceramic Society, vol. 44, No. 10 (Oct. 1961).
Osbaeck and Johansen, *Particle Size Distribution and Rate of Strength Development*, Paper for the 89th Annual Meeting of the American Ceramic Society, Inc., Pittsburgh, PA (Apr. 26–30, 1987).
Patankar and Mandal, *The Packing of Some Non–Spherical Solid Particles*, Trans. J. Brit. Ceram. Soc., 79, 59–66 (1980).
Ridgway and Tarbuck, *Particulate Mixture Bulk Densities*, Chemical and Process Engineering (Feb. 1968).
Robinson, *Extrusion Defects*. (no date).
Stovall et al., *Linear Packing Density Model of Grain Mixtures*, Powder Technology, 48 1–12 (1986).
Swientek, *Formidable Films*, Prepared Foods (Sep. 1993).
Vrana, *Khashoggi Kin Reported Planning Private Placement of Shares in New Container Firm* (Mar. 28, 1993).
Weinrich, R., *German Comes Up With Recycled Product to Replace Foam Chips*. (no date).
Westman and Hugill, *The Packing of Particles* (1930).
Biomat 32—Production Unit for Natural Packaging, *Starch Foam Dishes at Burger King's*. (no date).
*Biotec Product Literature*. (no date).
*Plastic–Forming Processes*. (no date).
Sequa Chemicals, Inc., Technical Data, *Sunrez® 700 Series Insolubilizers Coating Additive*. (no date).
Staley Starch and Specialty Products Group, Technical Data, *Sta–Lok® 400 Cationic Potato Starch*. (no date).
*Thermoforming Process Guide*, Dow Plastics. (no date).
Zeneca, *Biopol, Nature's Plastic—Born from Nature. Back to Nature*. (no date).
*Zien In The Food Industry*, Freeman Industries, Inc. (no date).

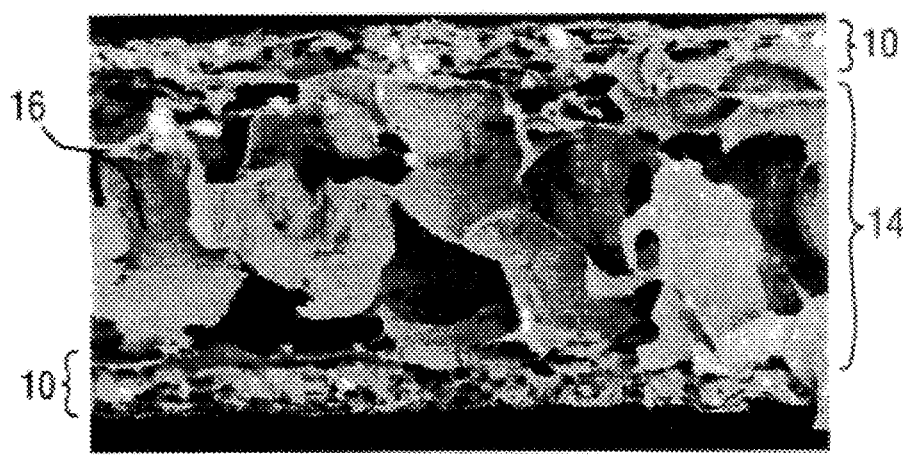
FIG. 2A
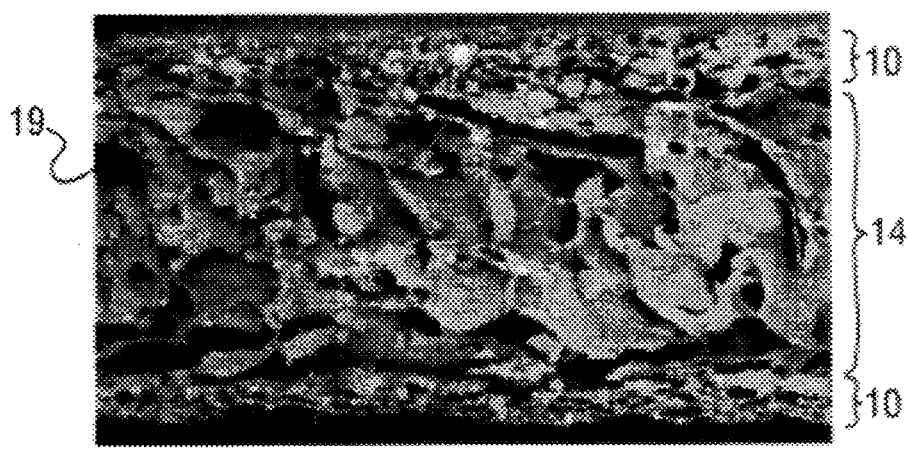
FIG. 2B
FIG. 2C

COMPOSITIONS FOR MANUFACTURING FIBER-REINFORCED, STARCH-BOUND ARTICLES HAVING A FOAMED CELLULAR MATRIX

This application is a continuation-in-part of U.S. Ser. No. 08/288,664, filed Aug. 9, 1994, now allowed, and a continuation-in-part of U.S. Ser. No. 08/288,667, filed Aug. 9, 1994, pending U.S. Ser. No. 08/288,667 is a continuation-in-part of U.S. Ser. No. 08/218,971, filed Mar. 25, 1994, pending, and a continuation-in-part of U.S. Ser. No. 08/109,100, filed Aug. 18, 1993, now abandoned, and a continuation-in-part of U.S. Ser. No. 08/095,662, filed Jul. 21, 1993, now U.S. Pat. No. 5,385,764, and a continuation-in-part of U.S. Ser. No. 07/982,383, filed Nov. 25, 1992, now abandoned, and a continuation-in-part of U.S. Ser. No. 07/929,898, filed Aug. 11, 1992, now abandoned. U.S. Ser. No. 08/288,664 is a continuation-in-part of U.S. Ser. No. 07/929,898, filed Aug. 11, 1992, now abandoned.

BACKGROUND OF THE INVENTION

1. Field of the Invention

The present invention relates to improved compositions and methods for manufacturing fiber-reinforced, starch-bound mires having a foamed cellular matrix. More particularly, the present invention relates to the use of a highly viscous, preblended mixture in order to improve the dispersion of long-length fibers (i.e., those having an average length greater than about 2 mm) into starch-based mixtures containing well-dispersed fibers from which environmentally superior containers and other articles or packaging materials can be economically mass-produced. The inclusion of long-length fibers reinforces the newly formed starch-bound matrix so that the articles may be demolded while maintaining enough water within the foamed matrix so that the articles remain sufficiently flexible and resilient for their intended use without the need for conventional conditioning procedures. In addition, the long-length fibers greatly improve the final strength and toughness of the starch-bound articles, which allows the manufacture of articles of reduced cross-section or higher strength to be made. The resultant articles have a cellular, optionally inorganically-filled, starch-bound matrix and can be produced less expensively and in a manner that is environmentally superior to articles manufactured from conventional materials such as paper, plastic, polystyrene foam, glass, or metal.

2. The Relevant Technology

A. Conventional Materials

Materials such as paper, paperboard, plastic, polystyrene, and even metals are presently used in enormous quantity in the manufacture of articles such as containers, separators, dividers, lids, tops, cans, and other packaging materials used to protect, store, package, dispense, or ship an enormous variety of liquid and solid goods. Containers and other packaging materials protect goods from environmental influences and distribution damage, particularly from gases, moisture, light, microorganisms, vermin, physical shock, crushing forces, vibration, leaking, or spilling. Packaging materials may also be imprinted with useful or promotional product information to the consumer, such as the origin of manufacture, contents, advertising, instructions, brand identification, and pricing.

Most conventionally manufactured containers or other packaging materials (including disposable containers) are made from paper, paperboard, plastic, polystyrene, glass, or metal materials. Each year, over 100 billion aluminum cans, billions of glass bottles, and thousands of tons of paper and plastic are used in storing and dispensing, e.g., soft drinks, juices, processed foods, cereals, grains, and beer. In addition, huge quantities of retail goods are sold or distributed using some sort of packaging material. In the United States alone, approximately 5.5 million tons of paper made primarily from tree-derived wood pulp are consumed each year solely in the production of packaging materials. This vast consumption represents only about 15% of the total annual domestic paper production.

Recently, consciousness-raising organizations have led a debate as to which of the conventional materials used to make such containers and other articles (e.g., paper, paperboard, plastic, polystyrene, glass, or metal) is most damaging to the environment or which is more environmentally "correct." The debate often misses the point that each of these materials has its own unique environmental weaknesses. One faction will frequently tout a particular material as being superior to another when viewed in light of a particular environmental problem, while unknowingly (or even knowingly) ignoring different, often larger, problems associated with the supposedly "environmentally friendly" material. In reality, the debate should not be directed to which of these materials is more or less harmful to the environment, but rather toward asking: Can we discover or develop an alternative material which will solve most, if not all, of the various environmental problems associated with each of these presently used materials?

B. Alternative Materials

Due to the more recent awareness of the tremendous environmental impact of using paper, paperboard, plastic, polystyrene, and metals for a variety of single-use, mainly disposable, articles such as containers and other packaging materials (not to mention the ever mounting political pressures), there has been an acute need (long since recognized by those skilled in the art) to find environmentally superior or improved substitute materials. One creative alternative has been to manufacture disposable food or beverage containers out of baked, edible sheets, e.g., waffles or pancakes. Although edible sheets can be made into trays, cones, and cups that are easily decomposed, they pose a number of limitations. Edible sheets are primarily made from a mixture of water, flour, and a rising agent, which is shaped and baked between heated molds. Fats or oils are often added to the mixture to assist in the removal of the sheet from the baking mold. However, oxidation of these fats can cause the edible sheets to go rancid. From a mechanical standpoint, edible sheets are generally too brittle and fragile to replace any but a few of the articles made from conventional materials. This inherent weakness generally requires the cross-section of the edible sheet to be substantially increased relative to a similar article made from conventional materials, thus negating much, if not all, of the environmental or economic benefits. Furthermore, if exposed to excessive moisture, the articles can easily grow mold or decompose prior to or during their intended use, thereby making such materials unsuitable for many of the applications for which substitution would be desirable.

Other attempts have been made to make articles from renewable organic materials such as starch. For example, articles have been made from a mixture of starch, water, and a mold-releasing agent. The starch-based mixture is baked between heated molds for a period of 3 minutes or more until the starch gelates, foams, and hardens by nearly complete drying of the molded starch-based mixture in the desired shape of the article. The resulting articles, however, were found to be cost prohibitive. The slow processing times, expensive equipment, and the relatively high cost of starch compared to conventional materials made the manufacture of starch-based articles far more expensive than articles made from conventional materials. Although inorganic fillers have been added to starch-based mixtures in an attempt to cut material cost, mixtures containing any significant portion of fillers have heretofore been unable to yield structurally sound articles having minimally required mechanical properties.

In general, such starch-based articles were found to be very fragile and brittle, particularly when initially demolded, giving them limited use. This occurred because of the need to drive off substantially all of the free water within the starch-based cellular matrix in order to avoid degradation or fracture due to expansion of the newly demolded article. The starch-based cellular matrix simply was too soft to be able to withstand the internal pressures generated by and persisting within the cells due to the vaporizing free water left within an undercooked article. On the other hand, baking the articles too long led to carmelization, fracturing due to shrinkage, and destruction of the binding capability of the starch material, thereby creating a narrow window of time in which the starch-based articles could be baked without yielding a highly defective article.

Moreover, to improve the flexibility and reduce the brittleness of the starch-bound articles, it was necessary to place the articles in a conditioning chamber for prolonged periods of time at elevated humidity and temperature in order for the starch matrix to absorb adequate levels of moisture. This "conditioning step" often took several minutes, or even hours depending on the processing conditions, which further retarded the already slow manufacturing process. Furthermore, the additional processing step of applying a coating to the article was usually required in order to maintain the critical level of moisture within the starch-based cellular matrix of the conditioned articles or make the articles water-resistant.

Like their edible sheet counterparts, such starch-based articles suffered from the inability to obtain the requisite materials properties of conventional materials without greatly increasing the thickness and mass of the articles manufactured therefrom (with thicknesses of at least 2 mm, and usually upwards of 5 mm, being required). Also, they were prone to spoilage if exposed to excessive moisture, thereby creating a criticality with respect to moisture: too little and the articles would be too brittle and fragile to be suitable for their intended use; too much and they would rot or spoil. Such organic-based articles usually had a poor surface quality due to poor venting, inadequate viscosity, and nonoptimized flow dynamics, which poor surface was often disguised by forming them with a waffled surface.

Industry has repeatedly sought to develop more highly inorganically filled materials capable of being mass-produced into a variety of disposable articles. Inorganic materials such as clay, natural minerals, and stone are easily accessed, non-depletable, inexpensive, and environmentally inert. In spite of economic and environmental pressures, extensive research, and the associated long-felt need, the technology simply has not existed for the economic and feasible production of highly inorganically filled materials which could be substituted for paper, paperboard, plastic, polystyrene, metal, or other organic-based articles.

Finally, in an attempt to strengthen the organic-based materials, such as the aforementioned foamed, starch-based articles, fibers have been added. Nevertheless, because of the difficulty of dispersing fibers, particularly longer-length fibers (i.e., those having an average length greater than about 1.5–2 mm), their addition has resulted in only small, perhaps insignificant, increases in the strength or toughness of the resulting foamed, starch-bound materials. In order to obtain adequate dispersion of fibers within organic binder solutions it has heretofore been necessary to subject the fibers to relatively harsh mixing conditions, such as using a beater as in the breakdown of wood pulp, and usually by including a relatively large quantity of water. However, even the addition of large quantities of water in starch-based materials (up to 80% in some cases) has not resulted in adequate dispersion of fibers having an average length greater than about 2 mm. Moreover, the inclusion of a large amount of water thought to be necessary to disperse the fibers greatly increases the production costs of the articles because of the tremendous amount of energy required to remove the excess water from the formed product.

In addition, in a highly foamed product, the use of fibers having an average length less than about 1.5 mm is ineffective because the internal pore diameter averages from 0.25 mm to 1.0 mm, giving an inadequate anchoring effect to such short fibers (i.e., where the fiber length is less than 3 times the pore diameter.)

In light of the foregoing, what are needed are novel compositions and methods for manufacturing novel materials that can replace paper, paperboard, metal, plastic, polystyrene, or other organic materials as the material of choice for producing containers and other articles.

It would be a further improvement in the art to provide compositions and methods for manufacturing organically-bound materials that can be formed into containers and other articles currently made from paper, paperboard, polystyrene, metal, plastic, or other organic materials.

It would be a tremendous improvement in the art to provide compositions and methods to improve the dispersion of fibers within the above organically-bound materials without the use of large quantities of water. It would yet be a significant improvement if such compositions and methods allowed for the dispersion of relatively long-length fibers (i.e., those having an average length greater than about 1.5–2 mm) within the organically-bound materials used to make containers or other articles.

It would also be an improvement in the art if the above organically-bound materials were to include a relatively large percentage of inorganic aggregate filler, particularly a filler which is compatible with and commonly found in the earth.

It would be a significant improvement in the art if such compositions and methods yielded highly inorganically filled, organically-bound articles that had properties similar, or even superior, to paper, paperboard, metal, polystyrene, plastic, or other organic materials.

It would yet be an improvement in the art if such compositions and methods provided for the manufacture of containers and other articles without the need for prolonged, high-humidity conditioning in order to obtain the required flexibility or toughness.

It would be an additional improvement in the art to provide compositions and methods that yielded starch-bound articles that did not require the application of a coating to maintain adequate moisture within the cellular matrix or to make the cellular matrix water resistant.

It would be an additional improvement in the art to provide compositions and methods for manufacturing highly inorganically filled, organically-bound materials into containers and other articles having a smoother, more uniform surface compared to existing organically-bound articles.

It would also be an improvement in the art if such articles could be formed using existing manufacturing equipment and techniques presently used to form such articles from paper, paperboard, metals, polystyrene, plastic, or other organic materials. It would further be an improvement if such compositions and methods did not result in the concomitant generation of wastes involved with the manufacture of articles from such materials.

It would be yet an advancement in the art if such compositions and methods required the use of less water that had to be removed during the manufacturing process (as compared to the manufacture of paper or other organically-based materials) in order to shorten the processing time and reduce the initial equipment capital investment.

From a practical point of view, it would be a significant improvement if such compositions and methods made possible the manufacture of containers and other articles at a cost that is comparable or even superior to existing methods of manufacturing containers or other articles from paper, paperboard, metal, plastic, polystyrene, or other organic materials. Specifically, it would be an advancement in the art if such materials resulted in a reduction in the consumption of energy, valuable natural resources, and initial start-up capital presently expended in making articles from conventional materials, such as paper, metals, polystyrene, plastic, or other organic materials.

It would further be a significant improvement in the art if such compositions and methods yielded containers and other articles having a similar cross-section and comparable mechanical properties of e.g., insulation, strength, toughness, etc. compared to paper, paperboard, polystyrene, plastic, or other organic materials.

From a manufacturing perspective, it would be a significant advancement in the art to provide compositions and methods that allowed for the mass-production of highly inorganically filled, organically-bound articles that could be rapidly formed and ready to use within a matter of minutes from the beginning of the manufacturing process.

It would also be a tremendous advancement in the art to provide compositions and methods that allowed for the production of highly inorganically filled, starch-bound materials having greater flexibility, flexural strength, toughness, moldability, mass-producibility, product stability, and lower environmental impact compared to conventionally manufactured starch-based materials.

Such compositions and methods, as well as articles made therefrom, are disclosed and claimed herein.

SUMMARY AND OBJECTS OF THE INVENTION

The present invention is directed to novel compositions and methods for manufacturing articles having a generally foamed, highly inorganically filled, fiber-reinforced, organically-bound structural matrix. Initially, a materials science and microstructural engineering approach is used to develop an appropriate particle packed, inorganically filled, moldable mixture having well-dispersed fibers. The components of the mixture and their amounts are selected based on an understanding of the interrelationships between processing parameters and the properties of the individual components, moldable mixture, and final article.

The moldable mixture generally includes a starch-based binder, an inorganic aggregate filler, well-dispersed fibers, a mold releasing agent, and water to disperse the components, gelate the starch, and act as an evaporative foaming agent. The present invention includes methods for molding such compositions into articles having a foamed structural matrix. The molding process generally includes forming the moldable composition between heated dies in order to gelate the starch-based binder and to cause the water-based solvent to evaporate, thereby creating a foamed, starch-bound cellular matrix.

It has been discovered that the long-length fibers dispersed throughout the moldable mixture and, hence, the final molded article serve at least two important functions. First, and perhaps most importantly, the fibers reinforce the newly foamed and gelated starch-bound matrix so that the molded article can be removed from the mold while retaining adequate moisture within the structure of the article to plasticize the starch-bound matrix. This allows the newly demolded article to have adequate toughness and strength immediately or shortly after being demolded for its intended purpose without the need for conventional conditioning, as was previously required in the manufacture of foamed starch-based articles. Without the conditioning step to reintroduce moisture back into the starch-based matrix, foamed starch-based articles, even those that include quantities of shorter-length fibers, were usually too brittle and fragile for their intended use. Moreover, such articles could not simply be demolded without such overdrying because of the destructive nature of the highly pressurized water vapor that otherwise would remain within the cellular structure of the newly demolded article. The convenient starch-based cellular matrix alone was simply not strong enough to withstand the internal buildup of pressure caused by the heated molding process.

Another important benefit of including longer-length fibers within the molded articles was the dramatic increase in fracture energy, tensile strength, flexural strength, toughness, flexibility, and other related properties to their nonfiber or short fiber-containing counterparts. Because of this, the materials of the present invention are able to have materials properties similar or even superior to conventional materials at about the same cross section or mass. This allows for the manufacture of thinner walled articles having properties superior to their much thicker-walled, starch-based counterparts, thereby greatly reducing the mass, cost, forming time, and environmental impact of the materials used to manufacture such articles. Moreover, the shortened molding times and the elimination of the previously required conditioning and coating step greatly reduces the manufacturing costs, both in terms of labor and energy.

A preferred moldable mixture is formed in two steps. The first step comprises mixing together the fibers and a portion of the starch-based binder and water, gelating the starch-based binder to form a highly viscous, "preblended" mixture, and dispersing the fibers within the preblended mixture using high shear mixing. The starch-based binder may be pre-gelated or gelated in situ by raising the temperature of the preblended mixture to the gelation temperature of the particular starch-based binder being used. In the second step, the remaining components are added to the preblended mixture, such as the remaining ungelated starch-based binder and water, the mold release agent, the inorganic component(s), plasticizers, internal coating agents, and any other desired admixtures.

It has been discovered that in sharp contrast to conventional practices in which large amounts of water are believed to be necessary in order to adequately disperse the fibers, thereby creating a generally low viscosity aqueous slurry, the present invention exploits the newly discovered ability of the high viscosity, preblended mixture to transfer shear from the mixer to the fibers. The inability of conventional practices to obtain adequate dispersion of fibers within water solvated systems, particularly fibers having an average length greater than about 1.5–2 mm, is primarily due to the inability of the generally low viscosity mixtures to transfer the shearing force or energy from the mixer to the fibers. Instead, the energy is dissipated within the churning aqueous solvent because of the tendency of the nonviscous water to yield or flow in the direction of the shearing force without transferring such energy to the fibers or fibrous clumps. Thus, adding progressively greater amounts of water generally will not substantially improve the ability of such mixtures to thoroughly disperse or blend the fibers throughout the aqueous slurry. Similarly, simply increasing the shear rate or shear energy of the mixing apparatus does not appreciably improve the ability to disperse fibers, particularly longer-length fibers. Moreover, the large amount of excess water must either be removed or the slurry continuously mixed in order to maintain adequate dispersion of the fibers within the aqueous suspension.

The present invention solves these problems by creating a preblended mixture having a high viscosity and yield stress which it has been discovered is far more effective in directly imparting the shearing forces of the mixture to the fibers. This is because the high viscosity and yield stress of the mixture does not allow for the water solvent to simply dissipate the shearing forces by the normal churning action of conventional aqueous slurries. The result is greatly increased dispersion of fibers, particularly longer-length fibers, compared to conventional methods. In addition, the highly viscous preblended mixture, as well as the preferred moldable mixtures discussed below, have sufficient viscosity to reliably maintain the fibers and other admixtures thoroughly and evenly dispersed throughout the mixture. The use of the preblended mixture makes possible the previously unattainable dispersion of fibers having an average length of at least about 2 mm, and allows for the dispersion of fibers having average fiber lengths of at least about 3.5 mm, 5 mm, or 10 mm, and even up to about 25 mm or longer in the case of very strong fibers able to withstand the increased shearing forces experienced by the longer fibers.

Once the fibers have been adequately dispersed throughout the preblended mixture, the moldable mixture is prepared by simply blending in the remaining components or admixtures. If the starch-based binder used in the preblended mixture was gelated by raising the temperature of the preblended mixture to at or above the gelation temperature, it will usually be preferable to first cool the mixture to below the gelation temperature before adding the remainder of the ungelated starch-based binder. Otherwise, the remaining starch-based binder will gelate prior to the molding procedure and generally produce inferior articles. It is generally preferable to maintain the majority of the starch-based binder in a nongelated state in order to keep the viscosity of the moldable mixture within the preferred ranges and maintain adequate flowability and moldability of the moldable mixture. The cool down procedure may simply be performed by adding each of the remaining components, such as the inorganic filler and the remaining water, before the remaining starch-based binder is added. Depending on what fraction of the water was added to the preblended mixture initially, it may be preferable in some cases to add very cold water or even ice when forming the moldable mixture, or it may even be necessary to separately cool the preblended mixture using any appropriate cooling means known in the art.

The mixing procedure used to form the final moldable mixture should have adequate shear to thoroughly blend the components within the moldable mixture, but not be so severe that the fibers and aggregates are damaged, or so that unwanted air pockets are entrained into the mixture. In addition to the components identified above, any admixture may be added in order to improve the moldability of the mixture, or in order to impart the desired mechanical properties to the molded article. For example, co-solvents, such as water soluble, volatile alcohols may be added to aid in the removal of the water from the mixture during the molding process. The only limitation to the types of admixtures that may be added is that they should preferably not unduly interfere with the gelation process of the starch-based binder during the heated molding process. Otherwise, a molded article in which the starch-based binder has been inadequately gelated during the molding process will generally have inferior mechanical properties and will be harder to demolded without damaging the article. If the starch-based binder has been properly gelated, the molded article will be form stable immediately after being demolded. The inclusion of well-dispersed fibers, particularly longer-length fibers having an average length greater than about 2 mm, aids in the ability to obtain a demolded article having sufficient form stability and resistance to internal pressure caused by the small amounts of water remaining within the cellular matrix of the newly demolded article. This in turn yields a newly demolded article that has sufficient toughness and strength so that it may be handled immediately or shortly after being demolded without cracking or failing.

Other mechanical properties that can be designed into the molded article by changing the mix design and/or molding parameters include thickness, density, modulus of elasticity, compressive strength, tensile strength, flexural strength, flexibility, range of strain, insulating ability, and specific heat. Because of the ability to adjust these properties as needed, a wide variety of articles can be made, including cups, trays, cartons, boxes, bottles, crates, spacers, and numerous other articles used for, e.g., packaging, storing, shipping, serving, portioning, and dispensing almost any imaginable good, including food or beverages.

The materials of the present invention may include a variety of environmentally safe components, including a starch-based binder, water, inorganic aggregates, fibers, pectins, inert organic aggregates, mold-releasing agents, rheology-modifying agents, cross-linkers, dispersants, plasticizers, and coatings. In order to reduce the cost and also to improve the environmental compatibility of the articles, the moldable mixtures are designed with the primary considerations of maximizing the concentration of the inorganic component, optimizing the starch, fiber, and solvent components by only including as much of these as is necessary to obtained the desired properties from each, and selectively modifying the viscosity and yield stress of the moldable mixture to produce articles quickly, inexpensively, and having the desired properties for their intended use.

The starch-based binder acts as the binding agent and typically includes any starch such as potato starch, corn starch, waxy corn starch, rice starch, wheat starch, their grain predecessors, e.g., flour and cracked grains, or their modified counterparts. Unmodified starches are generally preferred because they will only gelate when the moldable mixture has been raised to elevated temperatures during the molding process, thereby providing a means for controlling timing, rate, and extent of gelation. In addition, they are usually far less expensive than modified starches. In some cases, unmodified starches such as potato starch and corn starch, the very starches preferred in the present invention, are waste products and are used as cattle feed or irrigation supplements. The substitution of naturally produced, but generally overabundant and low-valued unmodified starches, on the one hand, for the petroleum-based or synthetically produced plastics, polystyrene, and other polymers used in the manufacture of conventional materials, on the other, further illustrates the tremendously positive environmental impact of the fiber-reinforced, inorganically-filled, starch-bound materials of the present invention.

A solvent, typically water, or a combination of water and a co-solvent such as alcohol, is used to disperse the components within the mixture, control the viscosity and yield stress of the moldable mixture, and act as an agent for gelating the starch-based binder. In addition, other admixtures, such as the starch-based binder, fibers, inorganic filler component, rheology-modifying agents, plasticizers, and dispersants, help to create a mixture having the desired rheological, or flow, properties.

The starch-based binder is preferably added in its ungelated, granular form, although it may be pregelated, at least in part, in the preparation of either the preblended mixture or the final moldable mixture. As the starch-based binder is heated, the granules rupture, thereby allowing the long, single chain, amylose polymers located within the granules to stretch out and intertwine with other starch polymers, such as the highly branched amylopectin polymers. This process is referred to as gelation. Once the solvent is removed, the resulting interconnected mesh of starch polymers produces a solid material. However, the relatively high cost of the starch-based binder, the excess time and energy necessary to remove the solvent to make a form-stable article of sufficient strength and toughness, and the time required to the condition the demolded article using high humidity make it impractical to manufacture articles solely out of starch.

To decrease the cost and also to impart desirable properties to the final article, inorganic fillers or aggregates are added to the mixture in an amount up to 90% by weight of the total solids in the mixture. While this range applies to most aggregates of relatively high density (greater than about 1 $g/cm^3$), in the case of lower density, or "lightweight", aggregates (having a density less than about 1 $g/cm^3$), such as expanded perlite or hollow glass spheres, the weight proportion may be less and is dependent upon the density of the particular aggregate in question. As a result, it is more appropriate to express the concentration of lightweight aggregates in terms of volume percent, which will preferably be included in a broad range from about 5% to about 80% by volume.

To obtain mixtures having a high concentration of inorganics, the inorganic aggregate particles are selected to have a shape and particle size distribution that preferably produces a high packing density. This process is referred to as particle packing. It is further preferred that the particles have a relatively low specific surface area. Using fillers with a high packing density and low specific surface area minimizes the amount of starch-based binder and solvent needed in the mixture. By minimizing the starch-based binder and solvent, the material costs and processing time to produce the article are minimized. Furthermore, the selection of aggregates having specific mechanical and physical properties can be used to impart these properties to the final articles. For example, the aggregate can help control the specific heat, density, strength, and texture of the final article. One preferred inorganic aggregate is calcium carbonate.

The addition of fibers improves the fracture energy and toughness of the article and improves the form stability and flexibility of the newly demolded article. One preferred fibrous material is softwood fibers. Longer-length fibers are preferred over shorter-length fibers for at least two reasons. First, longer-length fibers are better able to bridge or span the length of the voids or pores within the foamed starch-bound matrix thus being well-anchored in the matrix and able to have a significant reinforcing effect. Second, longer-length fibers have a smaller specific surface area and, hence, are less likely to interfere with the water-induced gelation process of the starch-based binder. Fibers may economically be included in amounts from about 2% to about 40%.

Rheology-modifying agents, such as cellulose-based, polysaccharide-based, protein-based, and synthetic organic materials can be optionally added to control the viscosity and yield stress of the mixture. However, in larger mounts they can compete with and tend to impede the gelation process of the starch-based binder. In fact, the use of rheology-modifying agents or thickeners known in the art other than gelated starch generally cannot be used to attain the high viscosity and yield stress necessary to disperse most longer-length fibers without adding them in significantly large amounts. However, the drawback of adding these large amounts of a thickening agent other than gelated starch is at least two-fold. First, such thickening agents are generally far more expensive than gelated, unmodified starches. Second, they will compete with the gelation reaction of the starch-based binder with water and at some point prevent the gelation reaction from occurring altogether, thereby preventing the starch-based binder from being the primary binding agent and undermining the purpose for which the starch-based binder was included. By gelating at least a portion of the starch-based binder during preparation of the preblended mixture, as well as by increasing the concentration of inorganic filler or decreasing the amount of water in the final moldable mixture, the need to add a theology-modifying agent to obtain a mixture having the desired viscosity and yield stress can be greatly reduced or eliminated.

In any event, the prior art only teaches the use of thickening agents in order to improve the colloidal stability of the mixtures and thereby retain the inorganic fillers and generally shorter-length fibers in suspension within the mixture to be molded. Their use in dispersing longer-length fibers, even if possible, was not known. Therefore, to the extent that one of ordinary skill in the art were to use a thickening agent as an aid in dispersing fibers, particularly longer-length fibers, it would certainly fall within the purview of the present invention.

In general, increasing the viscosity helps to prevent settling or separation of the solid components within the moldable mixture and aids in the formation of the foamed structural matrix. As a general rule, mixtures that have a high viscosity produce relatively dense articles having small cells or pores in the structural matrix. In contrast, mixtures with a low viscosity produce lighter articles with larger cells or pores within the structural matrix. The formation of the foamed structural matrix is also dependent on variables such as the solvent content and the pressure and temperature applied to the mixture. The rheology-modifying agent may act as a binder to some extent and can help increase the strength of the article.

Depending on the amount and average length of fibers that are used in the moldable mixture, it is possible for the newly demolded article to be somewhat brittle, particularly where fewer fibers or those of shorter fiber length are employed. Plasticizers, humectants, porous aggregates impregnated with plasticizers or humectants, and the aforementioned fibers may be added to the mixture to increase the flexibility of the articles. Plasticizers include materials that can be absorbed by the starch-based binder to soften the structural matrix, which have a sufficiently high vapor point so that they are not vaporized and removed from the matrix during the molding process, and which preferably remain stable after the article is formed. In addition to water, two preferred plasticizers include glycerin and polyethylene glycol. Humectants, such as $MgCl_2$ and $CaCl_2$, can absorb moisture and tightly bind it within the starch-bound structural matrix even after the molding process. This moisture tends to improve the flexibility and resilience of the finished article. Porous aggregates and fibers can retain the water or other plasticizing agents during the forming process and then disperse them into the matrix of the form-stable article to increase the flexibility of the article. Of course, flexibility may also be imparted to the hardened article through the use of optional high humidity conditioning.

Hydraulically settable binders such as calcium sulfate hemihydrate ($CaSO_4 \cdot \frac{1}{2}H_2O$), may be used as a water absorption agent within the mixtures of the present invention because it reacts with water to form calcium sulfate dihydrate ($CaSO_4 \cdot 2H_2O$). Water absorbing components may be used to more quickly increase the viscosity and form stability of the molded article, especially where larger amounts of water are included initially.

Other components, such as medium- or long-chain fatty acids, their salts, and their acid derivatives may be added to improve the release of the hardened article from the mold. Molds having a polished metal surface, or other non-stick surface, are also useful in improving or facilitating the release of the article. Cross-linking agents may be added to improve the strength and stability of the molded articles. Internal coating agents may be added which migrate to the surface of the starch-bound matrix as water is being removed therefrom to form a coating at or concentrated near the surface of the molded article.

Initially, the selected components are blended into a uniform, moldable mixture. The mixing can be carried out using a high energy mixer or an auger extruder, depending on the viscosity of the mixture. It is often preferred to apply a partial vacuum to the mixture to remove unwanted air voids, which can create defects in the final product.

In a preferred embodiment, the moldable mixture is positioned within a heated mold cavity. The heated mold cavity may comprise many different embodiments, including molds typically used in conventional injection molding and die-press molding processes. In one preferred embodiment, for example, the moldable mixture is placed inside a heated female mold. Thereafter, a heated male mold is complementarily mated with the heated female mold, thereby positioning the mixture between the molds. As the mixture is heated, the starch-based binder gelates, increasing the viscosity of the mixture. Simultaneously, the mixture increases in volume within the heated molds cavity as a result of the formation of vapor bubbles from the evaporating solvent, which are initially trapped within the viscous mixture.

Various types of heated molding apparatus known in the art can be used to mass produce the containers and other articles contemplated by the present invention, including those used in wafer baking. Furthermore, conventional expanded polystyrene machines can be modified to produce the inventive articles.

As will be discussed later in greater detail, by selectively controlling the thermodynamic parameters applied to the mixture (e.g., pressure, temperature, and time), as well as the viscosity and solvent content, the mixture can be formed into a form-stable article having a selectively designed foamed structural matrix. That is, the size, quantity, and positioning of the pores can be selectively designed to produce articles having desired properties for their intended use. Furthermore, the surface texture and configuration of the pores within the foamed structural matrix can be controlled by selectively varying the temperature between the molds and the temperature along the length of the molds. Besides controlling the properties among different molded articles, the properties of a single article can be made to vary throughout the article, including varying thickness, varying skin thickness, varying cell structure, and varying density. This may be accomplished, for example, by creating within the molding apparatus differential relative temperatures, or differential temperature zones, throughout the molding apparatus. As a result, different temperature and processing conditions are imparted to varying locations throughout the same article.

In a preferred embodiment, the articles are formed from the previously discussed fiber-containing mixtures to impart the desired flexibility to the hardened articles without the need for conditioning in high humidity. Residual water, usually about 2–6%, more preferably 3–4% is retained within the starch-bound matrix even after the molded article has achieved adequate form stability and resistance to internal pressure so that it can be demolded without significant deformation of the desired structure of the article. It is believed that some of the water retained by the fibers may migrate from the fibers to the hardened starch-bound matrix over time, thereby further softening the structural matrix of the article. In addition, further flexibility of the molded articles may be obtained through conventional conditioning in a high humidity chamber, where the articles are exposed to elevated humidity and temperature over time. However, this procedure is generally unnecessary and cost-ineffective.

Once the article has been demolded, a coating may be applied in order to seal and provide a more finished surface to the article, as well as providing additional strength. The coating can be applied through various conventional processes such as spraying, dipping, sputtering, and painting. In an alternative embodiment, so-called "internal coating materials" may be added to the mixture prior to the formation of the article. If an internal coating material is used that has a similar melting point as the peak temperature of the mixture during the molding process, the individual particles of the internal coating agent will tend to migrate to the surface of the article during the heated molding process by the outward flow of the vaporizing water. Upon reaching the surface of the molded article they are exposed to elevated temperatures which cause the internal coating particles to melt and coalesce together and then congeal or solidify at or near the surface of the article upon demolding and cooling of the article. Such internal coating materials may include any material having a melting point that is generally above the boiling point of superheated water within the molded article and at or below that maximum temperature of the surface of the article while it is being molded. They may include, for example, selected waxes, stearates, shellac, polylactic acid, or any other plastic or polymeric material having the stated melting criteria. In addition, nonmigrating materials, such as latexes or polyvinyl alcohol, can be used to create a general water resistance throughout the cellular matrix.

The resulting articles can be designed to have properties similar or even superior to articles made from conventional materials, such as paper, paperboard, polystyrene, metals, plastic, or other natural organic materials. In light of the minimal cost of inorganic fillers and the relatively low cost of unmodified starches and flours, the inventive articles can also be made at a fraction of the cost of conventional articles. Finally, the inventive articles are more environmentally friendly than conventional articles. For example, the manufacturing process employs no harmful chemicals, emits no harmful emissions into the air or water, depletes no non-renewable resources as a starting raw material for the moldable mixtures, and requires only minimal processing energy. Furthermore, the inventive articles generally have low mass, are easily recycled, or quickly decompose back into the environment.

From the foregoing, an object of the present invention is to provide novel compositions and methods for manufacturing novel materials that can replace paper, paperboard, metal, plastic, polystyrene, or other organic materials as the material of choice for producing containers and other articles.

Another object and feature of the present invention is to provide compositions and methods for manufacturing organically-bound materials that can be formed into containers and other articles currently made from paper, paperboard, polystyrene, metal, plastic, or other organic materials.

Another object and feature of the invention is to provide compositions and methods to improve the dispersion of fibers within such organically-bound materials without the use of large quantities of water. Yet another object and feature is that such compositions and methods allow for the dispersion of relatively long-length fibers (i.e., those having an average length greater than about 1.5–2 mm) within the organically-bound materials used to make containers or other articles.

Yet another object of the present invention is to provide compositions and methods for manufacturing organically-bound materials that include a relatively large percentage of inorganic aggregate filler, particularly a filler which is compatible with and commonly found in the earth.

A further object of the present invention is to provide compositions and methods that yield highly inorganically filled, organically-bound articles that had properties similar, or even superior, to paper, paperboard, metal, polystyrene, plastic, or other organic materials.

Another object and feature of the present invention is to provide compositions and methods that allow for the manufacture of containers and other articles without the need for prolonged, high-humidity conditioning in order to obtain the required flexibility or toughness.

A further object is to provide compositions and methods which yield starch-based articles which do not require the application of a coating to maintain adequate moisture within the cellular matrix or to make the cellular matrix water resistant.

An additional object of the present invention is to provide compositions and methods for manufacturing highly inorganically filled, organically-bound materials into containers and other articles having a smoother, more uniform surface compared to existing organically-bound articles.

Still a further object and feature of the present invention is to provide compositions and methods for manufacturing articles using existing manufacturing equipment and techniques presently used to form such articles from paper, paperboard, metals, plastic, polystyrene, plastic, or other organic materials. Another object is that such compositions and methods do not result in the concomitant generation of wastes involved with the manufacture of articles from such materials.

A further object of the present invention is to provide compositions and methods that require the use of less water that has to be removed during the manufacturing process (as compared to the manufacture of paper or other organically-based materials) in order to shorten the processing time and reduce the initial equipment capital investment.

Another object of the present invention is to provide compositions and methods that make possible the manufacture of containers and other articles at a cost that is comparable or even superior to existing methods of manufacturing containers or other articles from paper, paperboard, metal, plastic, polystyrene, or other organic materials. Specifically, an important object and feature is that such compositions and methods result in a reduction in the consumption of energy, valuable natural resources, and initial start-up capital/presently expended in making articles from conventional materials, such as paper, metals, polystyrene, plastic, or other organic materials.

Yet another object is that such compositions and methods yield articles having a similar cross-section and comparable mechanical properties of e.g., insulation, strength, toughness, etc. compared to paper, paperboard, polystyrene, plastic, or other organic materials.

An additional object and feature of the present invention is to provide compositions and methods that allow for the mass-production of highly inorganically filled, organically-bound articles that can be rapidly formed and ready to use within a matter of minutes from the beginning of the manufacturing process.

Finally, a further object and feature of the present invention is to provide compositions and methods that allow for the production of highly inorganically filled, starch-based materials having greater flexibility, flexural strength, toughness, moldability, mass-producibility, product stability, and lower environmental impact compared to conventionally manufactured starch-based materials.

These and other objects and features of the present invention will become more fully apparent from the following description and appended claims, or may be learned by the practice of the invention.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which:

FIG. 2A is a microscopic picture of the cross-section of an article having a relatively thin outer skin and an interior section containing relatively large cells or pores;

FIG. 2B is a microscopic picture of the cross-section of an article having a relatively thin outer skin and an interior section containing relatively medium cells or pores;

FIG. 2C is a microscopic picture of the cross-section of an article having a relatively thick outer skin and an interior section containing relatively large cells or pores, with longer-length fibers randomly dispersed throughout the entire cellular matrix;

DETAILED DESCRIPTION OF THE PREFERRED EMBODIMENTS

I. INTRODUCTION

Figure 1:
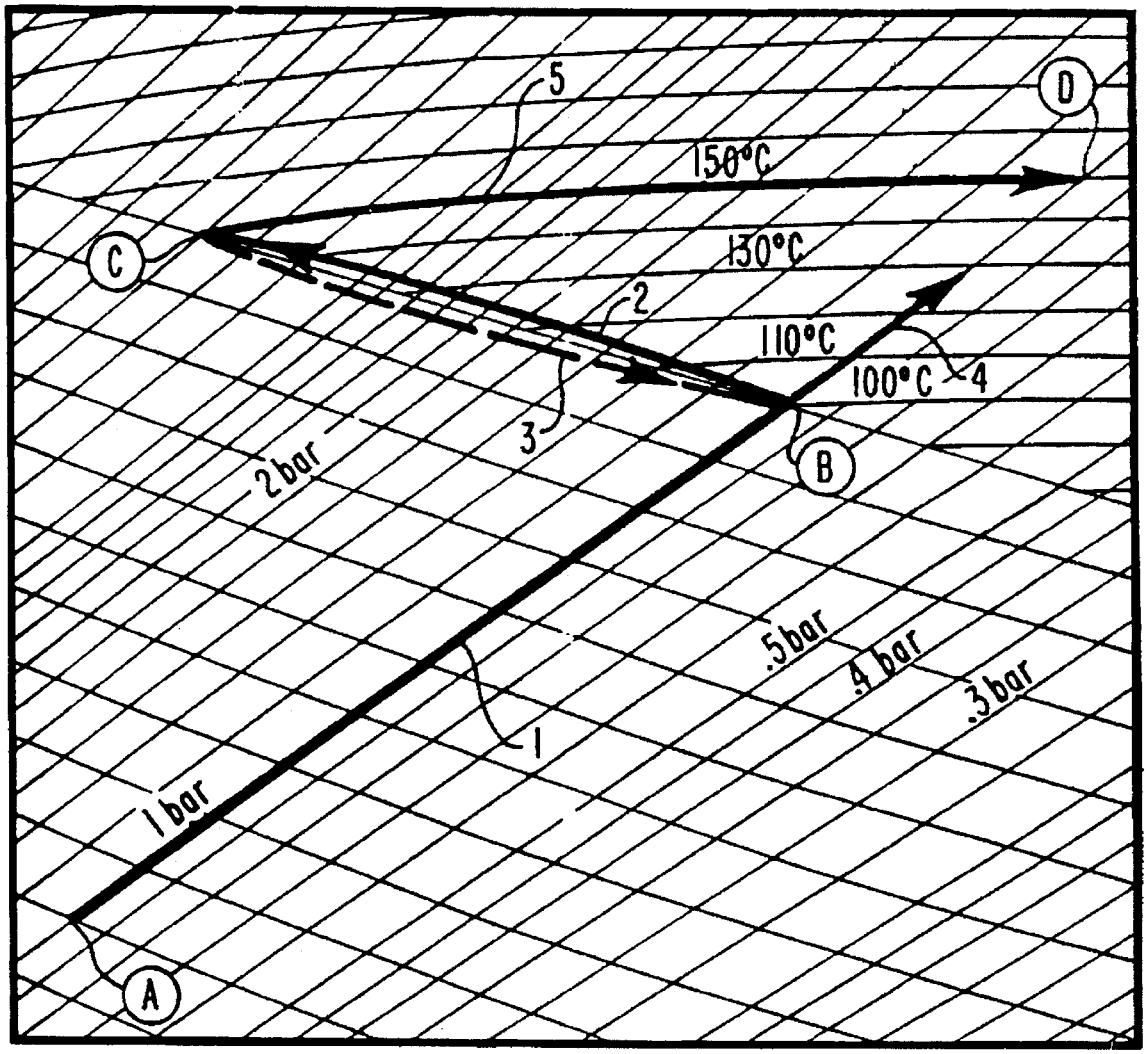
FIG. 1 is a phase diagram showing the temperature and pressure conditions that the mixture is subject to in one embodiment of the invention during formation of the articles.

The present invention is directed to novel compositions and methods for manufacturing articles having a generally foamed, highly inorganically filled, fiber-reinforced, organically-bound structural matrix. The inventive materials include a variety of environmentally safe components, including a starch-based binder, water, inorganic aggregates, and fibers, as well as optional admixtures such as mold-releasing agents, rheology-modifying agents, cross-linkers, plasticizers, humectants, dispersants, organic aggregates, and coating materials.

A materials science and microstructural engineering approach is used to select the type, size, shape, and proportion of each component that, when blended together, will result in a moldable mixture and subsequent final product having the desired properties at an optimal cost. The desired properties are dependent on the required handling and the intended use of the finished article. The optimal cost is obtained by selecting components that will maximize production output while minimizing material and production costs. By using a microstructural engineering approach, the compositions and methods of the present invention yield a variety of articles, including plates, cups, cartons, and other types of containers and articles having mechanical properties substantially similar or even superior to articles manufactured using conventional materials, such as paper, polystyrene foam, plastic, metal and glass. The inventive articles can also be made at a fraction of the cost of their conventional counterparts due to their inclusion of a relatively large percentage of inexpensive inorganic aggregate fillers and lower processing energy requirements.

The manufacturing processes and resulting articles are also less harmful to the environment compared to conventional materials and processes. First, theoretically all of the waste associated with the manufacturing process can be directly recycled back into the production line. Second, once the generally disposable articles have fulfilled their intended use, the largely starch-bound inorganically filled matrix of the articles is easily decomposed back into the earth or recycled. Third, the inventive articles are of generally low mass and volume.

Preferred moldable mixtures from which the articles of the present invention are molded include a starch-based binder such as potato, corn, waxy corn, rice, or wheat starch, an inorganic aggregate such as calcium carbonate, well-dispersed fibers having an average length of at least 2 mm, and water. The shape and size distribution of the inorganic aggregate particles are selected to maximize the packing density of the particles, thereby reducing the specific surface area of the aggregate particles and minimizing the starch-based binder and solvent requirements. The addition of longer-length fibers (and optionally, significant concentrations of inorganic aggregate filler) permits the articles to be more quickly molded and demolded, less expensive, more environmentally safe, and more resistant to heat compared to articles made with only minimal amounts of inorganic filler and no longer-length fibers. Accordingly, the materials and articles of the present invention are often referred to as being "inorganically filled" or "highly inorganically filled."

The preferred method for preparing the moldable mixtures of the present invention involves a two-step process. First, a preblended mixture is prepared including a portion of the starch-based binder and water and substantially all of the fibers to be dispersed. The fibers are thoroughly and evenly dispersed throughout the preblended mixture by greatly raising the viscosity and yield stress of the preblended mixture. This allows for a much more efficient transfer of the shear forces produced by the mixing apparatus compared to typical fiber slurries employing relatively large amounts of water in order to obtain better fiber dispersion. The viscosity of the preblended mixture is increased by gelating the starch-based binder, which can be accomplished by raising the temperature of the preblended mixture to the gelation temperature of the starch-based binder, usually around 65° C. for unmodified potato starch. Alternatively, the viscosity can be increased by using a pre-gelated starch, a modified starch that will gelate when mixed with water at room temperature, or thickening agents known in the art. Of course, thickening agents are preferably used to assist rather than take the place of gelatinized starch in preparing the high viscosity preblended mixture. In the event that heat is used to gelate the starch-based binder, it will usually be preferable to cool the preblended mixture to below the gelation temperature before adding the remainder of the starch-based binder. Finally, the moldable mixture is prepared by simply mixing into the preblended mixture the remaining starch-based binder, water, and other admixtures.

The fibers so dispersed within the moldable mixture increase the form stability and resistance to internal pressure of the cellular matrix of the molded articles, which allows them to be more easily demolded without having to remove substantially all the water from the starch-bound matrix. This is due in part to the lattice effect of the fibers, which reinforces the semi-hardened, starch-bound matrix and allows it to be demolded and handled without significant deformation or further expansion of the desired shape of the demolded article. In addition, the fibers are able to more tightly hold, and thereby retain, water within the structural matrix compared to the starch-bound binder. As a result, moisture that is retained within the fibers can migrate into and soften the otherwise brittle structural matrix of the starch-based binder after the article has been demolded.

These effects imparted by the fibers allow the demolded articles to be less brittle and have increased flexibility and resilience immediately or shortly after being demolded. This obviates, or greatly reduces, the need for subsequent conditioning of the starch-bound matrix using high humidity. In addition, the fibers increase the fracture energy and toughness of the final articles.

Other admixtures can be combined with the mixture to impart desired properties to the articles. For example, rheology-modifying agents and dispersants can be added to additionally regulate the viscosity of the mixture beyond that already imparted by the starch-based binder and solid components. Generally, higher viscosity mixtures yield articles having greater density and smaller pores, while lower viscosity mixtures yield articles having lower density and larger pores. Plasticizers and humectants can be used for imparting additional flexibility to the molded articles. Other additives include dispersants, which decrease the viscosity of the mixture without additional solvent, and selected coating materials, which can form a coating on the articles during the formation process or which can be applied after formation of the articles. Aggregate particles upon which ettringite has been formed may be used to improve the interaction between the aggregate particles and starch-based binder.

Once the moldable mixture has been prepared, it is positioned within a heated mold cavity. The heated mold cavity may comprise many different embodiments, including molds typically used in conventional injection molding processes and die-press molding. In a preferred embodiment, the moldable mixture is placed inside a heated female mold. A heated male mold is then complementarily mated with the heated female mold, thereby positioning the mixture between the molds. By carefully controlling the temperature and pressure applied to the mixture, as well as the viscosity and solvent content, the mixture can be rapidly formed into form-stable articles having a selectively designed foamed structural matrix. Furthermore, the strength and flexibility of the molded articles can be controlled by regulating the fiber length and content within the structural matrix. In general, the surface texture, strength properties, flexibility, and the formation of the pores within the structural matrix can be selectively controlled by varying the components and their relative concentrations within the mixture as well as the thermodynamic processing conditions. This allows for the manufacture of a wide variety of containers and other articles having greatly varying thermal and mechanical properties corresponding to the performance criteria of the article.

In the preferred embodiment, the articles are formed having the desired flexibility for their intended use immediately or shortly after being demolded. Nevertheless, if desired, conventional conditioning procedures using high-humidity can be used to further increase the flexibility of the final articles. Water is absorbed by the hydrophilic starch-based, binder thereby softening and rendering the structural matrix less brittle.

Finally, coatings can be applied to the surface of the articles of the present invention in order to protect them from moisture or otherwise render them impermeable to an attacking agent. Coatings can be applied to the demolded article using conventional coating means known in the art, or they may be formed in situ by the use of internal coating materials capable of migrating to the surface of the article during the molding process and then solidifying at or near the surface of the article. Subsequent processing of the articles may also include printing, stacking, and boxing.

II. DEFINITIONS

The terms "inorganically filled mixture," "mixture," "final mixture," or "moldable mixture," as used in the specification and the appended claims, have interchangeable meanings and shall refer to a mixture that can be formed into the articles which are disclosed and claimed herein. Such mixtures are characterized by having a starch-based binder, an inorganic filler or aggregate (up to about 80% by weight of the total solids in the mixture), well-dispersed fibers, and a solvent such as water. The mixture may also include other admixtures, such as mold-releasing agents, organic aggregates, dispersants, cross-linkers, rheology-modifying agents, plasticizers, humectants, or internal coating materials. The mixture can have a wide range of viscosities, from as low as 2 Pa·s to as high as 10,000 Pa·s measured at a shear rate of $1 \text{ s}^{-1}$.

As used in the specification and the appended claims, the terms "solids" or "total solids" includes all admixtures that are in a solid or semi-solid state when before being blended with the water solvent, whether they are suspended or dissolved in the mixture. Hence, the "total solids" includes the starch-based binder or any other admixture dissolved within the water solvent. The volume of the total solids does not include the interstitial voids between the solids in the final hardened article, but is calculated by subtracting out the volume of the interstitial voids.

The term "preblended mixture," as used in the specification and the appended claims, shall refer to any high-viscosity mixture generally containing gelatinized starch, water, and dispersed fibers. The viscosity of the preblended mixture is generally at least about 10 Pa·s at a shear rate of 1 s$^{-1}$, more preferably above about 50 Pa·s at a shear rate of 1 s$^{-1}$. The viscosity of the preblended mixture must be sufficient to be able to disperse the fibers throughout the preblended mixture.

The terms "inorganically filled cellular matrix"7, "cellular matrix", "foamed structural matrix" or "starch-bound," as used in the specification and the appended claims, are interchangeable and shall refer to the substantially hardened structure of the article formed by heating the moldable mixture as described herein. The terms also refer to any starch-bound material in which there has been an increase in the gross volume of the final molded article compared to the initial volume of the moldable mixture. such increase can be as low as 2%, but can be as high as 10 times (100%) or more.

Both the moldable mixture and the starch-bound matrix formed therefrom constitute "inorganically filled cellular materials," "inorganically filled foamed materials," or "starch-bound materials." These terms as used in the specification and the appended claims are interchangeable and shall refer to starch-bound or starch-containing materials or compositions without regard to the mount of solvent or moisture that has been removed from the moldable mixture and without regard to the extent of gelation of the starch-based binder.

Because the inclusion of the inorganic filler is optional, though preferred, the use of the adjectives "inorganic" or "inorganically-filled" may not apply to all materials made according to the present invention.

The term "hardening," as used in this specification and the appended claims, refers to the process of gelation of the starch-based binder and simultaneous removal of solvent from the moldable mixture to produce a form-stable article. The term "hardening," however, is not limited by the extent of gelation or the amount of solvent removed.

The term "form-stable," as used in the specification and the appended claims, means that the article has a structural matrix strong enough to be removed from the mold, support its own weight against the force on gravity, of the newly demolded starch-bound matrix, and resist significant deformation when exposed to subsequent processing and handling. Furthermore, the term "form-stable" means that the article has sufficient solvent removed from its matrix so that the article will not bubble or crack as a result of vapor expansion once the article is removed from the molds.

III. CONCEPTUAL OVERVIEW OF FORMATION PROCESS

A. Microstructural Engineering Design

The starch-bound materials of the present invention are developed from the perspective of microstructural engineering in order to build into the microstructure of the material certain desired, predetermined properties, while at the same time remaining cognizant of costs and other manufacturing complications. Furthermore, this microstructural engineering analysis approach, in contrast to the traditional trial-and-error, mix-and-test approach, has resulted in the ability to design starch-bound materials with those properties of strength, weight, flexibility, insulation, cost, and environmental neutrality that are necessary for the production of functional and useful containers and other articles.

The number of different raw materials available to engineer a specific product is enormous, with estimates ranging from between fifty thousand and eighty thousand. They can be drawn from such disparately broad classes as metals, polymers, elastomers, ceramics, glasses, composites, and cements. Within a given class, there is some commonality in properties, processing, and use-patterns. Ceramics, for instance, have a high modulus of elasticity, while polymers have a low modulus; metals can be shaped by casting and forging, while composites require lay-up or special molding techniques; hydraulically settable materials, including those made from hydraulic cements, historically have low flexural strength, while elastomers have high flexural strength and elongation before rupture.

Compartmentalization of material properties, however, has its dangers; it can lead to specialization (the metallurgist who knows nothing of ceramics) and to conservative thinking ("we use steel because that is what we have always used"). It is this specialization and conservative thinking that has limited the consideration of using starch-bound materials for a variety of products, such as in the manufacture of containers and other packaging materials.

Nevertheless, once it is realized that starch-bound materials have such a wide utility and can be designed and microstructurally engineered to have desired properties, then their applicability to a variety of possible products becomes appreciable. Such materials have an additional advantage over other conventional materials, in that they gain their properties under relatively gentle, nondamaging, inexpensive conditions. (Other materials require high energy, severe heat, or harsh chemical processing that significantly affect the material components and cost of manufacturing.) Moreover, certain conventional materials, or components thereof, can be incorporated into the materials of the present invention with surprising synergistic properties or results.

The design of the compositions of the present invention has been developed and narrowed, first by primary constraints dictated by the design, and then by seeking the subset of materials which maximizes the performance of the components. At all times during the process, however, it is important to realize the necessity of designing products which can be manufactured in a cost-competitive process.

Primary constraints in materials selection are determined by the properties necessary for the article to function successfully in its intended use. With respect to a food and beverage container, for example, those primary constraints include minimal weight, strength (both compressive and tensile), flexibility, and toughness requirements, while simultaneously keeping the cost comparable to its paper, plastic, polystyrene or metal counterparts.

In its simplest form, the process of using materials science to microstructurally engineer and design an inorganically filled article requires an understanding of the interrelationships between each of the mixture components, the processes parameters (e.g. time, temperature, pressure, humidity), the mixture properties, and the properties of the final articles. By understanding the interrelationships between the variables at both the macro and micro level, one skilled in the art can select proportions of desired components that can be processed under selected conditions to produce articles that have desired properties for an intended use at a minimum cost.

The interrelationships between the variables will be discussed at selected locations hereafter where the variables are introduced and defined. Specific compositions are set forth in the examples given below in order to demonstrate how the selection of variables can optimize properties.

B. Articles of Manufacture

The terms "article," "molded article," "starch-bound article," and "article of manufacture," as used in the specification and the appended claims, are intended to include any article that can be formed using the disclosed compositions and processes. Examples of such articles of manufacture include containers, such as food and beverage containers and packaging containers. Articles within the scope of this invention also include such disparate objects as cutlery, flower pots, mailing tubes, light fixtures, ash trays, and game boards.

The terms "container" or "containers," as used in the specification and the appended claims, are intended to include any receptacle or vessel utilized for, e.g., packaging, storing, shipping, serving, portioning, or dispensing various types of products or objects (including both solids and liquids), whether such use is intended to be for a short-term or a long-term duration of time.

Containers within the scope of this invention include, but are not limited to, the following: cartons, boxes, sandwich containers, hinged or two-part "clam shell" containers, dry cereal boxes, frozen food boxes, milk cartons, fruit juice containers, carriers for beverage containers, ice cream cartons, cups (including, but not limited to, disposable drinking cups and cone cups), french fry scoops, fast-food carry out boxes, packaging, support trays (for supporting products such as cookies and candy bars), cans, yoghurt containers, sleeves, cigar boxes, confectionery boxes, boxes for cosmetics, plates, vending plates, pie plates, trays, baking trays, bowls, breakfast plates, microwaveable dinner trays, "TV" dinner trays, egg cartons, meat packaging platters, disposable single use liners which can be utilized with containers such as cups or food containers, cushioning materials (i.e., "peanuts"), bottles, jars, cases, crates, dishes, and an endless variety of other objects.

The container should be capable of holding its contents, whether stationary or in movement or handling, while maintaining its structural integrity and that of the materials contained therein or thereon. This does not mean that the container is required to withstand strong or even minimal external forces. In fact, it may be desirable in some cases for a particular container to be extremely fragile or perishable. The container should, however, be capable of performing the function for which it was intended over the intended duration of time. The necessary properties may always be designed into the material and structure of the container beforehand using a microstructural engineering approach.

Containment products used in conjunction with the containers are also intended to be included within the term "containers." Such products include, for example, lids, straws, interior packaging, such as partitions, liners, anchor pads, corner braces, corner protectors, clearance pads, hinged sheets, trays, funnels, cushioning materials, and other objects used in packaging, storing, shipping, portioning, serving, or dispensing an object within a container.

The containers within the purview of the present invention may or may not be classified as being "disposable" (i.e., manufactured for a single-service or one-time use). In some cases, where a stronger, more durable construction is required, the container might be capable of repeated use. On the other hand, the container might be manufactured to be economical for a single use and then be discarded. If produced en mass and then discarded, the articles of the present invention have a composition that is easily degraded into environmentally neutral components compatible with earth into which they may be placed. The starch-bound matrix is quickly destroyed when exposed to moisture and the components easily recycled or composted.

The articles within the scope of the present invention can have greatly varying thicknesses depending on the particular application for which the article is intended. They can be as thin as about 1 mm for use in, e.g., a cup; however, they may be as thick as needed where strength, durability, and or bulk are important considerations. For example, the article may be up to about 10 cm thick or more to act as a specialized packing container or cooler. Nevertheless, most articles will preferably have a thickness in a range from about 0.5 mm to about 5 mm, more preferably from about 1 mm to about 3 mm.

The phrases "mass-producible" or manufactured in a "commercial" or "economically feasible" manner, as used in the specification and the appended claims, shall refer to the capability of rapidly producing articles at a rate that makes their manufacture economically comparable or even superior compared to articles made from conventional materials, such as paper, paperboard, polystyrene, plastic, or metal.

The containers and other articles made from inorganically filled materials are intended to be competitive in the marketplace with such articles currently made of various materials, such as paper, plastic, polystyrene, or metals. Hence, the articles of the present invention must be economical to manufacture (i.e., the cost will usually not exceed a few cents per item). Such cost restraints thus require automated production of thousands of the articles in a very short period of time. Hence, requiring the articles of the present invention to be economically mass-produced is a significant limitation on the qualities of the materials and products.

C. Processing Concepts and Variables

The present section discusses the underlying concepts and processing variables used in manufacturing the articles of the present invention. A detailed description of the mechanical apparatus and systems used in the manufacturing process will be provided in a subsequent section.

The mixture of the present invention is prepared by combining selected components and blending them in a two-step process until a homogeneous, moldable mixture having well-dispersed components is formed. The first step involves the preparation of a preblended mixture having high viscosity in order to more thoroughly disperse the fibers, particularly longer-length fibers, within the preblended mixture. The ability to thus include fibers that were difficult, if not impossible, to adequately disperse in the past is a key inventive feature that greatly improves the final strength and other performance properties of the molded articles. The inclusion of fibers, particularly long fibers having an average length greater than about 2 mm, greatly increases the strength and flexibility of the formed articles, and aids in creating a form stable and internal pressure resistant product without removing all of the water from the article as it is being molded. This results from the reinforcing effect of the long-length fibers forming a fiber matrix, lattice structure, or skeleton that strengthens the newly formed starch-bound structural matrix of the articles. In order to take full advantage of the properties added by the fibers, it is greatly preferred that the fibers be uniformly dispersed throughout the moldable mixture and have an average length that is approximately 2–10 times greater than the cross section of the wall of the article.

Before it was discovered that increasing the viscosity of the mixture rather than the water content would result in better transfer of shear to disperse the fibers, it was particularly difficult to get a uniform dispersion of long fibers throughout a starch-based mixture. Only a reduced amount of fiber loading was possible, and only shorter fibers having an average length less than about 1.5 mm could be adequately dispersed, which resulted in inferior molded articles. If one attempted to disperse longer fibers within a typically nonviscous aqueous slurry, the shear forces imparted by the mixer to the water did not transfer down to the fiber level because of the low viscosity of the liquid. Simply increasing the shear rate of the mixing apparatus was ineffective and usually led to the degradation of fiber quality before adequate dispersion was achieved.

For example, in the paper industry, wood pulp fibers are dispersed in an aqueous slurry having a suspension of 4% by weight of fiber and 96% by weight of water. Even if dispersion is achieved, a large amount of energy is then required in order to remove the water from such slurries, which often contain water in mounts up to about 99.5% by volume. Because so much water must be removed from paper slurries, it is necessary to literally suck water out of the slurry even before the drying process is begun.

Such an approach as used in the paper industry would not work in trying to disperse fibers in a starch-based mixture since there remains the expensive procedure of removing the large excess of water. The process of removing the water would result in large fiber nodules rather than the desired dispersion of the fibers. In contrast to the way fibers are dispersed in the paper industry using a very high water content, the method of the present invention uses a lower water content and increased viscosity and yield stress caused by gelating the portion of the starch-based binder used in the preblended mixture.

In preparing the preblended mixture, a fibrous material having individual fibers with an average length greater than about 2 mm and up to 25 mm is mixed with a portion of the water to form an initial mixture. A portion of the starch-based binder is then added to the initial mixture to form a preblended mixture. The starch-based binder in the preblended mixture is gelated by heating the mixture to the gelation temperature to greatly increase the viscosity and yield stress of the preblended mixture, which aids in the dispersion of the fibers. The preblended mixture is then mixed at high shear for an effective mount of time to disperse the fibers therein. The increased viscosity has been found to aid in transfer of the shearing energy from the mixer to the fibers. In fact, low viscosity, high water mixtures are unable to impart the requisite shear energy necessary to completely disperse the fibers, which energy is .mostly dissipated into the water.

The preblended mixture is then cooled to below the gelation temperature of the starch. The remaining starch-based binder, water, and other admixtures (including, optionally, an inorganic filler) are then added to and thoroughly mixed within the preblended mixture to form a moldable mixture. The moldable mixture can then be used to produce an article having a desired shape and a foamed structural matrix, with the article usually being form-stable within about 30 seconds to about 2 minutes after the molding process has begun.

A more detailed description of the above methods for preparing the preblended mixture is as follows. A fibrous material having long fibers is mixed with a portion of the total water to be added to form an initial mixture. The fibrous material includes fibers having an average length greater than about 2 mm and up to about 25 mm in length. Preferred fibers include softwood fibers from dry pulp sheets that have an average fiber length of about 3.5 mm, and abaca fibers having an average length of about 6.5 mm. The fibers are added in an amount in a range from about 2% to about 40% by weight of the total solids of the final mixture, and preferably in a range from about 5% to about 30% by weight, and more preferably in a range from about 10% to about 20% by weight of the total solids. The portion of water that is added to the initial mixture is in a range from about 10% to about 90% by weight of the total water to be added, with about 25% to about 75% by weight being more preferred, and from about 40% to about 60% being most preferred. The amount of total water that will be added is selected based on the desired density of the final product and will preferably be included in a broad range from about 15% to about 80% by weight of the final moldable mixture depending on the desired viscosity and yield stress of the final mixture. Generally, the density of the final product is inversely proportional to the water content so that less water results in a higher density final product, while more water results in more foaming and a lower density final product.

An initial portion of the starch-based binder is then added to the initial mixture and then gelated, thereby forming the preblended mixture. The fraction of the starch-based binder that is added to form the preblended mixture is determined by the desired level of viscosity, which should be large enough to adequately transfer sufficient shearing forces to disperse the particular fiber being used. Generally, the longer the average fiber length, the greater the viscosity that is required to adequately disperse the fibers. Preferably, the fraction of the starch-based binder added to form the preblended mixture will comprise from about 5% to about 70% by weight of the total starch-based binder to be added to the final moldable mixture, with from about 10% to about 50% by weight being more preferred and from about 10% to about 30% being most preferred. The amount of starch-based binder added to the preblended mixture is often roughly equal to about one half the weight of the fibrous material being dispersed. For example, if 200 g of fibers were used, then a typical preblended mixture might include about 100 g of starch-based binder. This, however, is more illustrative and is by no means critical, or even required in many cases.

The starch-based binder in the preblended mixture is then gelated by heating the mixture to above the gelation temperature of the starch-based binder, which is usually greater than about 65° C. for unmodified starches, such as potato starch. The preblended mixture may be heated by using microwaves when forming the preblended mixture on a small scale, or by adding preheated water to the initial mixture. In an industrial setting, it may be more preferable to mix the fibrous material with the initial portion of the starch-based binder. This dry mixture is placed into a large high shear mixer and then preheated water is pumped into the large mixer, thereby gelating the starch-based binder as mixing proceeds.

In alternative embodiments, the starch-based binder added to form the preblended mixture can be pregelated, or a mixture of pregelated and ungelated starch can be used. The resulting preblended mixture increases in viscosity and yield stress as the starch-based binder gelates and thickens the mixture. The viscosity of the preblended mixture can be controlled by varying the respective amounts of starch-based binder and water that are used but will preferably be greater than about 10 Pa·s at a shear rate of 1 $s^{-1}$, and more preferably greater than about 50 Pa·s, and most preferably greater than about 100 Pa·s at the same shear rate. The preblended mixture is then mixed at high shear for at least about 10 minutes and up to about 2 hours, and preferably from about 10 to 30 minutes, in order to thoroughly disperse the fibers. The length of the mixing time depends on the viscosity of the preblended mixture as well as the amount of fibers, with more fibers generally requiring a longer mixing time.

The preblended mixture is then cooled down to below the gelation temperature of the starch-based binder, preferably below about 40° C. This may advantageously be performed in some cases by simply adding the remaining water and other components to the mixture prior to adding the remaining starch-based binder. In other cases, it may be necessary to add cooler water to further lower the temperature of the mixture to prevent gelation of the remaining starch-based binder to be added. The other components such as the inorganic fillers, mold releasing agents, humectants, plasticizers, and internal coatings or sealing compounds are added at this time to form the final mixture. The mixture is then mixed for a few minutes until homogeneous in order to form the desired moldable mixture, which is then suitable for molding an article having a foamed structural matrix. It should be noted that the less water there is in the final mixture, the greater will be the viscosity of the final mixture and the resulting mixing time required to disperse the remaining solid components. Preferably, the viscosity of the moldable mixture can fall within a broad range from about 2 Pa·s to about 10,000 Pa·s, and more preferably in a range from about 100 Pa·s to about 2000 Pa·s, at a shear rate of 1 s$^{-1}$.

In mixing together the components of the moldable mixture it is important that the remaining part of the starch-based binder not be subjected to shearing forces large enough to break or rupture the starch granules, in the case where an unmodified starch is used. It is also important to maintain the mixture at a temperature below the gelation temperature of the starch-based binder to avoid premature gelation of the binder before the molding process has begun. Otherwise the viscosity of the moldable mixture will become too high for use in further processing. The moldable mixture needs to remain sufficiently fluid to be pumped to and flow into a mold to form a desired article. Pregelatinizing a substantial portion of the starch-based binder prior to molding would yield a very rigid gel that would prevent the moldable mixture from flowing into a mold. By only allowing the initial portion of the starch-based binder to gelate (e.g., about 10–30% of the starch-based binder), the moldable mixture maintains a suitable fluidity to flow into the mold. Once heated within the mold, however, the ungelated starch-based binder will quickly gelate in order to greatly increase the viscosity and yield stress of the moldable mixture, thereby helping to create a form stable molded article that can be more easily demolded.

The key to getting the fibers to disperse in the preblended mixture is to obtain a transfer of the shearing force from the mixer to the liquid in contact with the fibrous material. The shearing force is an internal force tangential to the material on which the force acts. When fibers are mixed with low viscosity, high water mixtures, the fibers are not dispersed since the requisite shearing force from the mixer is dissipated into the water and does not transfer to the fibers. Since the water has a lower viscosity, the water has a tendency to segregate from the fibers and not provide any shear thereto. Thus, improving the transfer of shear from the mixer to the liquid in contact with the fibrous material is necessary in order to disperse the fibers.

The mechanism for obtaining this transfer of shear is through the higher viscosity of the preblended mixture, which transfers shear properties from the mixer down to the fibrous material, which generally results in the dispersion of the fibers within about 10 to 30 minutes with removal of all fiber nodules. This increase in viscosity by the thickening of the preblended mixture allows a much greater transfer of the shearing force from the mixer to the liquid in contact with the fibrous material. This results in the application of the shearing force to the connections between the fibers in the fibrous material, which causes the fiber nodules to be torn apart. The level of transfer of shear by means of the highly viscous preblended mixtures of the present invention results in a markedly improved dispersion of fibers compared to conventional methods. In addition to gelating a portion of the starch-based binder, various rheology-modifying or thickening agents can be used to increase the viscosity of the preblended mixture, such as the commercial thickener Tylose®. It has been found, however, that Tylose® has a very high affinity toward water, which interferes with the starch-water reaction. Hence, adding relatively large quantities of rheology-modifying agents such as Tylose® is generally not preferred.

The addition of long fibers to the moldable mixture, which are dispersed throughout the mixture by the method of the present invention, allows a product to be molded without the need for a subsequent conditioning step. Unlike prior processes, the products of the invention can be demolded before all of the water has been removed from the mixture. The final demolded product maintains an appropriate amount of water so that the product is not brittle and can be handled without shattering or cracking.

In addition to fibers, zeolites can be added to the compositions of the invention and act as internal conditioning components. Zeolites are aluminum silicates and have a tendency to absorb moisture from the atmosphere into the structural matrix. Magnesium chloride can also be used in the compositions of the invention in order to absorb moisture from the atmosphere and act as an internal conditioning agent.

Once the mixture has been prepared, it may be formed or molded into the shape of the desired article. In one embodiment, the forming steps include positioning and locking the mixture between a heated male mold having a desired shape and a heated female mold having a complementary shape. The heat from the molds causes the mixture to expand within the molds. Excess material and vapor is expelled from between the molds through small vent holes. Once a sufficient amount of the solvent has been removed, the molds are opened, and the form-stable article having a foamed structural matrix is removed for subsequent processing.

The process is more accurately defined through the use of a phase diagram. Depicted in FIG. 1 is a phase diagram for water. FIG. 1 illustrates, by way of a general example, the pressure and temperature stages that a mixture using water as a solvent undergoes during formation of the article. Between points A and B along line 1, the mixture is locked between the molds and is rapidly heated at first at constant ambient pressure to a temperature of about 100° C. The portion of the mixture closest to the molds is heated at a faster rate and thus reaches a temperature of 100° C. before the interior section of the mixture. As the mixture begins to heat, the starch-based binder begins to gelate, increasing the viscosity of the mixture. (The process of gelation is discussed later in the section on starch-based binders.)

Once the temperature of the water within the moldable mixture in contact with the mold surface reaches 100° C., the water begins to vaporize, thereby forming air pockets or voids within the mixture. As a result of these expanding pockets, the volume of the mixture expands, causing the mixture to "rise" and momentarily fill the mold and clog the small vent holes. The water within the portion of the moldable mixture closest to the molds is quickly vaporized and driven off from the mixture at or near the region closest to the mold, as represented in FIG. 1 by point B, thereby hardening that portion of the mixture into a thin, dense skin. The skin is believed to be formed almost instantaneously and acts as an insulation barrier for the remaining portion of the moldable mixture, thereby slowing down the rate of heating. With the vent holes plugged, and due to the restricted flow, the pressure begins to increase between the molds, as shown by line 2, preventing the transformation of the remaining solvent into vapor at the boiling point, which is usually 100° C. for water. Instead, as also shown by line 2, the solvent in the moldable mixture is super heated as a result of the restricted flow. Eventually, the material blocking the vent holes ruptures, allowing excess material to escape from between the molds. However, as a result of the small size of the vent holes, the flow of the escaping mixture is restricted, thereby allowing the pressure and temperature within the mold to further increase to point C on FIG. 1.

The foamed structural matrix is formed when sufficient excess material has escaped to cause the pressure to drop between the molds. Under high pressure the solvent vapor which forms is nucleated because of superheating. The drop in pressure causes the superheated solvent to transform rapidly into the gaseous state through an adiabatic expansion, thereby forming a distribution of voids or cells throughout the structural matrix of the article. The tendency of the solvent vapor to become nucleated at individual points throughout the superheated mixture yields a fairly well-distributed cell or pore structure. The transformation of the solvent to vapor is an endothermic reaction that absorbs heat from the moldable mixture, thereby substantially decreasing the temperature of the moldable mixture inside the mold. The drop in temperature and pressure of the moldable mixture is depicted by line 3 extending from point C to point B. The illustration that the temperature of the mixture returns to 100° C. is simply by way of example. In actuality, the temperature of the mixture may drop below 100° C. The drop in pressure of the solvent is depicted as line 5 extending from point C to point D.

With the vent holes open and the pressure reduced, the mixture then begins to heat up again to the boiling point of the solvent, allowing the remaining solvent to freely evaporate until sufficient solvent has been removed for the article to become form-stable. This process is depicted by line 4 extending from point B. This analysis of the cellular formation is supported by the fact that producing articles under low pressure results in articles having minimal voids. For example, gradually evaporating the solvent from the mixture at a low temperature or heating the mixture rapidly on top of a single mold results in a product having a lower concentration of air voids and high density.

Figure 2:
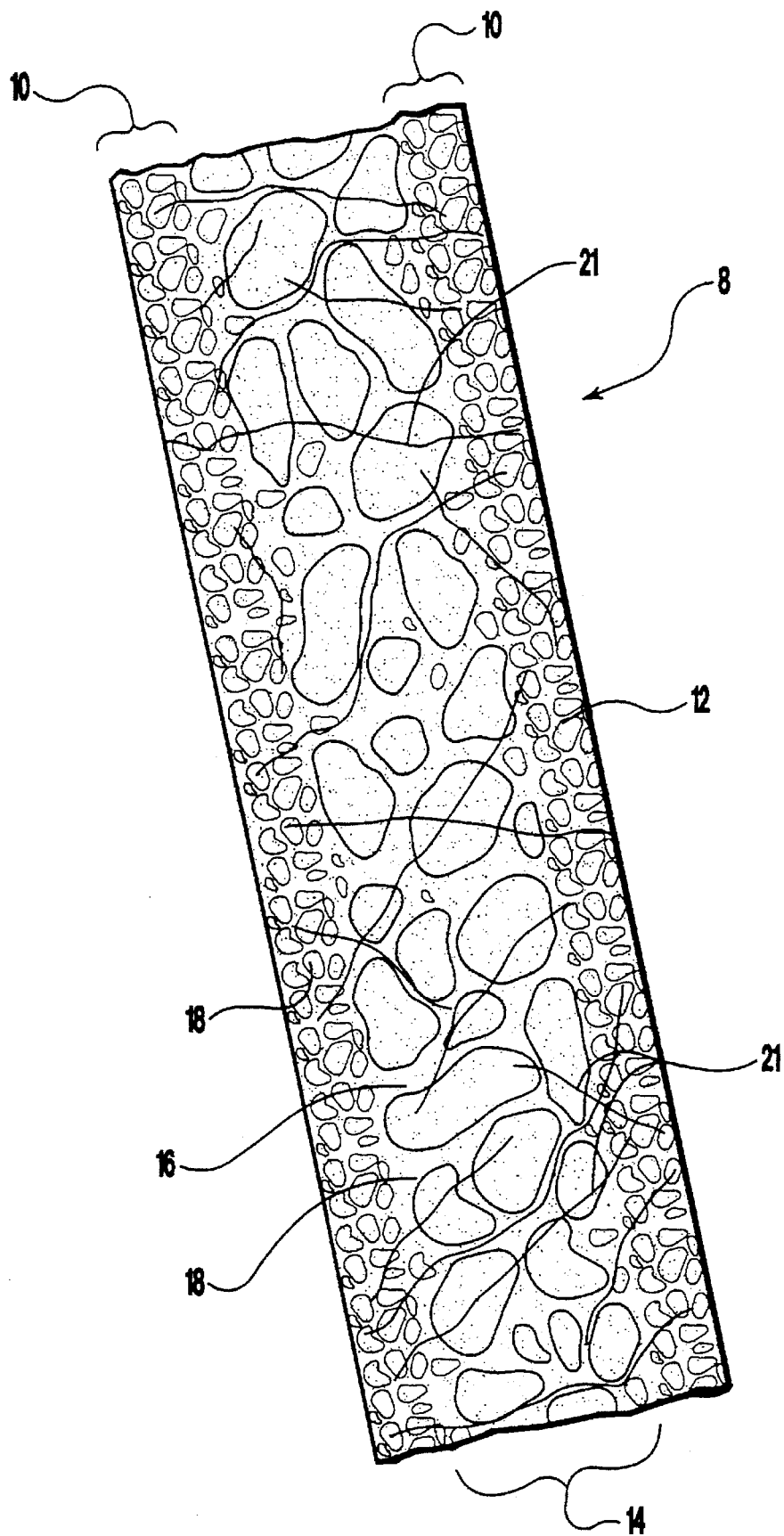
FIG. 2 is an enlarged cross-sectional view of the skin and interior section of a hardened article.

Depicted in FIG. 2 is a cross-section 8 of a formed article. The figure reveals the present articles as having an outside skin 10 with small cells 12 and an interior section 14 containing large cells 16. Small cells 12 are defined as having an average diameter of less than about 250 μm. The material between adjacent cells is referred to as a cell wall 18. Fibers 21 are distributed throughout outside skin 10 and interior section 14. The distribution and size of the cells within the structural matrix are dependent on several variables including the viscosity of the mixture, temperature of the molds, and composition of the mixture, e.g., the types and amounts of solvent, starch-based binder, inorganic aggregate, fibers, and other admixtures.

Articles can be made having a desired structural matrix by controlling the related variables. For example, FIG. 2A is a microscopic picture of the cross-section of an article having a thin outside skin 10 and large cells 16 located in interior section 14. FIG. 2B is a microscopic picture of the cross-section of an article having a thin outside skin 10 and medium cells 19 located in interior section 14. Finally, FIG. 2C is a microscopic picture of the cross-section of an article having a thick outside skin 10, large cells 16 located in interior section 14, and small cells 12 located near the surface of the article. In general, the insulation ability and the strength of the structural matrix of the article increase as the cells become more evenly dispersed throughout the matrix. Increasing the overall volume of the cellular space also would tend to improve the insulation ability, although it would be expected to have an adverse effect on the strength of the matrix. The insulation ability can also be improved without significantly sacrificing strength by adding an efficiently particle packed, lightweight aggregate to the matrix. The strength is increased by including fibers that are at least about 1.5 times larger than the cross section of the article, more preferably 5 times longer, and most preferably at least about 10 times longer.

The size of the cells within the structural matrix is influenced by the viscosity and/or state of hardening of the article. As previously discussed, outside skin 10 is formed early on in the process and is important for the structural integrity of the article. Accordingly, when the pressure drops and the cells are formed within the mixture, it is much easier for the vapor to expand within interior section 14 than in outside skin 10. Thus, the cells are much larger within interior section 14. It is also possible that the cells in outside skin 10 are formed at the same time the skin is formed. That is, as the solvent vaporizes within the portion of the mixture forming outside skin 10, small bubbles begin to form within the skin. However, the outside portion of the mixture is heated so quickly that the skin becomes hard before the cells have a chance to enlarge.

As stated above, it is important to remove enough solvent so that the article is sufficiently form stable to be removed from the mold and subsequently handled. In general, the structural matrix of the molded articles will contain about 5% or less solvent at the point where the article has adequate strength and form stability to be demolded. If excess water vapor remains within the cells of the heated article, it will cause internal pressure within the structural matrix of the molded article. This water within the cellular matrix can further expand after the demolding step, thereby causing an inadequately dried article to "blow up" or explode upon being demolded. On the other hand, overdrying, especially overheating, the article can permanently damage and weaken the starch-bound structural matrix of the molded article.

Fortunately, it has been found that the addition of well-dispersed, longer-length fibers (and optionally, inorganic fillers) creates a moldable mixture having a much smaller window of error or, conversely, a much larger window of processing time. That is, these admixtures facilitate and greatly reduce the time needed to remove of water in order to create a form stable article, while also preventing burning or otherwise damaging the starch-bound structural matrix for a significant period of time during the molding process.

The processing variables associated with the formation of the inventive articles and the foamed structural matrix include mold temperature, time for removing the solvent, filling volume, and vent hole size. The articles of the present invention are preferably removed from the locked molds after most, but not all, of the solvent has been removed. While the mixture is locked between the molds, the outside edges of the articles are supported by the opposing molds. Vapor formed by the evaporation of the solvent is thus forced to travel under pressure to the vent holes, where it is expelled. The outside walls of the article are the first to form and are brittle as a result of the loss of water. Separation of the molds prior to removing a sufficient amount of the solvent permits the vapor to expand between the article walls, resulting in bubbling, cracking, or deformation of the outside walls of the articles. Furthermore, attempts to remove the article from the molds prior to removal of a sufficient amount of moisture can result in the article sticking to the molds and damage to the structural matrix.

Since the article cannot be removed until a sufficient amount of solvent has been removed, it is preferable to have the mold temperature as high as possible. This minimizes the time for removal of the solvent and permits the quickest production of articles. Studies have found, however, that temperatures greater than about 240° C. can result in dextrification or breaking down of the starch molecules in the surface of the article. Dextrification caramelizes the starch, produces a brown color on the article, and reduces the structural integrity of the article. Temperatures above about 240° C. can also burn certain organic fibers, as well as overdrying the molded articles.

In contrast, it is difficult to form an article having a foamed structural matrix at mold temperatures below about 120° C. At such low temperatures, there is little pressure build-up and only slow evaporation of the solvent. Studies have found that increasing the processing temperature to between about 140°–240° C. decreases the production time and the density of the article. With temperatures ranging between 140°–180° C., the decrease in production time is substantial. After about 180° C., however, the decrease in processing time is less dramatic. Again, this finding is consistent with the cellular formation model. The higher temperatures result in only a marginal decrease in the formation time because they only marginally shorten the incubation period before the drop in pressure and they only marginally shorten the time for removing the moisture after the cellular structure is formed. The temperature of the molds has little, if any, significant effect on the rate of formation of the cells after the drop in pressure.

As the temperature increases, the size of the cells also increase. The size of the cells within the structural matrix, and thus the strength and insulating capability of the articles, can thus be selected in part by adjusting the temperature of the molds. Furthermore, by varying the temperature differential between the male and female molds, the cell size can be selectively varied between the walls of the article. For example, by making the female mold hotter than the corresponding male mold, a cup can be formed having relatively large cells and higher insulating capability at its outside surface where the cup is held. In contrast, the cup will be more dense and be more water fight at its inside surface where liquid will be held.

A temperature of 200° C. is preferred for the rapid production of thin-walled articles, such as cups. Thicker articles require a longer time to remove the solvent and are preferably heated at somewhat lower temperatures to reduce the propensity of burning the starch-based binder and fiber. Leaving the articles within the locked molds too long can also result in cracking or deformation of the articles. It is theorized that removing greater than about 98% of the solvent within the mixture results in shrinking of the structural matrix, which in turn can crack the article. Accordingly, the article is optimally removed from the mold when approximately 2%–5% of the moisture remains within the article, more preferably about 2.5%–4%. It should be understood, however, that these figures are only approximations.

The temperature of the mold can also effect the surface texture of the molds. Once the outside skin is formed, the solvent remaining within the interior section of the mixture escapes by passing through minute openings in the outside skin and then travelling between the skin and the mold surface to the vent holes. If one mold is hotter than the other, the laws of thermodynamics would predict, and it has been empirically found, that the steam will tend to travel to the cooler mold. As a result, the surface of the article against the hotter mold will have a smoother and more uniform surface than the surface against the cooler mold.

Figure 3:
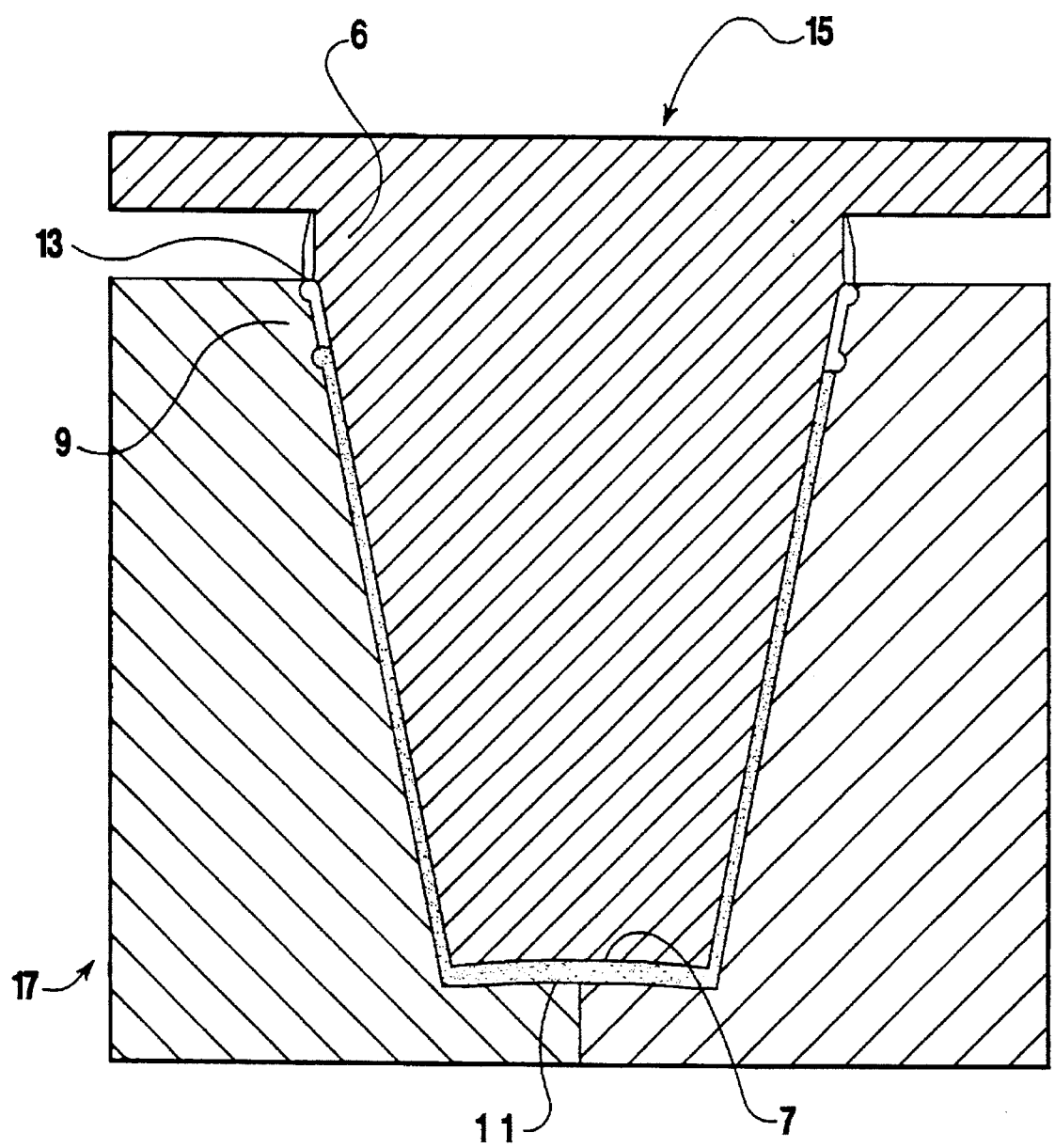
FIG. 3 is a cross-sectional view of a male mold and a female mold being mated.

The temperature of the molds can also be varied along the length of the molds. Depicted in FIG. 3 is a male mold 15 mated with a female mold 17, with a moldable mixture being positioned therebetween. In general, the male mold includes a top end 6 and a bottom end 7. Likewise, the female mold includes a top end 9 and a bottom end 11. Located near top ends 6 and 9 are vent holes 13, through which the excess material and vapor can escape. Studies have found that for deep recessed articles such as cups, a smoother surface and more uniform structural matrix can be obtained if the mixture is hardened sequentially from the point furthermost from the vent hole to the point closest to the vent holes. For example, referring to FIG. 3, it is preferable in some cases for the temperature of the molds to be the highest at bottom ends 7 and 11, with the temperature gradually decreasing toward top ends 6 and 9, where the temperature is the lowest.

Such a temperature zone differential within the molds helps to direct the vapor and air out the vent holes. As the solvent is vaporized at the bottom end of the molds, the vapor is absorbed into the adjacent mixture. The vapor thus gradually travels to the vent holes. Furthermore, since the mixture closest to the vent holes is the last to harden, the excess material is more easily expelled from between the molds. In contrast, if the molds were hottest near top ends 6 and 9, the vapor near bottom ends 7 and 11 would be forced to travel over the already hardened surface of the article, thereby possibly damaging the surface texture. Likewise, the excess material would already be hardened and its removal could result in disrupting the structural integrity of the article.

The mold temperature and the time for removing the solvent are interdependent and are further dependent on the thickness of the article and the amount of solvent present. The mold temperature of the present invention is preferably in a range from about 150° C. to about 220° C., with about 170° C. to about 210° C. being more preferred, and from about 190° C. to about 200° C. being most preferred. The time in which the solvent is preferably removed from the mixture ranges from about 1 second to about 15 minutes, with about 15 seconds to about 5 minutes being more preferable, and from about 30 seconds to about 2 minutes being most preferable. It should be noted that in light of the endothermic process of the vaporization of the solvent and the rather short period of time that the molds are in contact with the mixture, the mixture within the interior of the molded article generally does not get as hot as the molds. Typically, the temperature of the mixture will not exceed about 130° C. during the molding procedure.

The volume of material positioned between the molds for subsequent heating also affects the resulting density of an article. If insufficient material is introduced into the mold to form a completed article (no excess material is discharged) the resulting material will have a higher density and moisture content. This results from a lack of pressure build up and subsequent expansion. When sufficient material is added to produce the desired pressure (a minimum of excess material) the density of the article dramatically decreases.

Further increases in the amount of material will decrease the density of the article up to a point. Past this point, the addition of more material will have little or no further effect on the resulting density. For example, in the production of 12 oz. cups, the addition of 1 gram of extra material resulted in a decrease in density of about 0.005 g/cm$^3$. However, adding more than 35 grams of material resulted in no further decrease in the density and was merely wasted.

The pressure buildup within the molds is dependent both on the temperature of the molds and the size of the vent holes. The larger the vent holes are, the less pressure that builds within the moldable mixture and the more easily the vapor and excess material can escape, resulting in less expansion and a more dense structural matrix of the molded article. Accordingly, the larger the vent holes, the smaller the cells within the structural matrix. However, if the vent holes are too large, the mixture will not be able to plug the vent holes, thereby preventing the required pressure buildup for the formation of the desired cell structure. (Such an arrangement may be preferred, however, if a more dense article is desired.) Another drawback to large vent holes is that they can create larger deformities on the surface of the articles at the point where the excess material is removed. The size of the deformities can be reduced by decreasing the size and increasing the number of the vent holes.

The smaller the vent holes are, the greater is the expansion force that the vapor can apply on the moldable mixture. If the vent holes are too small, an excessive pressure will build up, resulting in deformation or even explosion of the article upon release of the pressure. The size of the cells can further be regulated by controlling the release of pressure. For example, by slowing down the rate of pressure drop, the sudden expansion force caused by vaporization of the solvent is decreased. This results in articles having smaller cells and thicker cell walls, which together produce a stronger article.

As previously discussed, by regulating the size of the vent holes, the size of the cells in the structural matrix can be regulated. The exact size and number of vent holes depends on the size of the article being produced. Larger articles require more vent holes. Examples of vent sizes and numbers to produce articles are shown later in the application in the Example Section. In the production of most articles of the present invention the vent sizes will preferably range from about 0.05 mm$^2$ to about 15 mm$^2$, more preferably from about 0.2 mm$^2$ to about 5 mm$^2$, and most preferably from about 0.5 mm$^2$ to about 2 mm$^2$. The number of vent holes will preferably be in a range from about 1 to about 10, with about 2 to about 8 being more preferred, and about 4 to about 6 being most preferred.

In a preferred method for manufacturing cups, it has been found that using 4 vent holes, each having a vent hole of about 1.9 mm$^2$, is preferred.

In addition, it is generally preferable to use molds having smaller vent holes for moldable mixture having a higher water content. When more water is used, a more violent reaction ensues, which must be controlled. If the vent holes are too large then material may be blown out of the vent holes during the molding process. When a low water content mixture is used, the vent hole size is less important.

As discussed herein, the inclusion of fibers, particularly long-length fibers, as well as other softening or conditioning agents such as humectants or plasticizers within the moldable mixtures of the present invention, yields demolded articles that immediately or shortly after demolding possess the desired flexibility and resiliance. This reduces and, in most cases, even obviates the need for conventional conditioning in high humidity as is generally required in the case of molding articles without fibers and/or inorganic aggregate fillers. Nevertheless, if it desired to further soften or condition the starch-bound matrix of the molded articles, it is possible, although not preferable in most cases, to condition the articles by placing them in a high humidity chamber at elevated temperatures for a period of time.

Using the above processes in conjunction with the mixture components outlined below, the cellular articles of the present invention will preferably have a density in a range from about 0.05 g/cm$^3$ to about 1 g/cm$^3$, with about 0.1 g/cm$^3$ to about 0.5 g/cm$^3$ being more preferred, and about 0.15 g/cm$^3$ to about 0.25 g/cm$^3$ being most preferred.

The remaining processing steps include optional steps, such as printing and coating. These steps, along with stacking, bagging, and boxing, are performed substantially identically to that of conventional articles made from materials such as paper, plastic, polystyrene foam, and other organic materials.

IV. COMPOSITIONAL EFFECTS ON FORMATION

To facilitate implementation of the microstructural engineering approach, each of the components in the moldable mixture is discussed below. The discussion includes the properties and preferred proportions of each of the components, along with how each component is interrelated with processing parameters, properties of the moldable mixture, and properties of the final article.

A. Starch-based binders

The moldable mixtures used to manufacture the inorganically filled, foamed articles of the present invention develop their strength properties through the gelation and subsequent drying out of a substantially solvated starch-based binder. Starch is a natural carbohydrate chain comprising polymerized sugar molecules (glucose). Plants manufacture and store the starch as food for itself and for seeds. Starch is formed in granules that comprise two types of glucose polymers: the single-chain amylose that is generally soluble in water and other solvents and the branched amylopectin that are generally insoluble in water.

In general, starch granules are insoluble in cold water; however, if the outer membrane has been broken by, e.g. , grinding, the granules can swell in cold water to form a gel. When the intact granule is treated with warm water, the granules swell and a portion of the soluble starch (amylose) diffuses through the granule wall to form a paste. In hot water, the granules swell to such an extent that they burst, resulting in gelation of the mixture. The exact temperature at which a starch-based binder swells and gelates depends on the type of starch-based binder.

Gelation is a result of the linear amylose polymers, which are initially compressed within the granules, stretching out and intertwining with each other and with the amylopectin chains. After the water is removed, the resulting mesh of inter-connected polymer chains forms a solid material that can have a tensile strength up to about 40–50 MPa. The amylose polymers can also be used to bind individual aggregate particles and fibers within the moldable mixture (thereby forming a highly inorganically filled matrix).

Through careful microstructural engineering, highly inorganically filled containers and other articles can be designed having desired properties including flexural strengths up to about 8 MPa or more.

Although starch is produced in many plants, the most important sources are seeds of cereal grains (e.g., corn, waxy corn, wheat, sorghum, rice, and waxy rice), which can also be used in the flour and cracked state. Other sources include tubers such as potatoes, roots such as tapioca (i.e., cassava and maniac), sweet potato, and arrowroot, and the pith of the sago palm.

As used in the specification and the appended claims, the term "starch" or "starch-based binder" includes unmodified starches (amylose and amylopectin) and modified starches. By modified, it is meant that the starch can be derivatized or modified by typical processes known in the art such as, e.g. esterification, etherification, oxidation, acid hydrolysis, cross-linking, and enzyme conversion. Typical modified starches include esters, such as the acetate and the half-esters of dicarboxylic acids/anhydrides, particularly the alkenyl-succinic acids/anhydrides; ethers, such as the hydroxyethyl and hydroxypropyl starches; oxidized starches, such as those oxidized with hypochlorite; starches reacted with cross-linking agents, such as phosphorus oxychloride, epichlorohydrin, hydrophobic cationic epoxides, and phosphate derivatives prepared by reaction with sodium or potassium orthophosphate or tripolyphosphate, and combinations thereof. Modified starches also include seagel, long-chain alkylstarches, dextrins, amine starches, and dialdehyde starches.

Pre-gelatinized starch-based binders can also be added to the moldable mixture. Pregelatinized starch-based binders are starches that have previously been gelated, dried, and ground back into a powder. Since pre-gelatinized starch-based binders gelate in cold water, such starch-based binders can be added to the moldable mixture to increase the mixture viscosity prior to being heated. The increased viscosity prevents settling and helps produce thicker cell walls as will be discussed later in greater detail. In such cases, the pre-gelated starch-based binder might be considered to be acting as a rheology-modifying agent.

Unmodified starch-based binders are generally preferred over modified starch-based binders because unmodified starches are significantly less expensive and produce comparable articles. These starches are very inexpensive and are often treated as a useless waste product that is discarded on a large scale. Hence, the use of unmodified starches in the present invention provides a tremendous economic advantage and a useful outlet for such previously discarded materials. Preferred starch-based binders include unmodified starches that gelate and produce a high viscosity at a relatively low temperature. For example, one preferred starch is potato starch, which quickly gelates and reaches a maximum viscosity at about 65° C. The viscosity of potato starch then decreases as the temperature is raised further. Waxy corn starch acts in a similar fashion and is also preferred. Both potato starch and waxy corn starch have a high viscosity and yield stress when gelated. The high viscosity and yield stress of the gelated starch greatly enhances the ability of the preblended mixture to disperse the fibers, as previously discussed.

The high viscosity of potato starch and waxy corn starch when gelated also aids in holding back steam to form a product having a foamed structural matrix when the moldable mixture is placed in a mold. An equation describing the velocity (V) of gas bubbles (such as steam) toward the surface of a viscous material (such as the moldable mixtures of the present invention) is set forth as follows:

$$V_t = d^2(k)/\eta$$

where d is the diameter of the bubbles, k is a constant, and η is the overall cohesion or viscosity of the material. This can be considered an inverse Stokes sedimentation equation. If the material is more cohesive or viscous, then the velocity of the bubbles toward the surface will be reduced. Also, if the bubbles are smaller, the bubbles will have less of a tendency to migrate toward the surface of the material. Thus, if the viscosity of a material is increased it has a higher capacity for holding steam inside and increasing the foaming of the moldable mixture.

Starch is the dominant water affinity component in the composition of the present invention and includes many hydroxyl groups. In a totally dry product, the hydroxyl groups of the individual starch molecules form hydrogen bonds, which creates a rigid and brittle structure. When water is added, a portion of the water is tightly bound to the starch matrix through hydrogen bonding, which is very strong force. The water associates with the hydroxyl groups on the starch, which gives elasticity and toughness to the material. The water thus acts as a plasticizer that is built into the moldable mixture of the invention.

A pure starch composition will absorb water such that, at equilibrium, the water is present in an amount of about 10–12% by weight of the composition. When inorganic aggregates and fibers are included in the starch composition, the water will be present in an amount of about 3–6% by weight at equilibrium because of the less total starch in the composition.

In order to obtain a more dense material, less starch is used whereas to obtain a less dense material more starch is needed. The viscosity of the final moldable mixture can be maintained by varying the amount of starch added and by varying the total amount of water and/or fiber. Once a product has been formed, there is a continuous film of starch and fiber throughout the foamed structural matrix. The final water content in the formed product is from about 10 to 15% by weight of the starch. The minimum amount of starch required in the composition of the present invention is about 20% by weight.

It may be preferred to combine different types of starch-based binders to regulate the foamed structural matrix. In contrast to potato starch, the viscosity of a mixture containing corn starch gradually increases as the temperature increases. Accordingly, corn starch produces a relatively low viscosity mixture compared to potato starch at 65° C., but produces a relatively high viscosity mixture compared to potato starch at 95° C. By combining both corn starch and potato starch within the same mixture, the viscosity of the mixture at the interior section of the article is increased at the point when the cells are formed. The increased viscosity decreases the cell size and increases the cell wall thickness, thereby increasing the fracture toughness of the article.

The concentration of starch-based binder within the moldable mixtures of the present invention are preferably in a range from about 10% to about 80% by weight of total solids, more preferably in a range from about 30% to about 70%, and most preferably from about 40% to about 60% by weight. Furthermore, combinations of different starches may be employed to more carefully control the viscosity of the mixture throughout a range of temperatures, as well as to affect the structural properties of the final hardened article.

B. Solvent

A solvent is added to the moldable mixture in order to lubricate the particles, solvate or at least disperse the starch-based binder, and act as an agent for gelating the starch-based binder. A preferred solvent is water, but can include any liquid that can disperse and gelate the starch-based binder and be subsequently removed from the moldable mixture.

The amount of heat energy required to remove the solvent must be great enough to overcome the boiling point of the solvent being used. Besides boiling at 100° C., water has a relatively large heat of vaporization compared to most other solvents, including alcohols. Both the boiling point and the heat of vaporization of water can be reduced through the addition of alcohol co-solvents with the water. Alcohols, such as ethanol and isopropyl alcohol, are preferable because they form lower boiling point azeotropic mixtures with water and are relatively inexpensive and readily available. Production costs may be optimized by using a mixture of water and alcohol as long as the benefits of using alcohol co-solvents, such as the savings in time and energy, are not outweighed by the increased cost of the alcohol.

The solvent also serves the function of creating a moldable mixture having the desired rheological properties, including viscosity and yield stress. These properties are general ways of approximating the "workability" or flow properties of the moldable mixture. The viscosity of the mixtures of the present invention may range from being relatively low (similar to that of a thin batter) up to being very high (similar to paste or clay). Where the viscosity is so high that the material is initially moldable and dough-like in the green state, it is generally better to refer to the yield stress, rather than the viscosity, of the mixture. The yield stress is the amount of force necessary to deform the mixture. As will be discussed later, the amount of solvent required to impart a certain viscosity and/or yield stress to the mixture is highly dependent on the packing density and specific surface area of the aggregate material. These are also dependent on the addition of admixtures, such as rheology-modifying agents and dispersants.

At a minimum, a sufficient amount of the solvent should be added to disperse and uniformly gelate the moldable mixture. The solvent content should also be sufficient to function with the processing equipment. As will be discussed below in greater detail, moldable mixtures with high viscosity and yield stress may require an auger apparatus to mix and convey the mixture to the mold. In contrast, low viscosity mixtures can use conventional mixers to combine the components and pumps to transfer the mixture.

Increasing the solvent content also increases the number and size of the cells in the structural matrix and lowers the density of the resulting article. In theory, the more solvent in a mixture, the more vapor that is produced, and thus, the more cells that are formed. Furthermore, the more solvent in a mixture, the lower the viscosity of the mixture, and thus, the larger the size of the cells. However, the more solvent added to a mixture, the more time and energy required to remove the solvent, and thus, the slower and more expensive the process. In addition, if the solvent content gets too high, the mixture may be unable to produce form-stable, crack free articles. In contrast, using low water yields a more dense product having smaller cells.

Very low viscosity mixtures can also result in settling of the components, most notably the ungelated starch-based binder and aggregate particles. Settling may occur in the mixing stage, transfer stage, or forming stage. Settling can yield articles having varying properties from batch to batch or within the structural matrix of a single article. Experiments have also found that very low viscosity mixtures can splash out of the female mold during mating with the male mold. This is especially true for shallow articles such as plates.

Based on the above discussion, the percentage of solvent in the mixture depends, in part, on the processing equipment, the desired viscosity, and the desired properties. The amount of water that is added to the mixtures of the present invention will preferably be in a range from about 15% to about 80% by total weight of the mixture, the exact amount depending on the desired viscosity of the moldable mixture.

As stated above, the viscosity of the moldable mixture is dependent on several variables such as the water content, the presence of admixtures such as rheology-modifying agents and dispersants, whether the starch-based binder has been pre-cooked, and the packing density of the aggregate. Functional articles can be made from moldable mixtures having a large range of viscosities, from as low as about 0.05 Pa·s to as high as about $10^{10}$ Pa·s. Low viscosity mixtures can be poured into the molding apparatus while high viscosity mixtures may be placed into the molds by auger or piston insertion. Furthermore, high viscosity mixtures having a consistency similar to that of clay or dough can be cut into small portions, which can then be mechanically placed between the molds.

In general, the moldable mixtures of the present invention will preferably have a viscosity in a range from about 2 Pa·s to about 10,000 Pa·s, and more preferably from about 100 Pa·s to about 2,000 Pa·s at a shear rate of 1 $s^{-1}$. The rheology of the moldable lo mixtures may also be described in terms of yield stress, which will preferably be greater than about 100 Ps, more preferably greater than about 400 Pa.

C. Aggregates

The terms "aggregate" and "fillers" as used in the specification and the appended claims include both inorganic and inert organic particles but do not typically include fibers. The term "inert organic particles" is further defined to include organic components that are not intended to primarily chemically or mechanically act as a binding agent within the moldable mixture. Examples of inert organic particles include seeds, grains, cork, and plastic spheres. Although most aggregates within the scope of the present invention are insoluble in water, some aggregates are slightly soluble in water, and some aggregates can be formed in situ by precipitation or polymerization. (However, many seeds contain starch, proteins, or other polymeric materials in high enough quantities that they may be released into the moldable mixture and impart a binding force within the mixture.)

Although inorganic fillers are generally optional, articles with a high filler or aggregate content will usually have a lower cost, improved mechanical and structural properties, better health safety, and smaller environmental impact. Studies have found that functional articles of the present invention can be made using no fliers at all or up to about 80% by weight of the final article.

From a materials cost stand point, it is more economical to replace the relatively expensive starch-based binder with a less expensive aggregate. Typically, the density and weight of an article increase with increased filer. As the density of the mixture increases, the volume of material used to make the article also increases. For example, holding all other variables constant, a 40% increase in the concentration of calcium carbonate results in about a 30% savings in the consumption of starch-based binder. It is believed that as the percentage of flier increases, however, the ability of the cells within the starch-bound matrix to expand is decreased, thereby increasing the density and requiring more material to make the same article. Nevertheless, even with the increase in density, it may be more economical to produce articles having a higher filler content compared to those having a relatively low filer content.

Increasing the filler is also beneficial from a processing standpoint. Starch has a natural affinity for water (the most common solvent used). Accordingly, more energy is required to remove water from the starch-based binder than from a filler. By increasing the filler content, there is less starch-based binder to absorb the water and less water is needed to gelate the starch-based binder. Furthermore, more of the water is absorbed by the filler. Accordingly, processing costs are decreased by using high concentrations of filler, since less solvent, time, and energy is required to produce a form-stable article. Furthermore, the inorganic aggregate can also be used as a means for conducting heat quicker and more uniformly throughout the entire structural matrix. As a result, form-stable articles can be made quicker and with a more uniform cross-section. The ability of the aggregate to conduct heat is, of course, a function of the type of aggregate and can be selected by those skilled in the art.

By selecting an appropriate filler, the specific heat of the final article can also be decreased. For example, articles made with calcium carbonate were found to have a lower specific heat than those that contain only starch. As a result, such articles can be used for heating up food or other items without significantly heating up the article. For example, the present articles can be used for heating up or cooking food in an oven or microwave without destruction of the article. By selecting fillers with low specific heat, the articles of the present invention can be made having a specific heat in a range from about 0.3 J/g·K to about 2.0 J/g·K at a temperature of 20° C., with about 0.5 J/g·K to about 1.5 J/g·K being more preferred, and about 0.7 J/g·K to about 1.0 J/g·K being most preferred.

Increasing the filler content is also beneficial in varying the shape of the structural matrix of the article. As previously discussed, if insufficient moisture is removed from the mixture during formation of the article, the remaining solvent can cause the mixture to stick to the mold and may also cause the article to crack or bubble. Likewise, the article can also crack if too much moisture is removed from the mixture. There is, therefore, a margin of time (dependent on variables such as the heat of the molds and amount of solvent in the mixture) within which the articles should be removed from the heated molds to prevent cracking or sticking of the articles. This margin of time becomes narrower as the concentration of starch-based binder within a moldable mixture is increased. As the margin of time for removal of the article from the mold decreases, it becomes more difficult to manufacture articles having cross-sections of varying thicknesses.

In contrast, studies have found that as the percentage of inorganics increases and the percentage of starch-based binder decreases, the margin of time in which the articles can be removed form the molds without sticking or cracking increases. As a result, articles having a high concentration of inorganics can be used to more effectively manufacture articles having varying cross-section thickness. Articles have been made in which the thickness of the article varies by a factor of three.

There are also health benefits to using higher concentrations of filler. Increasing the amount of aggregate or filler in a mixture decreases the mount of water that must remain within the structural matrix to impart the desired level of flexibility. Minimizing the mount of water in an article is preferred since it minimizes the chance for bacterial growth. Accordingly, increasing the filler content decreases the required moisture content in the final product, as well as the propensity of the article to absorb even more water from the atmosphere over time.

By selecting the type of filler used, the properties of the filler can be transferred to the finished article. The aggregate materials employed in the present invention can be added to increase the strength (tensile modulus and, especially, compressive strength), increase the modulus of elasticity and elongation, decrease the weight, and/or increase the insulation ability of the resultant inorganically filled article. In addition, plate-like aggregates having flat surfaces, such as mica, talc, dolomite, and kaolin, can be used in order to create a smoother surface finish in the articles of the present invention. Typically, larger aggregates, such as calcium carbonate, give a matte surface, while smaller particles give a glassy surface.

Finally, there are also environmental benefits to having a high filler content. Articles with a high filler content are more easily decomposed back into their natural components, thereby minimizing visual blight. Furthermore, minimizing the starch-based binder reduces the mount of starch that is consumed from starch-bearing plants or that must be recycled or composted upon discarding a disposable article.

Particle packing is a preferred process that can be used to maximize the mount of inorganics within the mixture and thus optimize the above discussed properties. Studies have found that the packing density of a mixture is increased where two or more types of aggregate having a difference in their average particle size diameter are used. Particle packing is the processes of selecting different sizes, shapes, and concentration of the aggregates to minimize the interstitial space between the particles and maximize the packing density. By minimizing the interstitial space, less solvent and starch-based binder needs to be added to the mixture to fill the interstitial space.

To form an article having a more form-stable, crack-free structural matrix, the starch-based binder must usually be added in an amount sufficient to bind the aggregate together. The volume of solvent and starch-based binder that remains within the final molded article must be sufficient to coat the aggregate particles and fill the interstitial voids between the particles so that the starch-based binder can bind the aggregate particles together. If insufficient quantities of the starch-based binder are added, minute pores can form between the aggregate particles. These minute pores are different from the cells which are preferably designed within the structural matrix. Whereas the cells result from the expansion of the solvent during the processing step, the pores result from an insufficient amount of starch-based binder to bind the aggregate particles together. If the volume of starch-based binder is further decreased, the volume of the binder becomes so minute that either the structural matrix will crack during the formation process or the mixture will never consolidate into a form-stable article.

The ability of the starch-based binder to hold the aggregate particles together is a function of its intrinsic bond strength, covering power, and its ability to bond with the surface of a particular material. In the manufacture of articles in which a binder matrix holds together a very large concentration of matter, the binder preferably envelops each of the matter particles.

The volume of starch-based binder required to fully envelope the aggregate particles is related to the volume of interstitial space between the particles. The volume of interstitial space increases in a mixture as either the packing density of the aggregate decreases or the percentage of the aggregate in the mixture increases. Accordingly, by holding the concentration of starch-based binder and aggregate constant by weight of the solids within a mixture and decreasing the packing density of the aggregate, the interstitial space will increase to a point in which the volume of starch-based binder is insufficient to adequately fill the interstitial space. Likewise, by adding a higher concentration of aggregates, although the percentage of interstitial space remains relatively constant, the total volume of interstitial space increases. As a result, more starch-based binder must be added to the mixture to adequately fill the spaces. As more starch-based binder is added, however, the concentration of inorganics decreases in the final articles, thereby increasing the cost and minimizing the above discussed benefits.

In contrast, as the packing density of the aggregate increases, the interstitial space between the particles decreases. As a result, less starch-based binder and solvent are needed to fill the interstitial space. By decreasing the mount of starch-based binder to only the minimum mount needed to bind the aggregate particles and impart the desired physical properties, the percentage of inorganics in the final articles may be increased without sacrificing the desired strength and rheological properties. As such, the cost of the articles is decreased and the above discussed properties are enhanced.

The volume of starch-based binder required is also dependent on the size and shape of the aggregate. Aggregates having a large specific surface area compared to aggregates of equal volume having a small specific surface area require more starch-based binder to coat the particles. Coating the aggregate with the gelated starch-based binder is necessary to bind the aggregate together. In addition, the greater specific surface area utilizes more of the available water within the mixture in the coating of the particle surfaces, resulting in less water being available to react with and gelate the starch.

Accordingly, in order to maximize the inorganics and minimize the volume of starch-based binder, it is preferable for the aggregates to have a smaller specific surface area. The highly inorganically filled articles of the present invention preferably employ aggregates having a specific surface area in a range from about 0.1 $m^2/g$ to about 400 $m^2/g$, with about 0.15 $m^2/g$ to about 50 $m^2/g$ being more preferred, and about 0.2 $m^2/g$ to about 2.0 $m^2/g$ being most preferred. Particles having a relatively small specific surface area typically have a large average diameter and are spherical in shape.

The following illustrates how increasing the packing density decreases the amount of solvent and starch-based binder needed to fill the interstitial space. If the particle packing density of the moldable mixture is 0.65, a solvent will be included in an amount of roughly 35% by volume in order to substantially fill the interstitial voids between the particles. On the other hand, a moldable mixture having a particle-packing density of 0.95 will only require solvent in an amount of about 5% by volume in order to substantially fill the interstitial voids. This is a seven-fold decrease in the amount of solvent which must be added in order to substantially fill the interstitial voids. Reducing the amount of solvent that would otherwise be required to fill the interstitial space permits the articles to be made more quickly and with a lower energy consumption.

In order to optimize the packing density, differently sized aggregates with particle sizes ranging from as small as about 0.05 µm to as large as about 2 mm may be used. To maximize the strength of the cell walls, it is preferred that the particles not be greater than ¼ the thickness of the cell walls. Spherical particles having minimal fractured surfaces are preferred since they can be packed to a higher density and have the lowest specific surface area. In order to obtain an optimized level of particle packing, it is preferable for the average particle size within one size range to be roughly 10 times the particle size of the next smallest particle range. (In many cases, the ratio will differ and is dependent on the relative natural packing densities of the different aggregates to be combined.) For example, in a two-component system, it will be preferable for the average particle size of the coarse component to be at about 10 times the average particle size of the fine component. Likewise, in a three-component system, it will be preferable for the average particle size of the coarse component to be about 10 times the average particle size of the medium component, which will likewise preferably be about 10 times the size of the free component. Nevertheless, as more differently sized particles are added, the ratio between the particle size magnitudes need not always be this great and may only be two-fold in some cases.

In a preferred embodiment, the aggregate are selected to obtain a desired packing density based on the particle packing process as disclosed in the following article coauthored by one of the inventors of the present invention: Johansen, V. & Andersen, P. J., "Particle Packing and Concrete Properties," *Materials Science of Concrete II* at 111–147, The American Ceramic Society (1991). Further information is available in the Doctoral Dissertation of Anderson, P. J., "Control and Monitoring of Concrete Production—A Study of Particle Packing and Rheology," The Danish Academy of Technical Sciences. The preferred process of particle packing is also discussed in detail in U.S. patent application Ser. No. 08/109,100, entitled "Design Optimized Compositions and Processes for Microstructurally Engineering Cementitious Mixtures", to Per lust Andersen and Simon K. Hodson, filed on Aug. 18, 1993. For purposes of disclosure, the foregoing article, doctoral dissertation, and patent application are incorporated herein by specific reference.

There are a variety of types of aggregates that can be used in the present invention. Inorganic materials commonly used in the paper industry, as well as more freely ground aggregate materials used in the concrete industry, may be used in the moldable mixtures of the present invention. The size of the aggregate or inorganic filler will usually be many times greater than the inorganic filler materials typically used in the paper industry.

Examples of useful aggregates include perlite, vermiculite, sand, gravel, rock, limestone, sandstone, glass beads, aerogel, xerogels, seagel, mica, clay, synthetic clay, alumina, silica, fly ash, fused silica, tabular alma, kaolin, microspheres, hollow glass spheres, porous ceramic spheres, gypsum (calcium sulfate dihydrate), calcium carbonate, calcium aluminate, lightweight polymers, xonotlite (a crystalline calcium silicate gel), lightweight expanded clays, hydrated or unhydrated hydraulic cement particles, pumice, exfoliated rock, and other geologic materials. Even discarded inorganically filled materials, such as discarded containers or other articles of the present invention can be employed as aggregate fillers and strengtheners. It will also be appreciated that the containers and other articles of the present invention can be easily and effectively recycled by simply adding them to fresh moldable mixtures as an aggregate filler.

A dry-milled calcium carbonate is a preferred inorganic aggregate, since it can be obtained at one-third the cost of calcium carbonate obtained through wet-milling. A preferred calcium carbonate is R040, which has a particle size range from about 10 to 150 microns, with an average particle size of about 42 microns, and a low specific surface area. Both clay and gypsum are particularly important aggregate materials because of their ready availability, extreme low cost, workability, ease of formation, and because they can also provide a degree of binding and strength if added in high enough amounts (in the case of gypsum hemihydrate). Because gypsum hemihydrate can react with the water within the moldable mixture, it can be employed as a means for hardening, or at least increasing the form stability of, the moldable mixture.

Gypsum is also a useful aggregate material since it does not affect the starch-water reactions in the compositions of the invention. Gypsum dehydrates when heated to about 190° C. to form the hemihydrate. Upon hydrating, it can harden into a rigid structure depending on its concentration, thereby imparting delayed, but additional, binding strength to the final product. Other potential binders such as hydraulic cement or Tylose® are not preferred because they disrupt the gelation reaction between starch and water.

In some cases, it may be desirable to form ettringite on the surface of the aggregate particles in order to improve the interaction and bond interface between the aggregate particles and the starch-based binder.

Because of the nature of the moldable mixtures and articles made therefrom, it is possible to include lightweight aggregates having a high amount of interstitial space in order to impart an insulation effect within the molded articles. Examples of aggregates which can add a lightweight characteristic and higher insulation to the molded articles include perlite, vermiculite, glass beads, hollow glass spheres, synthetic materials (e.g., porous ceramic spheres, tabular alumina, etc.), cork, pumice, and lightweight expanded clays, sand, gravel, rock, limestone, sandstone, and other geological materials.

Porous aggregates can also be used to remove unwanted air bubbles from the article during formation. Solvents escape from the moldable mixture by first traveling to the surface of the molds and then traveling along the mold surface to the vent holes. At times, air bubbles get trapped between the male mold and the outside surface of the article, thereby pocking the surface. A porous aggregate within the moldable mixture can be used to absorb a significant portion of this entrapped gas, thereby helping to reduce the incidence of pocking. Of course, the entrapped gas bubbles can be removed through the application of a vacuum.

Porous, lightweight aggregates, including zeolites, can be used as a means for conditioning the article during the forming process. Porous aggregates can be presoaked in a solvent or held in the mixture for a sufficient period of time to absorb the solvent. As the mixture containing the presoaked aggregate is heated to form the article, the solvent is released more slowly from within the porous aggregate than from the remainder of the mixture. As a result, a portion of the solvent will remain within the porous aggregate in the form-stable article. Once the article is formed and removed from the heated molds, the solvent within the porous aggregate can diffuse into the surrounding structural matrix, thereby conditioning and softening the structural matrix.

Another class of aggregates that may be added to the inorganically filled mixture includes gels and microgels such as silica gel, calcium silicate gel, aluminum silicate gel, and the like. These can be added in solid form as any ordinary aggregate material might, or they may be precipitated in situ. Because they tend to absorb water, they can be added to reduce the water content (which will increase the viscosity and yield stress) of the moldable mixture.

In addition, the highly hygroscopic nature of silica-based gels and microgels allows them to be used as moisture regulation agents within the final hardened article. By absorbing moisture from the air, the gels and microgels will cause the articles to retain a predetermined amount of moisture under normal ambient conditions. (Of course, the rate of moisture absorption from the air will correlate with the relative humidity of the air). Controlling the moisture content of the articles allows for more careful control of the elongation, modulus of elasticity, bendability, foldability, flexibility, and ductility of the articles.

It is also within the scope of the present invention to include polymerizable inorganic aggregate materials, such as polymerizable silicates, within the moldable mixture. These may be added to the mixture as ordinary silica or silicates, which are then treated to cause a polymerization reaction in situ in order to create the polymerized silicate aggregate. Polymerized inorganic aggregates are often advantageous in certain applications because of their increased flexibility compared to most other inorganic aggregate materials.

The thermal conductivity or "k-factor" (defined as W/m·K) of the present articles can be selected by controlling the foamed structural matrix. Articles can be made having a low k-factor by having a higher concentration of cells within the structural matrix. In embodiments in which it is desirable to obtain a container or other article having an even higher insulation capability, it may be preferable to incorporate into the highly inorganically filled matrix a lightweight aggregate which has a low thermal conductivity. Generally, aggregates having a very low k-factor also contain large amounts of trapped interstitial space, air, mixtures of gases, or a partial vacuum which also tends to greatly reduce the strength of such aggregates. Therefore, concerns for insulation and strength tend to compete and should be carefully balanced when designing a particular mixture.

Preferred insulating, lightweight aggregates include expanded or exfoliated vermiculite, perlite, calcined diatomaceous earth, and hollow glass spheres—all of which tend to contain large amounts of incorporated interstitial space. However, this list is in no way intended to be exhaustive, these aggregates being chosen because of their low cost and ready availability. Nevertheless, any aggregate with a low k-factor, which is able to impart sufficient insulation properties to the container or other article, is within the scope of the present invention. In light of the foregoing, the amount of aggregate which can be added to the moldable mixture depends on a variety of factors, including the quantity and types of other added components, as well as the particle packing density of the aggregates themselves. By controlling the cellular structure and the addition of lightweight aggregate, articles can be made having a preferred k-factor in a range of about 0.03 W/m·K to about 0.2 W/m·K. Insulating articles can have a more preferred k-factor in a range of about 0.04 W/m·K to about 0.06 W/m·K. Non-insulating articles can have a more preferred k-factor in a range of about 0.1 W/m·K to about 0.2 W/m·K.

The inorganic aggregates may be included in an amount in a range from about 0% to about 80% by weight of the total solids within the inorganically filled moldable mixture, with the preferred amount depending on the desired proper times of the final molded article and/or the desired rheology of the moldable mixture. If included, inert organic aggregates will preferably be included in an amount in a range from about 5% to about 60% by weight of the total solids. If included lightweight aggregates, defined as those having a density lower than about 1 g/cm³, are preferably included in an amount in a range from about 5% to about 85% by volume of the inorganically filled moldable mixture.

D. Fibers

As used in the specification and the appended claims, the terms "fibers" and "fibrous materials" include both inorganic fibers and organic fibers. Fibers have successfully been incorporated into brittle materials, such as ceramics, to increase the cohesion, elongation ability, deflection ability, toughness, fracture energy, and flexural, tensile, and, on occasion, compressive strengths of the material. In general, fibrous materials reduce the likelihood that the highly inorganically filled containers or other articles will shatter when cross-sectional forces are applied.

As was previously discussed, the formed articles of the present invention have a foamed or cellular structural matrix. As a result, there is a limited amount of interfacial surface area for load transfer between the fibers and structural matrix. That is, the fibers are connected to the structural matrix of the formed articles only by the walls dividing the cells, with the remainder of the fibers suspended in the cells. When short fibers are used, these can be small enough to reside within the cell completely. As a result of the minimal contact between the short fibers and the structural matrix of the article, only a limited portion of the properties of the short fibers are incorporated into the structural matrix. Therefore, long fibers having a length of greater than about 2 mm are preferred for use in the present invention. In general, it is preferable to include fibers that have an average length that is at least twice the wall thickness of the article, and preferably up to 10 times greater or more.

Fibers that may be incorporated into the inorganically filled matrix preferably include naturally occurring organic fibers, such as cellulosic fibers extracted from hemp, cotton, plant leaves, sisal, abaca, bagasse, wood (both hardwood or softwood, examples of which include southern hardwood and southern pine, respectively), or stems, or inorganic fibers made from glass, graphite, silica, ceramic, or metal materials.

Recycled paper fibers can be used, but they are somewhat less desirable because of the fiber disruption that occurs during the original paper manufacturing process. Any equivalent fiber, however, which imparts strength and flexibility is also within the scope of the present invention. The only limiting criteria is that the fibers impart the desired properties without adversely reacting with the other constituents of the inorganically filled material and without contaminating the materials (such as food) stored or dispensed in articles made from the material containing such fibers. For purposes of illustration, sisal fibers are available from International Filler, abaca fibers are available from Isarog Inc. in the Philippines, while glass fibers, such as Cemfill®, are available from Pilkington Corp. in England.

Studies have found that fibers having a relatively higher diameter or width are more effective in increasing the energy to failure and the displacement to failure. For example, sisal fibers having an average diameter of about 100 μm were far more effective in increasing the above properties than the wood fibers having an average diameter of 10 μm. The addition of the sisal fibers also dramatically decreased the stiffness in the dry cups.

Larger diameter fibers result in less surface area than small diameter fibers of equal volume. As the exposed surface area of the fiber decreases, less solvent is adsorbed by the fibers, and, accordingly, the solvent is removed quicker with less energy. The fibers used in the present invention preferably have an average diameter in a range from about 10 μm to about 100 μm, with about 50 μm to about 100 μm being more preferred, and about 75 μm to about 100 μm being most preferred. Furthermore, the fibers should have an average aspect ratio (length-to-width ratio) of at least about 10:1.

The fibers are added to the composition of the present invention to increase the strength and flexibility of the final product. The fibers aid in forming a tough skin on the outside of the product by increasing the flexibility of the skin. The fiber content is uniform throughout the foamed structural matrix of the final product, but appears higher in the skin because the skin is higher in density than the foamed interior portion. Also, a certain amount of fibers could migrate toward the surface as the product is forming since the interior portion stays fluid longer than the skin portion.

The aspect ratio (length/diameter) of the fibers is an important feature, with a higher average aspect ratio being preferred. The fibers preferably have an average aspect ratio of about 40:1 to about 2500:1, and preferably about 200:1 to about 500:1. The total length of the fibers is also important, with longer fiber lengths preferred in the present invention. Long fibers that are useful generally preferably have an average length greater than about 1.5 mm, and more preferably greater than about 2 mm and up to about 25 mm in length. The diameter of the fibers can be about 10 microns to about 50 microns. Long fibers have a much greater tendency of being in contact with the structural matrix of the formed articles.

While shorter fibers of less than about 1.5 mm can also be used, these are less preferred in the present invention. Short fibers, particularly of less than about 0.5 mm in length, do not work as well because of their high specific surface area, which absorbs a lot of moisture, and, especially, their inability to provide increased strength due to inadequate anchoring to the shorter fibers within the starch-bound cellular matrix. The high specific surface area of short fibers interferes with the water-starch interaction during processing of the moldable mixture by taking water away from the starch. In addition, the pore size in the foamed structural matrix of the formed articles is about 0.25 mm, so when short fibers are used, the fibers will only expand across a few of the pores. Thus, short fibers would not contribute to strengthening of the product, but can be used as a filler material if desired and are preferably used in combination with long fibers.

Particularly preferred fibers include softwood fibers from dry pulp sheets that have an average fiber length of about 3.5 mm, and abaca fibers with an average fiber length of about 6.5 mm. The number of fibers per unit volume will increase for fibers having smaller diameters when compared to fibers of the same length with larger diameters. Having an increased number of fibers per unit volume is preferred to provide increased strength to the formed articles, and longer fibers provide more toughness than the same volume percent of shorter fibers.

The fibers used in the composition of the invention have very specific effects on the moldable mixture and foamed articles formed therefrom. There is a toughening effect that can be measured by peak load, Young's modulus, strain, and fracture energy. Numeric examples of these properties are given for compositions of the invention hereafter under the Examples section. The fibers also have a rheological effect on the compositions related to yield stress and viscosity. The addition of fibers increases the yield stress and the viscosity since more energy is needed to get the moldable mixture to flow.

The fibers also allow an increased or decreased time of the mixture in a mold without damaging effects such as cracking of the material. Even if all of the water is taken out of the mixture during molding by overbaking, the fibers will prevent cracking of the formed structural matrix, since the fibers reinforce the entire matrix even while sitting in the mold and prevent the product from shrinking. The moldable mixture can also be underbaked without damage to the product. Underbaking leaves some of the water in the formed article so that a subsequent conditioning step is not necessary. Furthermore, when the mold is opened after a shorter baking time, the formed product can withstand the stresses of the release of steam because of the internal strength provided by the fibers. Fibers aid in the ability of the final demolded article to maintain an appropriate amount of water so that the product is not brittle and can be handled without cracking. The fibers make the final product much more resilient and allow the product to be handled straight out of the mold with little or no damage. The fibers will also absorb a certain amount of moisture that can later be released into the starch-bound structural matrix of a formed article.

In addition, the fibers allow a change in water content in order to change the density of the final product, whereas pure starch materials do not have this ability. The water works as a foaming agent, so if more water is added to the moldable mixture, more foam will be created and the final product will be less dense. If less water is used, then less foam will be created and the final product will be more dense. Thus, the density of the final product can be changed just by varying the amount of water in the moldable mixture. The fibers increase the working range of the water in the moldable mixture by increasing the viscosity thereof, which in turn allows for use of larger amounts of water while maintaining adequate post-molding strength.

The amount of fibers added to the moldable mixture will vary depending upon the desired properties of the final product. The flexural strength, toughness, flexibility, and cost are the principle criteria for determining the amount of fiber to be added in any mix design. The concentration of fibers within the final hardened article will preferably be in the range from about 2% to about 40% by weight of the total solids content, more preferably from about 5% to about 30% by weight, and most preferably from about 10% to about 20% by weight.

Fiber strength is a consideration in determining the amount of the fiber to be used. The greater the flexural strength of the fiber, the less the amount of fiber that must be used to obtain a given flexural strength in the resulting article. Of course, while some fibers have a high flexural, tear and burst strength, other types of fibers with a lower flexural strength may be more elastic. A combination of two or more fibers may be desirable in order to obtain a resulting product that maximizes multiple characteristics, such as higher flexural strength, higher elasticity, or better fiber placement.

It should also be understood that some fibers, such as southern pine and abaca, have high tear and burst strengths, while others, such as cotton, have lower strength but greater flexibility. In the case where better placement, higher flexibility, and higher tear and burst strength are desired, a combination of fibers having varying aspect ratios and strength properties can be added to the mixture.

It is known that certain fibers and inorganic fillers are able to chemically interact with and bind with certain starch-based binders, thereby adding another dimension to the materials of the present invention. For example, it is known that many fibers and inorganic fillers are anionic in nature and have a negative charge. Therefore, in order to maximize the interaction between the starch-based binder and the anionic fibers and inorganic materials, it may be advantageous to add a positively charged organic binder, such as a cationic starch.

Better water resistance can be obtained by treating the fibers with rosin and alum ($Al_2(SO_4)_3$) or $NaAl(SO_4)_2$, the latter of which precipitates out the rosin onto the fiber surface, making it highly hydrophobic. The aluminum floe that is formed by the alum creates an anionic adsorption site on the fiber surface for a positively charged organic binder, such as a cationic starch.

Finally, the fibers may be coated with a variety of substances in order to improve the desired properties of the final product. For example, the fibers may be coated in order to make them more resistant to water absorption. In addition, ettrigite can be formed on the surface of the fibers in order to improve the interaction or interface between the fibers and the starch-based binder.

E. Mold-Releasing Agents

To assist in removing the form-stable article from the molds, a mold-releasing agent can be added to the moldable mixture. Medium- and long-chain fatty acids, their salts, and their acid derivatives can be used as mold-releasing agents. The preferred medium and long chain fatty acids typically occur in the production of vegetable and animal fats and have a carbon chain greater than $C_{12}$. The most preferred fatty acids have a carbon chain length from $C_{16}$ to $C_{18}$. The fats and salts used herein need not be in a pure form but merely need to be the predominant component. That is, the shorter or longer chain length fatty acids, as well as the corresponding unsaturated fatty acids, can still be present.

Preferred mold-releasing agents for use in the present invention include stearates, which have hydrophobic properties and are not soluble in water. Stearates are salts of stearic acid and have the general formula of $CH_3(CH_2)_{16}COO^-X^+$, where $X^+$ can be an ion of At, Mg, Na, K, or Ca. Stearates have specific melting points that vary depending on what salt is used. Aluminum stearate is one preferred mold release agent that has been approved by the FDA. Aluminum stearate has a lower melting point of 110° C. and gives a smoother surface finish to a formed article. On the other hand, zinc stearate is a health hazard and should be avoided, especially when forming food or beverage containers. Generally, a lower melting point or increased mount of stearate will give a smoother surface to a formed article.

Stearates are grease repellant or resistant, allow the baking time of a product to be reduced, give a better surface content, provide heat transfer, and produce a continuous phase. When a clean mold is used to form products, a seasoning process takes place by using the stearates in the composition to be formed. The formed products improve in their surface finish appearance with each molding during the first few runs. It appears that the stearates on the surface of the product are getting transferred to the mold surface during the first few rims to provide the seasoning effect to the mold.

Silicones can also be used as mold releasing agents. Lecithin, which is a mixture of phosphatides and glycerides, can contribute to lessening of the stickiness of the moldable mixture, providing mold releasing properties, and can improve the flexibility of the formed articles.

Various waxes such as paraffin and bees wax, and Teflon-based materials can also be used as mold-releasing agents. One of the added benefits of using wax is that it can also act as an internal coating material, as discussed later. Other materials, such as CaS, calcium silicate and Lecithin, have also been found to work as mold-releasing agents. To further assist in releasing the articles from the molds, the molds can be polished, chrome plated, or coated with, e.g., nickel, Teflon, or any other material that limits the tendency of the articles to stick to the molds.

The above mold-releasing agents are preferably added to the mixture in a range from about 0.05% to about 15% by weight of the total solids, more preferably in a range from about 0.1% to about 10% by weight, and most preferably in a range from about 0.5% to about 1% by weight. It is preferred to use a smaller mount of mold-releasing agents since agents such as stearates are generally very expensive.

F. Rheology-Modifying Agents

Rheology-modifying agents can be added to increase the viscosity or cohesive nature of the moldable mixture in the case where large mounts of water are included relative to the mount of starch-based binder used to form the preblended mixture. As previously discussed, increasing the viscosity decreases the size of the cells and increases the size of the cell walls within the structural matrix. Increasing the viscosity also prevents the natural tendency of the aggregates and starch-based binder particles to settle within a less viscous mixture. As a result, during the time period between the preparation and heating of the mixture to the point of gelation, the aggregate and any ungelated starch granules may begin to settle, thereby producing an article having non-uniform properties. Depending on the density of the aggregate, one of ordinary skill in the art can select the type and mount of rheology-modifying agent to be added to the mixture to prevent settling. Nevertheless, it is generally preferred to include an mount of rheology-modifying agent that will not substantially interfere with the gelation of the starch-bound binder.

A variety of natural and synthetic organic rheology-modifying agents may be used which have a wide range of properties, including viscosity and solubility in water. Suitable rheology-modifying agents include cellulose-based materials such as methylhydroxyethylcellulose, hydroxymethylethylcellulose, carboxymethylcellulose, methylcellulose, ethylcellulose, hydroxyethylcellulose, hydroxyethylpropylcellulose, hydroxypropylmethylcellulose, etc. The entire range of possible permutations is enormous and shall not be listed here, but other cellulose materials which have the same or similar properties as these would also work well.

Other natural polysaccharide-based rheology-modifying agents include, for example, alginic acid, phycocolloids, agar, gum arabic, guar gum, locust bean gum, gum karaya, and gum tragacanth. Suitable protein-based theology-modifying agents include, for example, Zein® (a prolamine derived from corn), collagen (derivatives extracted from animal connective tissue such as gelatin and glue), and casein (the principle protein in cow's milk).

Finally, suitable synthetic organic rheology-modifying agents that are water dispersible include, for example, polyvinyl pyrrolidone, polyethylene glycol, polyvinyl alcohol, polyvinylmethyl ether, polyacrylic acids, polyacrylic acid salts, polyvinyl acrylic acids, polyvinyl acrylic acid salts, polyacrylamides, ethylene oxide polymers, polylactic acid, and latex (which is a broad category that includes a variety of polymerizable substances formed in a water emulsion; an example is styrene-butadiene copolymer). Synthetic organic polymers, especially the polyvinyl compounds, are also used as film binders to produce a hydrophobic surface on the starch-based binder. The hydrophobic surface slows down the rate of water absorption by the starch-based binder in the mixing process, thereby permitting quicker formation of form-stable articles.

G. Dispersants

The term "dispersant" shall refer in the specification and the appended claims to the class of materials which can be added to reduce the viscosity and yield stress of the moldable mixture. A more detailed description of the use of dispersants may be found in the Master's Thesis of Andersen, P. J., "Effects of Organic Superplasticizing Admixtures and their Components on Zeta Potential and Related Properties of Cement Materials" (The Pennsylvania State University Materials Research Laboratory, 1987). For purposes of disclosure, the foregoing Master's Thesis is incorporated herein by specific reference.

Dispersants generally work by being adsorbed onto the surface of the aggregate particles and/or into the near colloid double layer of the particles. This creates a negative charge on or around the surfaces of the particles causing them to repel each other. This repulsion of the particles adds "lubrication" by reducing the friction or attractive forces that would otherwise cause the particles to have greater interaction. This increases the packing density of the material somewhat and allows for the addition of less solvent while maintaining the workability of the moldable mixture. Dispersants can be used to create low viscosity, workable mixtures having a low concentration of solvent. Such mixtures are suited for the production of high density articles.

H. Other Admixtures

A variety of other components can be added to the moldable mixture to impart desired properties to the final article. For example, enzymes such as carbohydrase, amylase, and oxidase produce holes in the surface of starch granules permitting the starch-based binder to gelate faster in the case where ungelated starch is used. As a result, the viscosity of the mixture increases at a faster rate, thereby producing articles with a stronger and more uniform cell structure.

Articles can initially be formed having a desired flexibility (as opposed to obtaining flexibility through the use of a humidity chamber) by adding components that will tightly bind the water within the starch molecules. This can be achieved with the addition of humectants or deliquescent chemicals, such as $MgCl_2$, $CaCl_2$, NaCl, or calcium citrate. Because all of these chemicals are readily water soluble, they are able to distribute and retain water within the starch molecules to provide a more uniform distribution of moisture. In turn, the moisture improves flexibility.

Flexibility can also be obtained by adding softeners or plasticizers to the moldable mixture. Such plasticizers include Polysorbate 60, SMG, mono and diglycerides and distilled monoglycerides. Other specialized plasticizers having a boiling point above the maximum temperature reached by the mixture during the forming process can also be used. These chemicals, which include polyethylene glycol (below 600 MW), glycerin, and sorbitol, tend to take the place of water and function as plasticizers with moisture as low as 5%. They are believed to attach themselves to the hydroxyl groups of starch molecules and form a hinge-like structure. Since the plasticizers do not vaporize during the forming process, they remain within the form-stable article, thereby softening the starch-bound matrix. Internal coating materials that generally have a melting point above the boiling point of superheated water within the molded article, but below the maximum temperature achieved at or near the surface of the molded article while in the mold can be used. These include waxes, polylactic acid, shellac, or other polymers. In addition, internal sealing materials such as polyvinyl alcohol and latexes can be added to generally make the cellular matrix more water resistant.

Finally, cross-linking admixtures such as dialdehydes, methylureas, and melamine formaldehyde resins can be added to the mixture to produce a less water soluble starch-based binder. The cross-linking admixtures bind to the hydroxyl ions of the starch-based binder, which slow down the water reabsorption rate of the starch-based binder. As a result, the final articles obtain form stability at a faster rate, have higher strength, and are able to retain liquids longer before failure (e.g., a cup can hold water longer before it starts to leak).

The above-listed admixtures are typically added in a range between about 0.5% to about 15% by weight of the total solids in the mixture, or preferably about 1% to about 10%, and more preferably from about 1% to about 5%.

V. PROCESSING APPARATUS, CONDITIONS, AND RESULTS

The articles of manufacture of the present invention are produced through a multistep process. The steps include preparing the mixture, forming the mixture into the desired articles, and optionally conditioning the resulting articles. Additional steps can selectively include the printing, coating, and packaging of the final articles. The apparatus used in the processing steps are discussed below. The inventive articles can be prepared using conventional equipment well known to those skilled in the arts of polystyrene foam, paper, plastic, cement, and edible wafers. The equipment, however, must be uniquely combined and arranged to form a functional system that can manufacture the present articles. Furthermore, slight modification of the equipment may be required to optimize production of the articles. The arrangement, modification, and operation of the equipment needed to manufacture the inventive articles can be performed by those skilled in the art of using the conventional equipment in light of the present disclosure.

A. Preparing the Mixture

Figure 4:
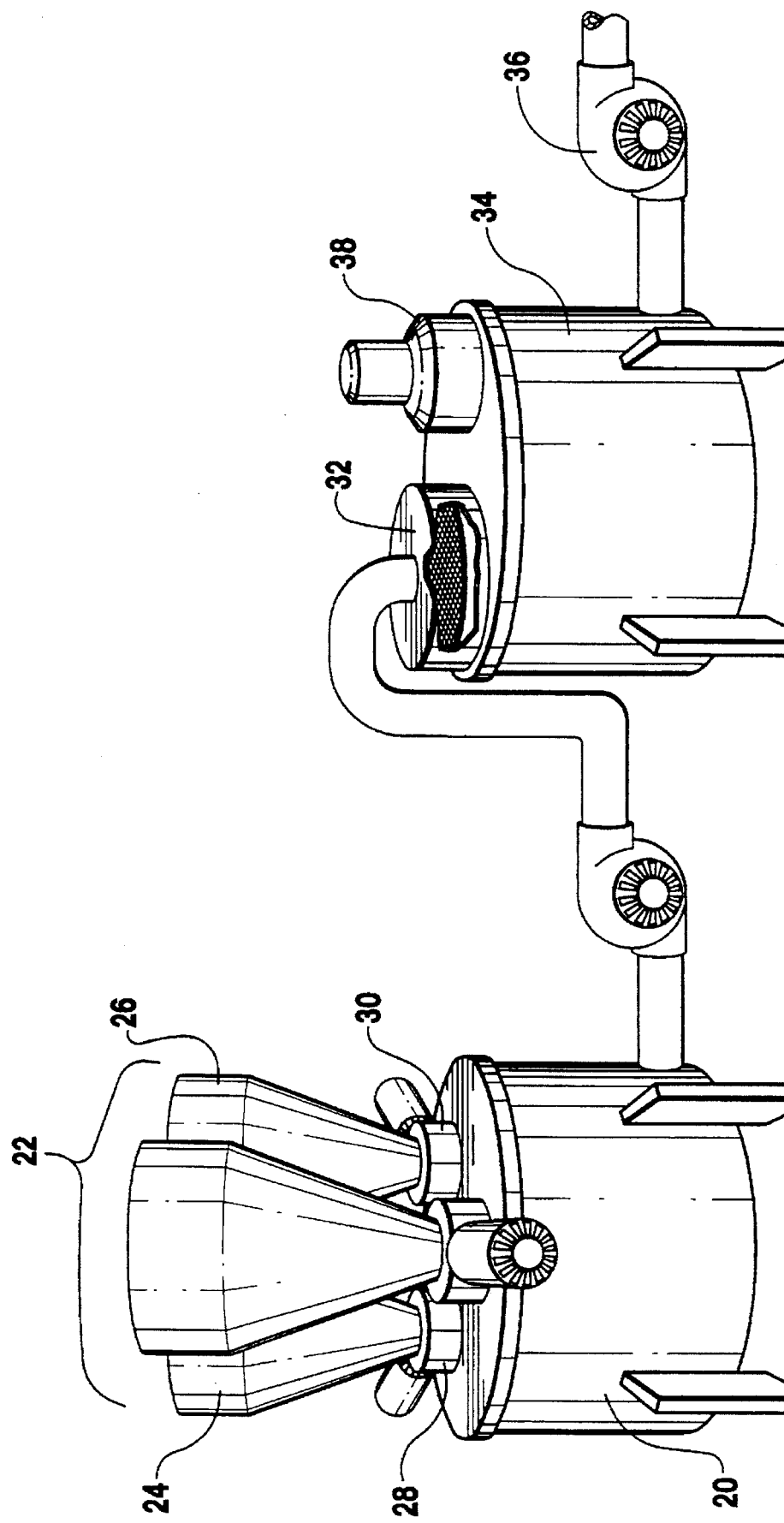
FIG. 4 is a perspective view of load cells and mixing apparatus.

As depicted in FIG. 4, the moldable mixture is preferably prepared in a mixing tank 20 fed by bulk storage cells 22. The number of storage cells 22 is dependent on the number of components to be incorporated into the mixture. Storage cells 22 typically comprise dry load cells 24 and liquid load cells 26. Dry load cells 24 house solid components such as the starch-based binder, fillers, and fibers. Dry material metering units 28, typically consisting of some form of auguring system, automatically and accurately measure and feed the desired amount of dry mixture into mixing tank 20.

Liquid load cells 26 house liquid components such as the solvent and different liquid rheology-modifying agents. When appropriate, automatic stirrers can be positioned within the liquid load cells 26 to help prevent separation or settling of a liquid. Metering pumps 30 automatically and accurately measure and feed the liquids into mixing tank 20.

Mixing tank 20 is preferably a high energy mixer capable of quickly blending the components into a homogenous, moldable mixture. Such high energy mixers include the TMN turbo batter mixers that are available from Franz Haas Waffelmaschinen of Vienna, Industriegesellschaft M.B.H. of Vienna Austria. Alternative high energy mixers are disclosed and claimed in U.S. Pat. No. 4,225,247 entitled "Mixing and Agitating Device"; U.S. Pat. No. 4,552,463 entitled "Method and Apparatus for Producing a Colloidal Mixture"; U.S. Pat. No. 4,889,428 entitled "Rotary Mill"; U.S. Pat. No. 4,944,595 entitled "Apparatus for Producing Cement Building Materials"; and U.S. Pat. No. 5,061,319 entitled "Process for Producing Cement Building Material". For purposes of disclosure, the foregoing patents are incorporated herein by specific reference.

Alternatively, a variable speed mixer can be used to provide low energy mixing. Variable speed mixers include the Eirich Rv-11. Where fragile fliers or aggregates, such as glass spheres, are being incorporated into a mixture, it is preferred to use low energy mixing so as not to crush the aggregate. Low energy mixing is more important for high viscosity mixtures. As the viscosity increases, the shear force applied to the mixture increases, thereby increasing the damage to the fragile aggregates.

As further depicted in FIG. 4, once the mixture is prepared, it is pumped through an oscillating screen 32 to a storage mixer 34. Oscillating screen 32 helps to separate out and disperse unmixed clumps of the solids. Storage mixer 34 functions as a holding tank to permit continuous feeding of the moldable mixture to the forming apparatus. The moldable mixture is fed to the forming apparatus via a conventional pump 36.

In one embodiment, storage mixer 34 is sealed closed and a vacuum pump 38 is attached thereto. Vacuum pump 38 applies a negative pressure to the mixture to remove air bubbles entrained in the mixture. As previously discussed, air bubbles can cause surface defects within the final products.

Figure 5:
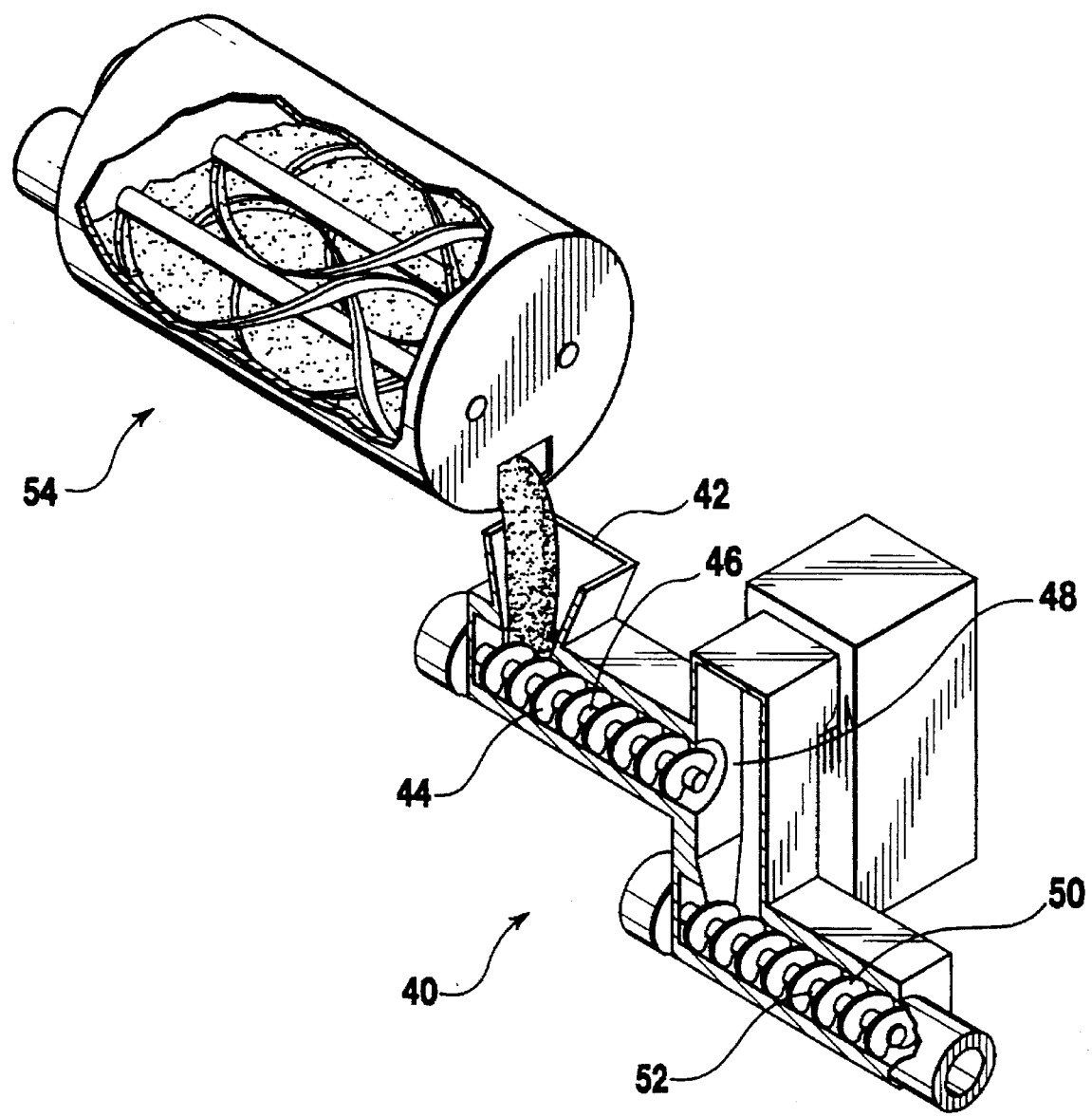
FIG. 5 is a cross-sectional view of an auger extruder apparatus.

Storage mixer 34 continuously stirs or mixes the moldable mixture at low energy to prevent settling within the moldable mixture. Where the forming apparatus operates on batch processing, as opposed to continuous processing, storage tank 34 can be eliminated and the mixture fed directly from mixing tank 20 to the forming apparatus. A complete automated system of load cells and mixers includes the DANMIX moldable batter mixing system that can be purchased from Franz Haas Waffelmaschinen Industriegesellschaft M.B.H. of Vienna, Austria.

Where a thicker or more viscous moldable mixture is desired, it may be necessary to use an auguring system to mix and transfer the moldable mixture. In one embodiment, the materials incorporated into the moldable mixture are automatically and continuously metered, mixed, and deaired by a dual chamber auger extruder apparatus. FIG. 5 depicts a dual chamber auger extruder 40, which includes a feeder 42 that feeds the moldable mixture into a first interior chamber 44 of extruder 40. Within first interior chamber 44 is a first auger screw 46 which both mixes and exerts forward pressure advancing the moldable mixture through first interior chamber 44 toward an evacuation chamber 48. Typically, a negative pressure or vacuum is applied to evacuation chamber 48 in order to remove unwanted air voids within the moldable mixture.

Thereafter, the moldable mixture is fed into a second interior chamber 50. A second auger screw 52 advances the mixture toward the article forming apparatus. Auger screws 46 and 52 can have different flight pitches and orientations to assist in advancement of the mixture and performing low and high shear energy mixing.

Auger extruder 40 can be used to independently mix the components for the moldable mixture, or, as shown in FIG. 5, can be fed by a mixer 54. A preferable twin auger extruder apparatus utilizes a pair of uniform rotational augers wherein the augers rotate in the same direction. Counter-rotational twin auger extruders, wherein the augers rotate in the opposite directions, accomplish the same purposes. A pugmil may also be utilized for the same purposes. Equipment meeting these specifications are available from Buhler-Miag, Inc., located in Minneapolis, Minn.

Figure 6:
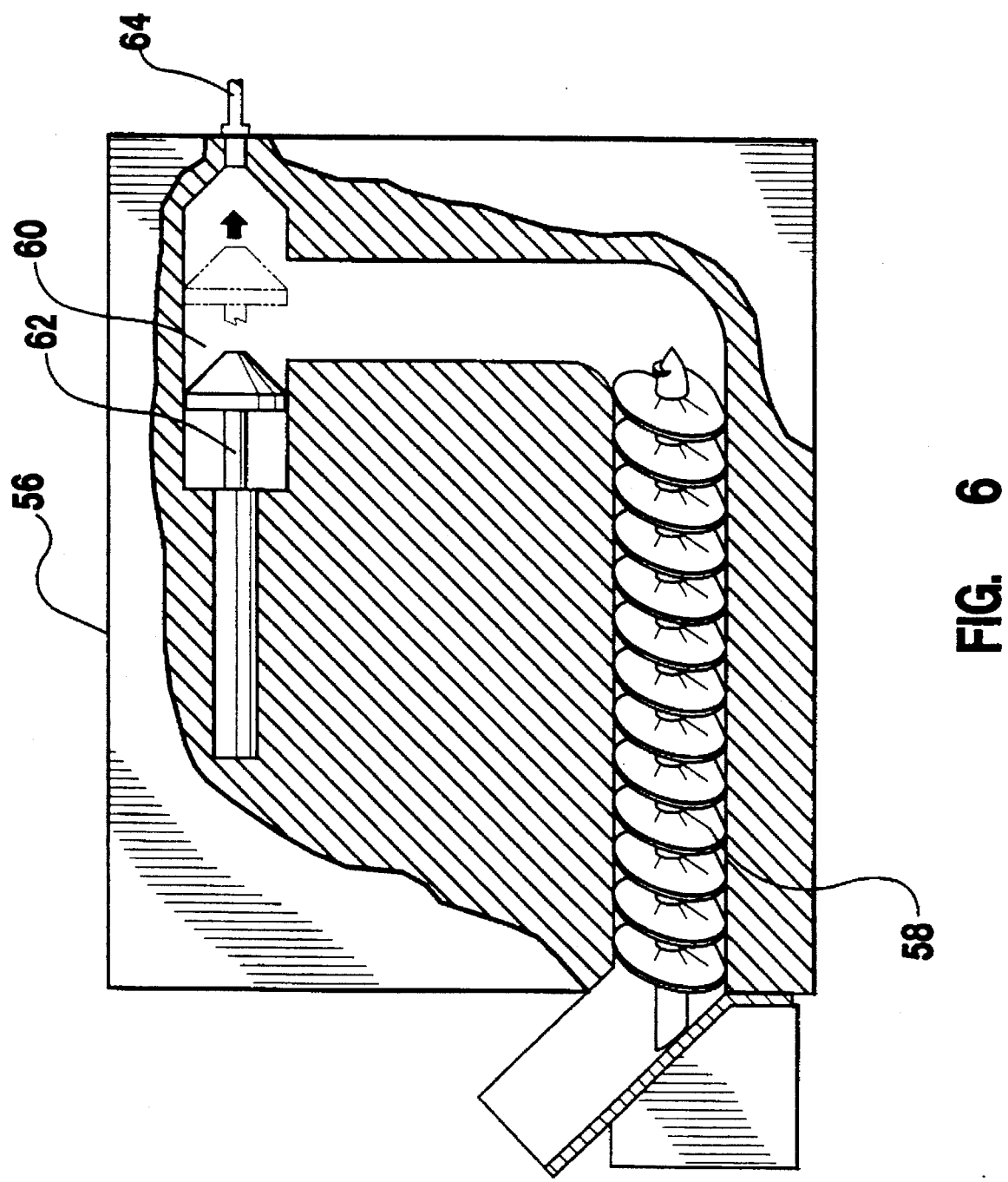
FIG. 6 is a cross-sectional view of a two-stage injector.

High viscosity, moldable mixtures are typically fed into the forming apparatus by either a two-stage injector or a reciprocating screw injector. As depicted in FIG. 6, a two-stage injector 56 has separate compartments for mixing or advancing and injecting. The mixture is conveyed to an extruder screw 58, which feeds the mixture to a shooting pot 60. Once shooting pot 60 is filled, an injection piston 62 pushes a defined quantity of the mixture into a flow channel 64 that feeds the forming apparatus.

Figure 7:
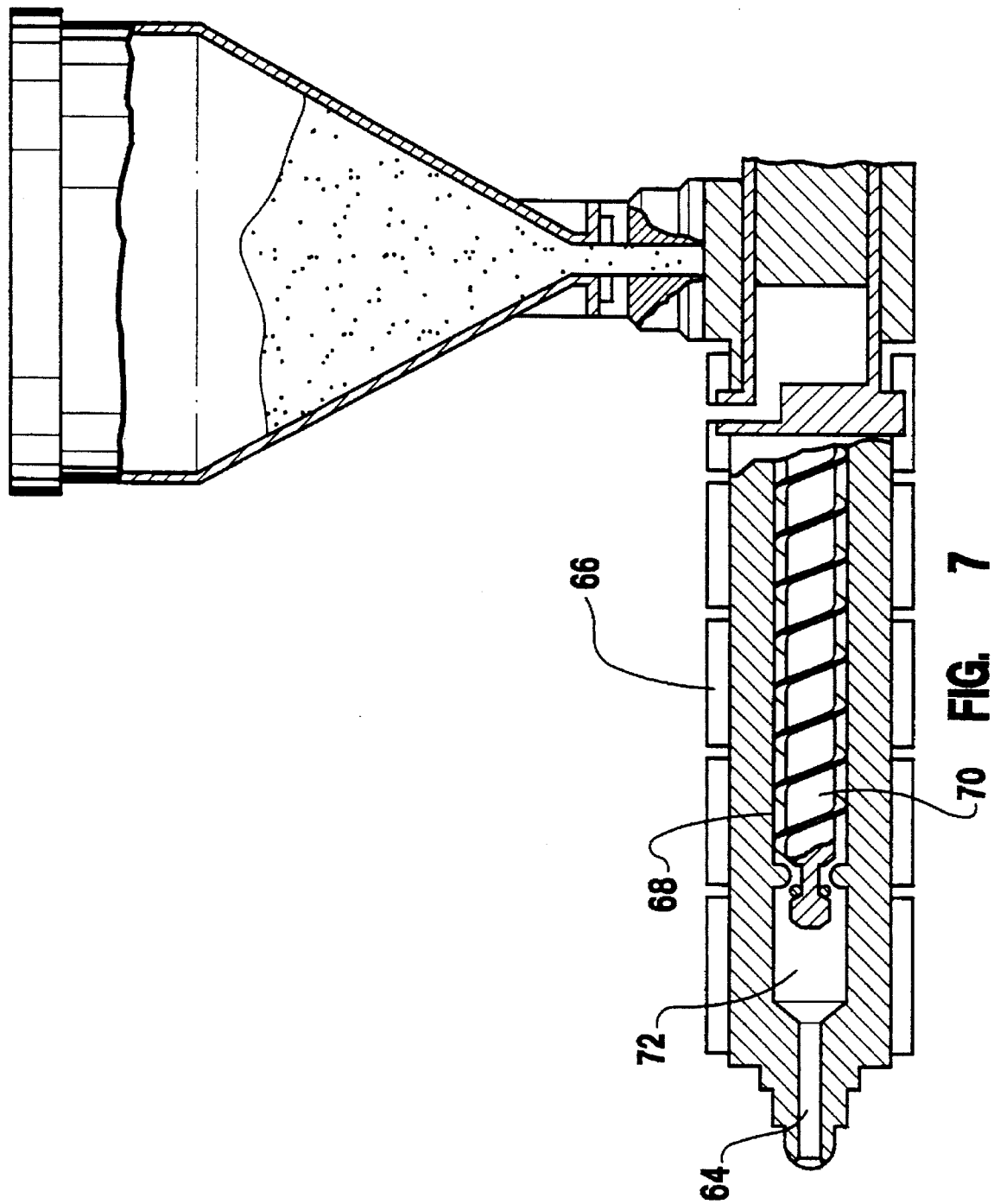
FIG. 7 is a cross-sectional view of a reciprocating screw injector.

As depicted in FIG. 7, a reciprocating screw injector 66 comprises a chamber 68 having a screw auger 70 longitudinally positioned therein. The moldable mixture is fed into chamber 68 and advanced by screw auger 70. As screw auger 70 rotates, it retracts and feeds the mixture to injection end 72 of screw auger 70. When the required volume of the mixture has accumulated at end 72, screw auger 70 stops rotating and moves forward to inject the mixture into flow channel 64 and subsequently to the forming apparatus.

B. Forming the Mixture into the Desired Article

Figure 8:
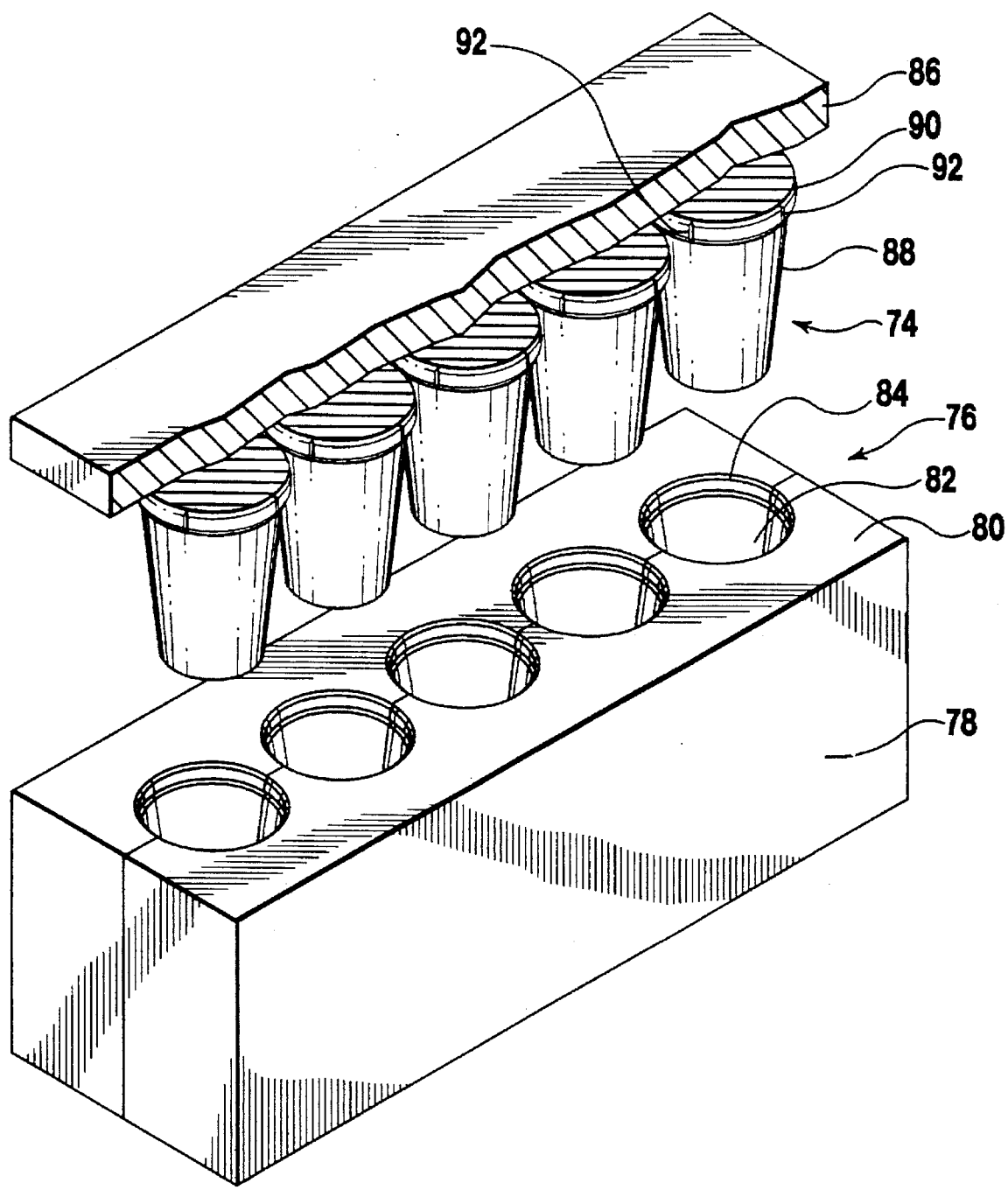
FIG. 8 is a perspective view of a male mold and a female mold.

Once the mixture is prepared, it is preferably formed into the desired shape of the article through the use of heated molds. FIG. 8 depicts a heated male mold 74 having a desired shape and a heated female mold 76 having a complementary shape. Female mold 76 comprises a mold body 78 having a flat mold face 80 with a receiving chamber 82 bored therein. Receiving chamber 82 has a mouth 84 through which it is accessed. Male mold 74 comprises an attachment plate 86, a die head 88 having a shape substantially complementary to the shape of receiving chamber 82, and a venting ring 90 extending between attachment plate 86 and die head 88. Venting ring 90 is slightly larger than mouth 84 of receiving chamber 82 and contains a plurality of venting grooves 92 that are longitudinally aligned with die head 88.

Figure 9:
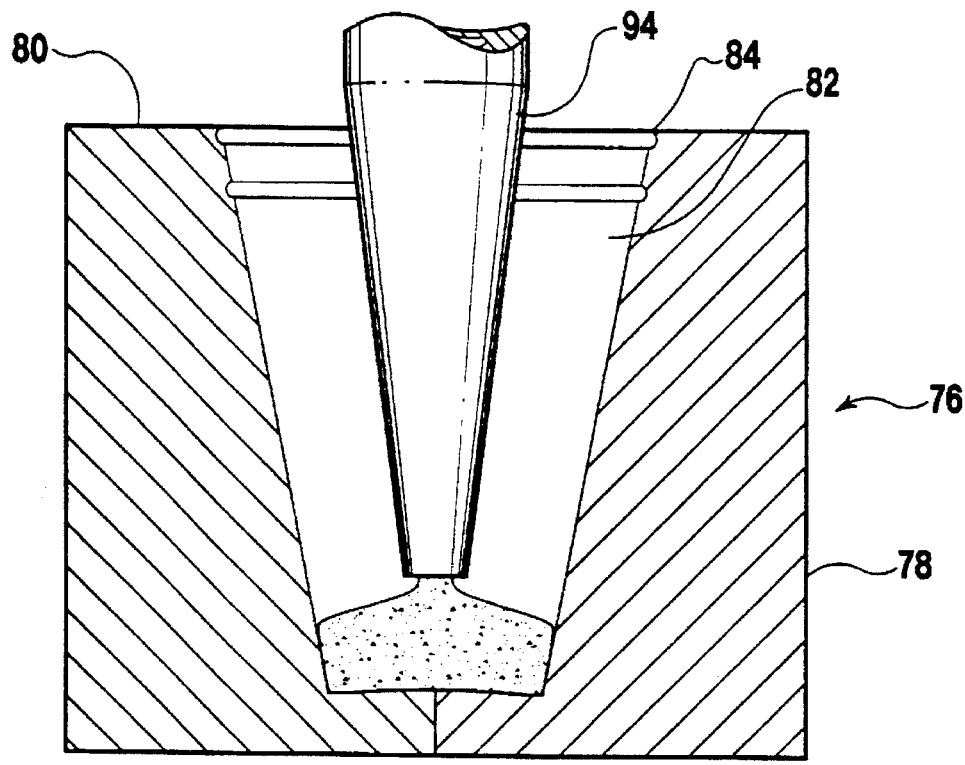
FIG. 9 is a cross-sectional view of a female mold being filled with a moldable mixture by a filling spout.
Figure 10:
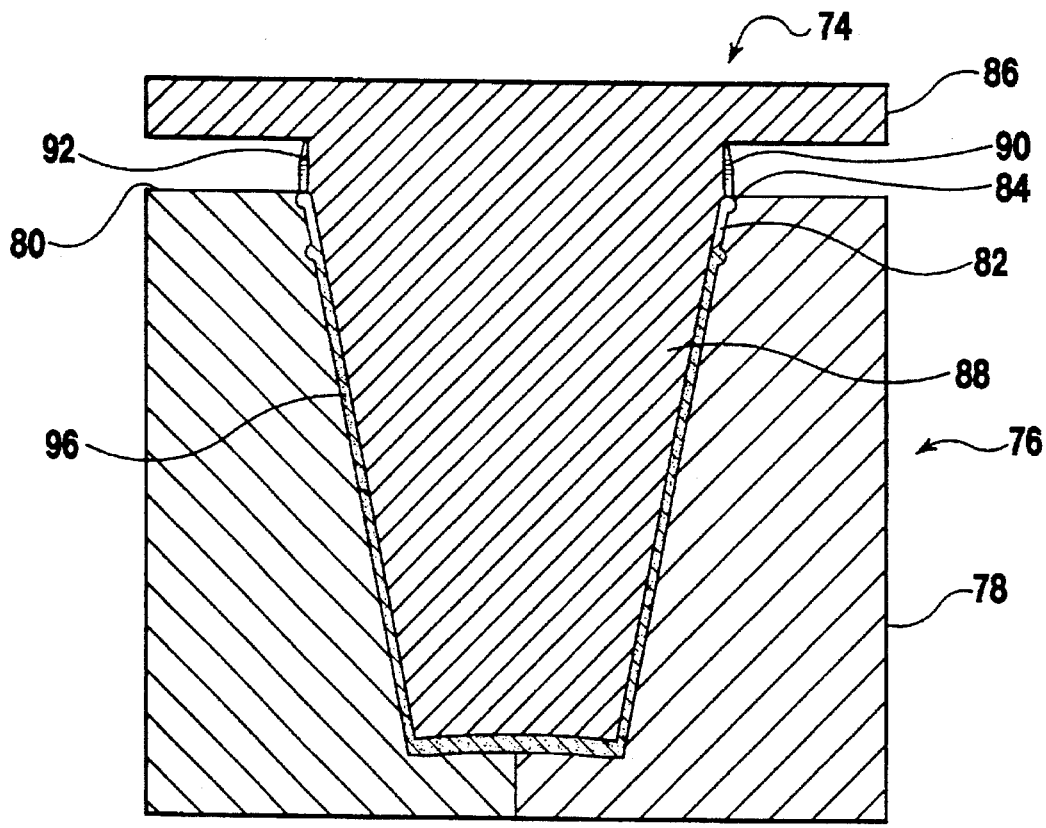
FIG. 10 is a cross-sectional view of a male mold and female mold being mated.

In the preferred embodiment, the molds are vertically aligned with female mold 76 being positioned below male mold 74. In this orientation, as shown in FIG. 9, receiving chamber 82 acts as a container for receiving the moldable mixture from a filling spout 94. Once the mixture is positioned within female mold 76, the molds are mated, as shown in FIG. 10, by inserting die head 88 into receiving chamber 82 until vent ring 90 comes to rest on mold face 80 around mouth 84. Die head 88 is slightly smaller than receiving chamber 82 so that when the molds are mated, a mold area 96 exists between male mold 74 and female mold 76. As previously discussed, the amount of moldable mixture positioned in female mold 76 preferably only fills a portion of mold area 96.

Figure 11:
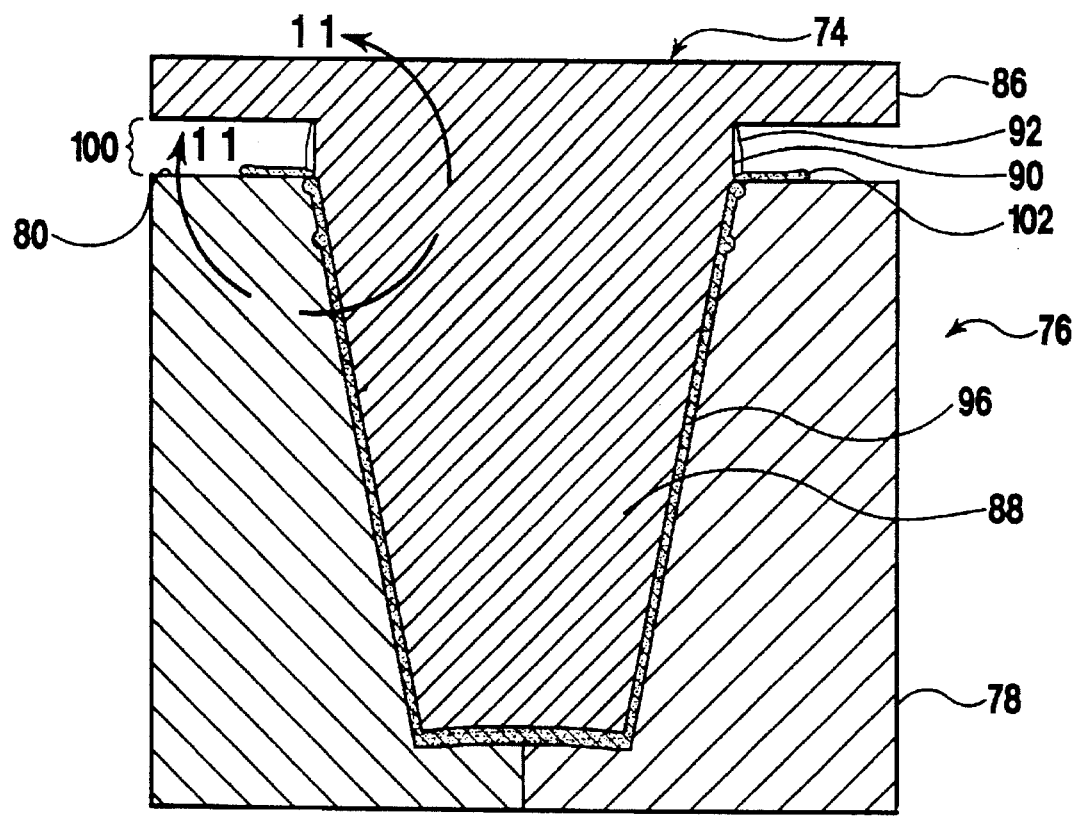
FIG. 11 is a cross-sectional view of the inventive article being baked between mated molds.
Figure 11A:
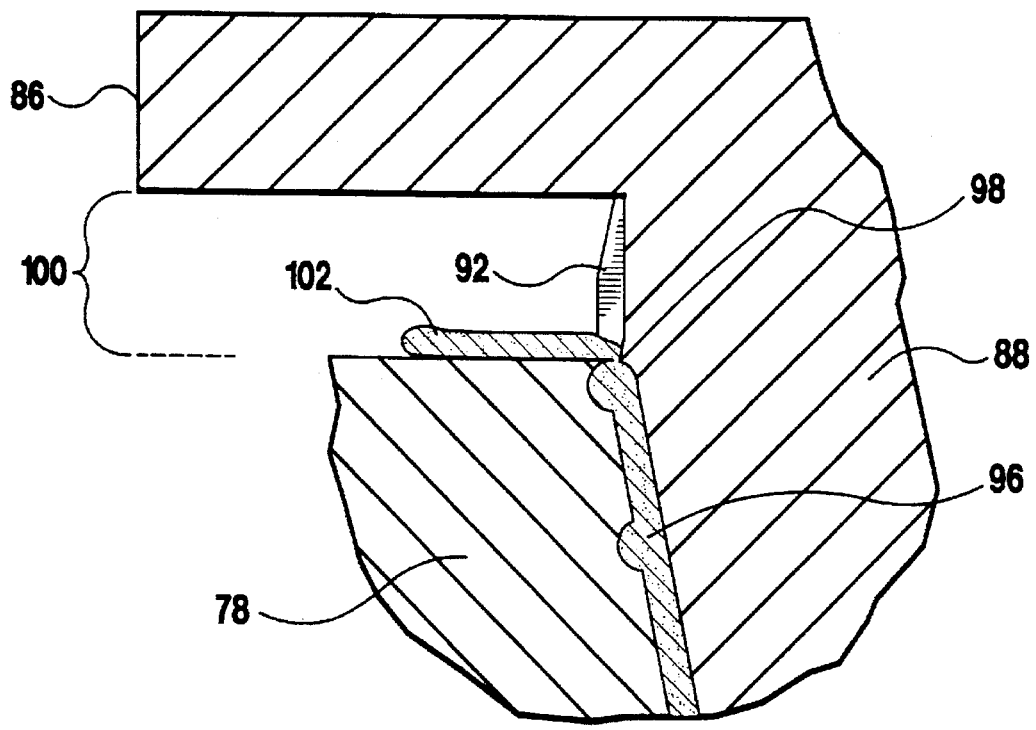
FIG. 11A is an enlarged cross-sectional view of the vent holes between the mated male mold and female mold.
Figure 12:
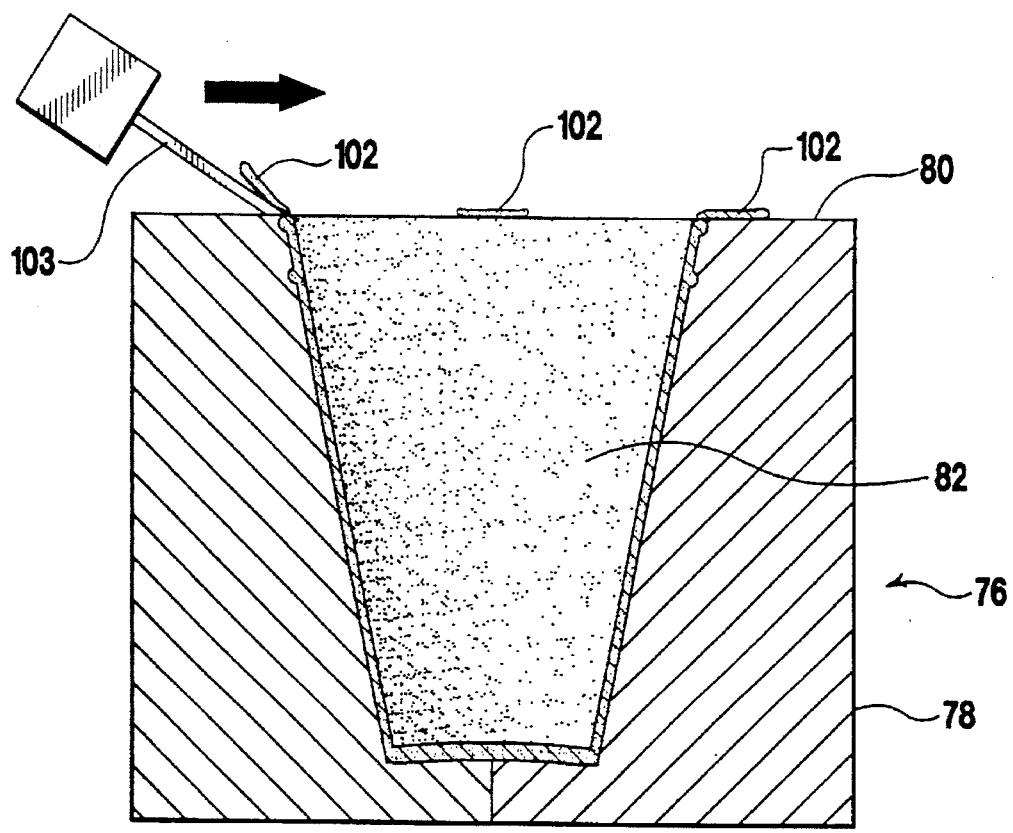
FIG. 12 is a cross-sectional view of the female mold equipped with a scraper blade to remove excess material.

In the mated position as shown in FIGS. 11 and 11A, vent grooves 92 communicate with mold area 96 to form vent holes 98. Furthermore, a venting gap 100 is formed between mold face 80 and attachment plate 86 as a result of venting ring 90 resting on mold face 80. During operation, the heated molds cause the moldable mixture to expand and dry into a solid article according to the process and parameters as previously discussed. Excess material 102 and vapor is expelled from mold area 96 through vent holes 98 and into venting gap 100. Once the mixture becomes form-stable in the desired shape of the article, male mold 74 and female mold 76 are separated. As depicted in FIG. 12, a scraper blade 103 can then be pressed along the length of mold face 80 to remove excess material 102.

Figure 13:
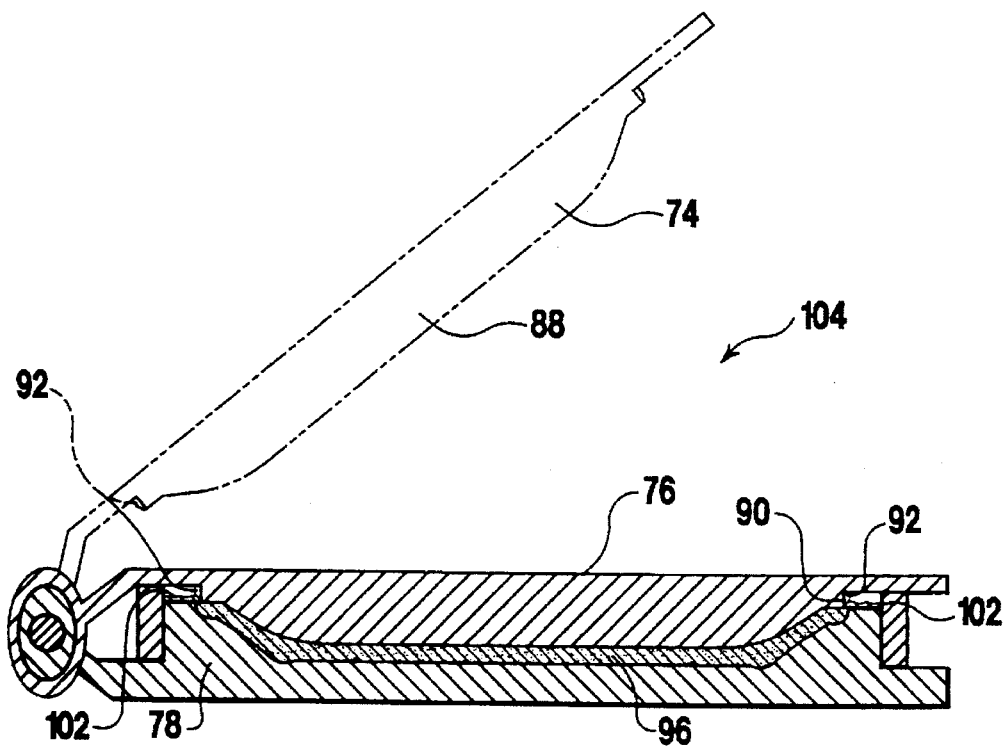
FIG. 13 is a cross-sectional view of a dual mold.
Figure 14:
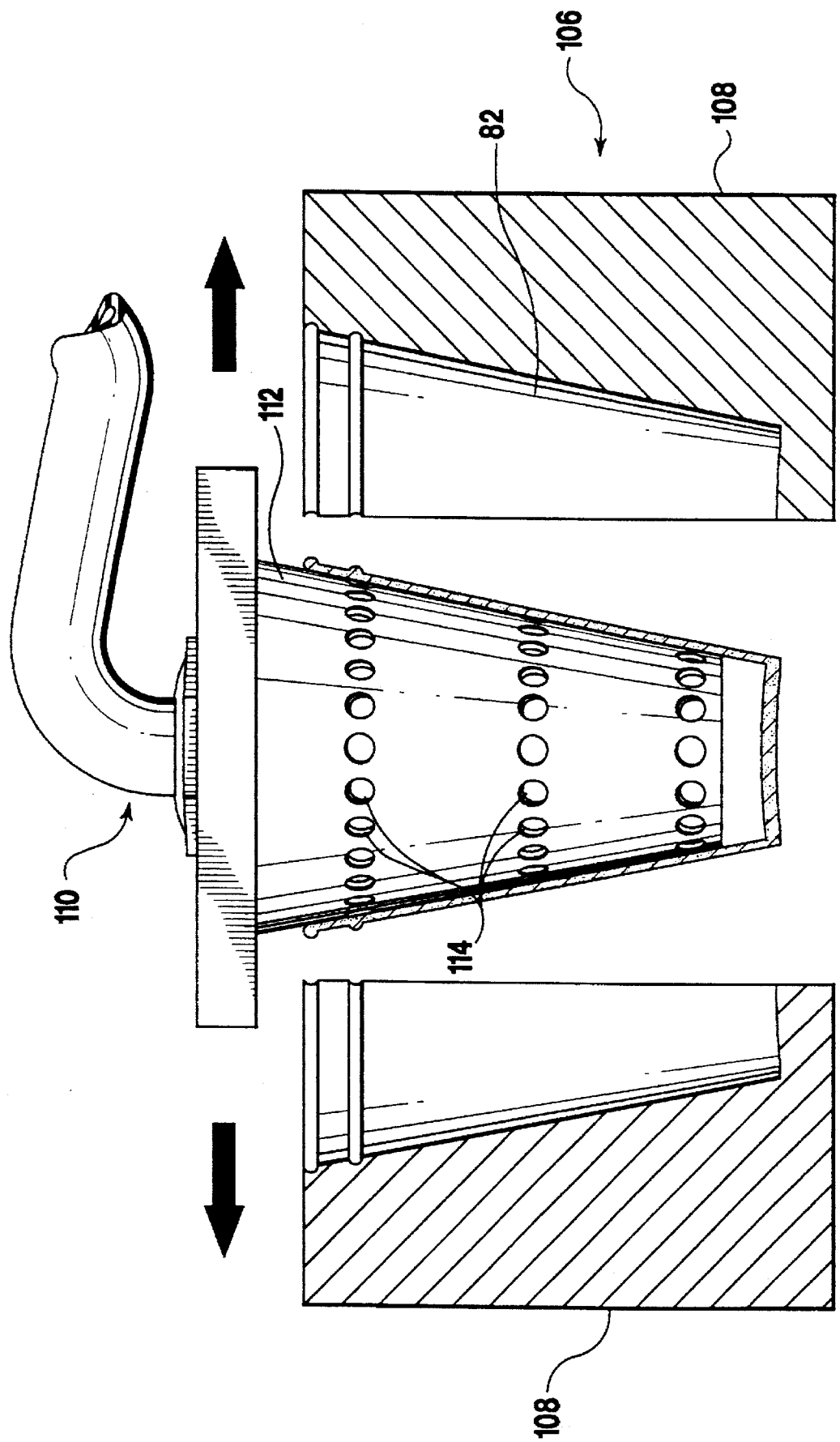
FIG. 14 is a cross-sectional view of a split mold with suction nozzle.

The molds can have a variety of shapes and sizes to form the desired article. However, there are two general types of molds: dual molds and split molds. As shown in FIG. 13, dual mold 104 comprises a single male mold 74 and a single female mold 76. This type of mold is used for making shallow articles, such as plates and lids, that are easily removed from the molds. Split molds 106, as shown in FIG. 14, comprise a single male mold 74 and a female mold 76 that can be separated into mold halves 108. Mold halves 108 are separated after the article is formed to permit easy removal of the article. Split molds 106 are used for the production of deep recessed articles such as cups and bowls that can be difficult to remove from a mold.

One method for removing articles from the mold is by a suction nozzle 110. As shown in FIG. 14, suction nozzle 110 has a head 112 with vacuum ports 114 located thereon. Head 112 is designed to complementarily fit within the hardened article. Accordingly, by inserting head 112 into the article and applying a slight negative pressure through vacuum ports 114, the article can be picked up and moved to a conveyor belt for subsequent processing.

The molds are preferably made of metals such as steel, brass, and aluminum. Polished metals, including chrome and nickel, along with Teflon coatings, make it easier to remove the articles from the molds and create a smoother finish. The material of the molds must be able to withstand the temperatures and pressures, as previously discussed, encountered during the manufacturing process.

The molds can be heated in a variety of ways. For example, external heating elements, such as gas burners, infrared light, and electrical heating elements, can be attached or directed at the molds. Alternatively, heated liquids, such as oils or heated gases, such as steam, can be piped through the molds to heat them. Various types of heating can also be used to vary the temperature of the molds along the length of the molds in order to vary the properties of the hardened matrix within the molded article. It is also possible to heat the mixtures without heating the molds. For example, the molds can be made out of ceramic and microwaves be applied to heat the mixture.

By varying the temperature and processing time it is possible to affect the density, porosity, and thickness of the surface layer, or skin. Generally, in order to yield a molded article having a thinner but more dense surface layer, the molding temperature is lower, the molds have fewer vents, and the moldable mixture has a higher viscosity. The viscosity of the mixture can be increased by adding a rheology-modifying agent, such as Tylose®, including less water, or by using an aggregate material having a higher specific surface area.

Figure 15:
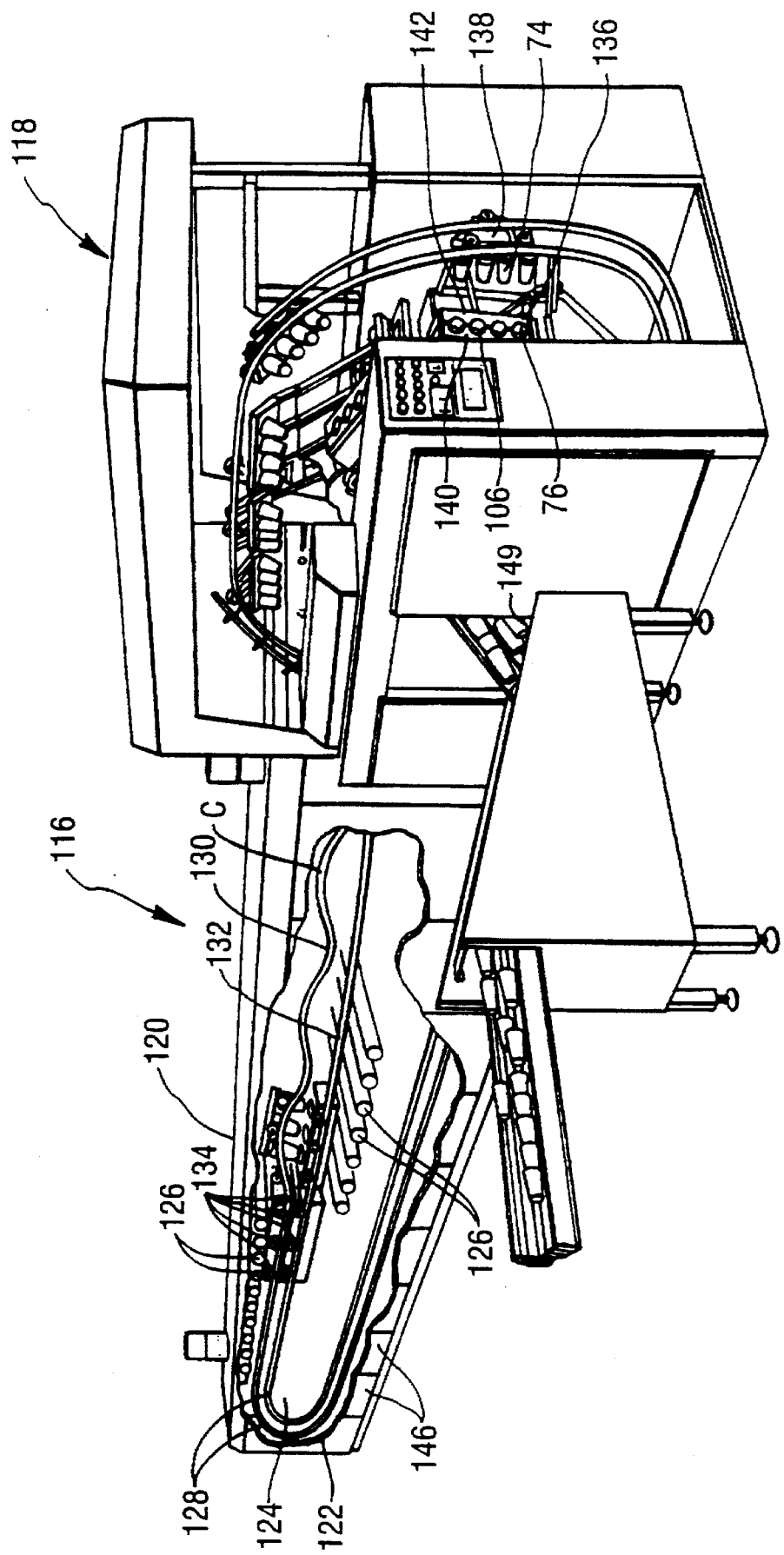
FIG. 15 is a perspective view of a baking machine.
Figure 16:
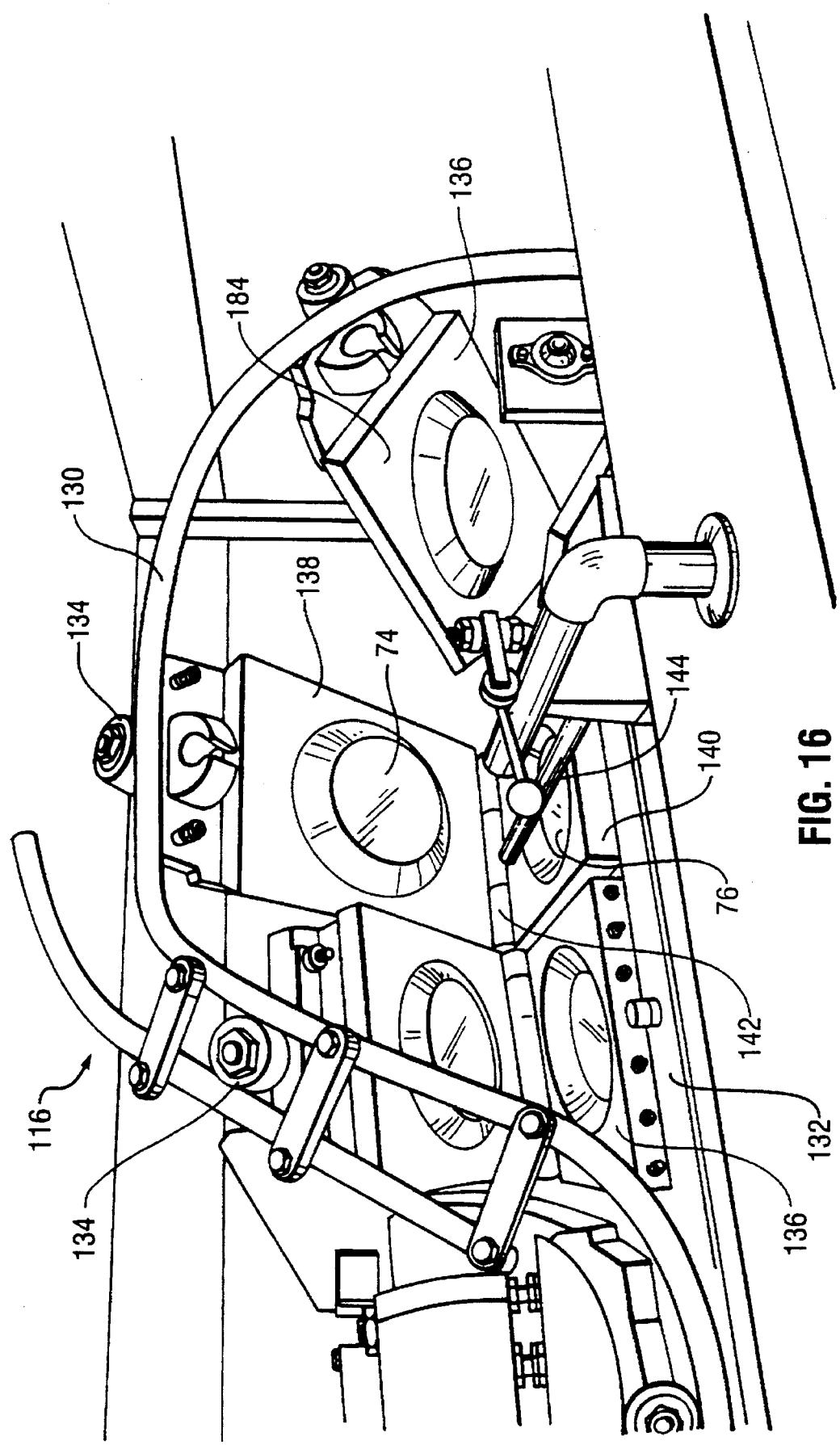
FIG. 16 is a perspective view of a mold in the filling position in the baking machine of FIG. 15.

One method for mass producing the articles of the present invention is by means of the baking machine depicted in FIG. 15. As depicted in FIG. 15, baking machine 116 has a forming station 118 attached to and communicating with a baking oven 120. Baking oven 120 includes an insulation wall 122 that defines an oven chamber 124. Heating elements 126 are positioned within oven chamber 124 for heating oven chamber 124. A track system 128 extends through both forming station 118 and oven chamber 124 in a continuous, circular fashion. Track system 128 includes an upper track 130 and a lower track 132. Riding on tracks via wheels 134 are a plurality of interconnected, hingedly attached baking molds 136. As best shown in FIG. 16, each mold has a top plate 138 and a bottom plate 140 with the plates being connected together at one end by a hinge 142. Top plate 138 and bottom plate 140 include a male mold 74 and a female mold 76, respectively, as previously described.

Baking machine 116 functions as a continuous process to mass produce desired articles. Production of the articles is performed in several stages that are simultaneously being performed by different baking molds 136 in the chain of molds. As shown in FIG. 16, in the first stage, baking molds 136 are open and positioned under a filling spout 144 for receiving the moldable mixture. Baking molds 136 are opened by separating the upper and lower tracks 130 and 132 on which the top and bottom plates 138 and 140 ride, respectively. Filling spout 144 is used to discharge a selected quantity of the moldable mixture into female mold 76.

Once female mold 76 is filled, baking molds 136 advance and are closed as a result of upper and lower tracks 130 and 132 closing together. To facilitate cyclic separation of the molds, as previously discussed, the tracks can be designed to cyclicly diverge and converge as shown at point C on FIG. 15, thereby repeatedly opening and closing the molds. Once cyclic separation is completed, the molds are locked and the forming process is continued.

One preferred mechanism for locking the molds is described in U.S. Pat. No. 4,953,453, issued Sep. 4, 1990, to Franz Haas, Sr. and entitled "Apparatus for Operating Locks of Baking Tongs for Producing Rotatable, Preferably Edible Wafers from Wafer Dough in a Wafer Baking Oven or an Automatic Wafer Baking Machine" (hereinafter the "Haas '453 patent"). For purposes of disclosure, the above patent is incorporated herein by specific reference. The Haas '453 patent discloses a locking mechanism that prevents the forcing of the lock or disruption of the process when the molds fail to properly align and close. More conventional locking mechanisms can be used; however, they must be able to withstand the pressures produced by the heated mixtures.

Baking mold 136 travels the length of baking oven 120, rotates to an inverted position, and then travels back to forming station 118. In accordance with the present invention, heating elements 126 are positioned within oven chamber 124 for heating baking molds 136 as they travel through oven chamber 124. By way of example and not by limitation, heating element 126 can include electrical heating elements, gas burners, and infrared lights.

The speed at which the molds travel through baking oven 120 is in part limited by the required time it takes to stop and fill baking molds 136. The filling time is, of course, dependent on the size of the article being molded. The time that the mixture remains in the oven is dependent on several variables, including the solvent content, oven temperature, and filing volume, as previously discussed. To permit the adjustment of the forming time without modifying the speed of the molds, baking oven 120 is built to include unit sections 146. Unit sections 146 can be removed from baking oven 120 or new sections can be added to baking oven 120 so as to permit selective adjustment of the length of baking oven 120. The forming time and temperature are selected so that when baking molds 136 return to forming station 118, the article can be removed from the molds in a form-stable condition.

Figure 17:
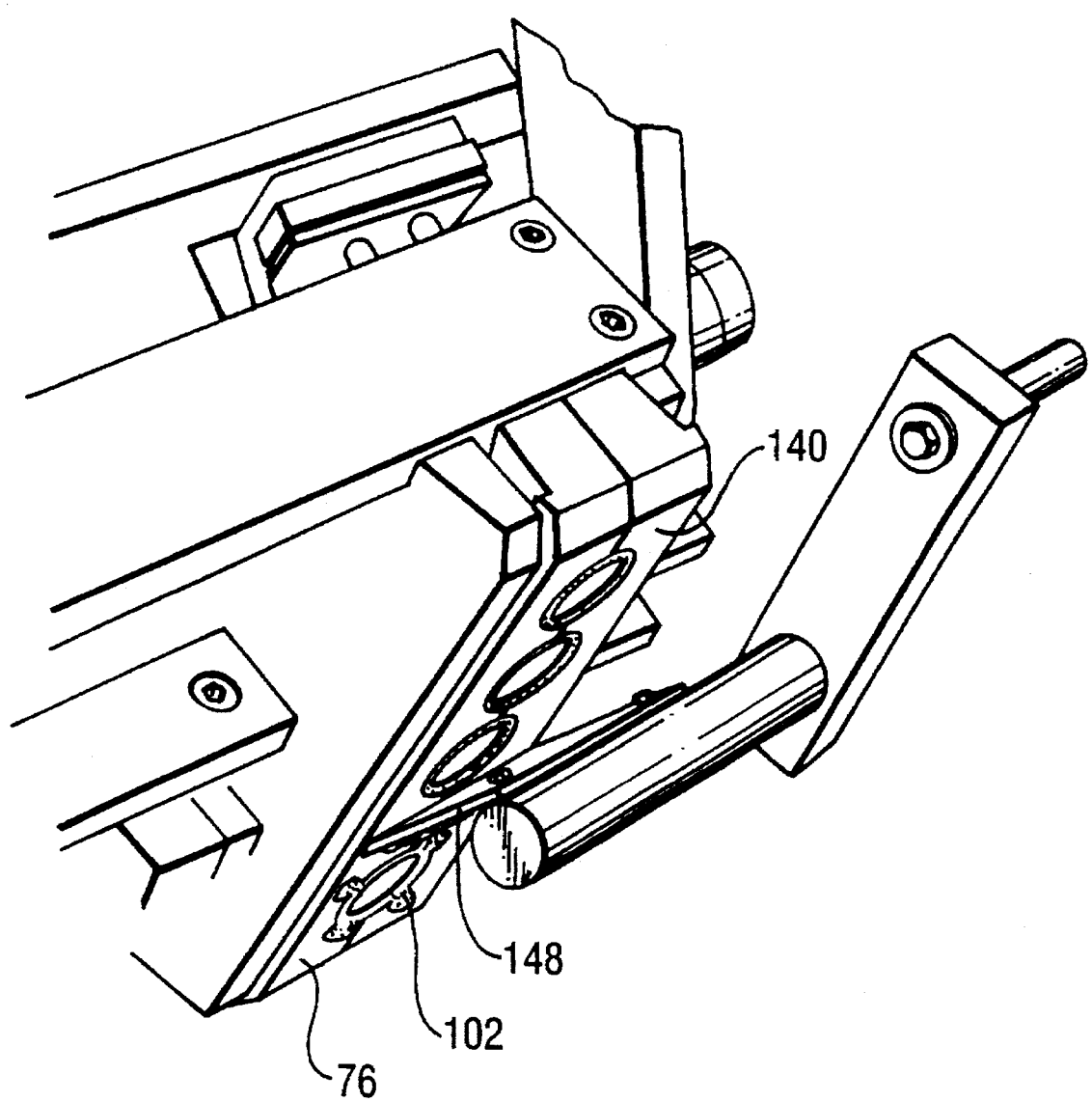
FIG. 17 is a perspective view of a scraper blade operating with the baking machine of FIG. 15.

Referring again to FIG. 15, once the molds return to forming station 118, baking molds 136 are again opened by separating upper and lower tracks 130 and 132. A scraper blade 148, depicted in FIG. 17, can then be passed over female mold 76 to remove excess material 102 that may have exited through vent holes 98 during the heating process. The article can then be removed from female mold 76.

The articles can be removed from the molds in a variety of different manners. For example, as shown in FIG. 16, when dual molds 184 are used, as the separated molds pass through forming station 118, the molds are again rotated so as to invert back into their original orientation. As the molds are rotated, the force of gravity causes the article to fall out of baking molds 136. A conveyer belt can then be used to catch and transfer the article for subsequent processing. When split molds 106 are used, the removal process entails separating of mold halves 108 and allowing the articles to fall down a collection chute 149 under the force of gravity, as shown in FIG. 15. The articles then continue along a conveyor belt through the remaining processing steps. With the articles removed form the molds, the molds return to filling spout 144 and the process is repeated.

A typical baking machine 116 may be selected from a variety of commercially available baking machines, such as the SWAK T, SWAK I, and SWAK wafer baking machines, and the STAK, STAZ and STA ice cream cone machines. These baking machines can be purchased from Franz Haas Waffelmaschinen Industriegesellschaft M.B.H. of Vienna, Austria. Although the above-listed machines have been used in the past primarily for the production of edible wafers and ice cream cones, the listed machines can be used in the present invention by inserting the proper mold shapes, which have been selectively modified as previously discussed, depending on the desired processing parameters and the type of article to be produced.

Figure 18:
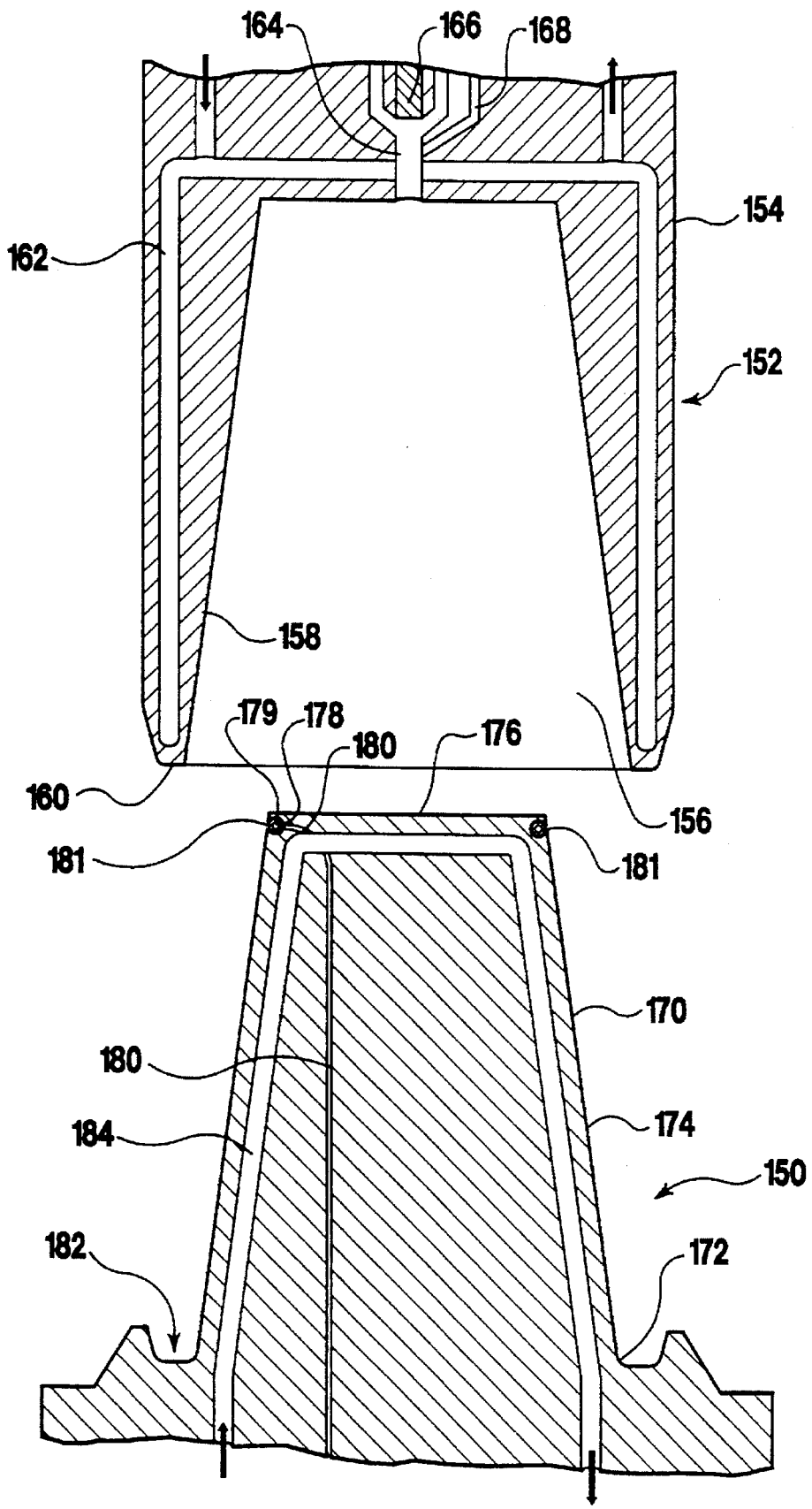
FIG. 18 is a cross-sectional view of a female mold and male mold used in a conventional expanded polystyrene machine.

As an alternative to the Haas baking equipment, conventional expanded polystyrene manufacturing equipment (hereinafter "EPS machine") can be modified to produce the articles of the present invention. As depicted in FIG. 18, a conventional EPS machine comprises a male mold 150 and a female mold 152, the molds being vertically aligned with female mold 152 being on top. Female mold 152 includes a mold body 154 having a receiving chamber 156 defined by a mold wall 158. At one end of mold wall 158 is a mounting lip 160. Located within mold wall 158 is a female wall cavity 162. Communicating with receiving chamber 156 is a filling channel 164 that is selectively opened and closed by a piston 166. Finally, communicating with filling channel 164 is a filling tube 168 that is also opened and closed by piston 166.

Male mold 150 has a die head 170 having a shape substantially complementary to receiving chamber 156. Die head 170 has a base 172, a side wall 174, and a top 176. Circumferentionally located within die head 170 near top 176 is a chamber 178. Positioned within chamber 178 is an expandable vent spring 179. Chamber 178 communicates with a pressure tube 180 positioned within die head 170. Chamber 178 also communicates with the environment through a venting slot 181 that extends between chamber 178 and the exterior of male mold 150. Located at base 172 is a venting groove 182 that is complementary aligned with mounting lip 160. Finally, a male wall cavity 184 is positioned within die head 170 near side wall 174 and top 176.

Figure 19:
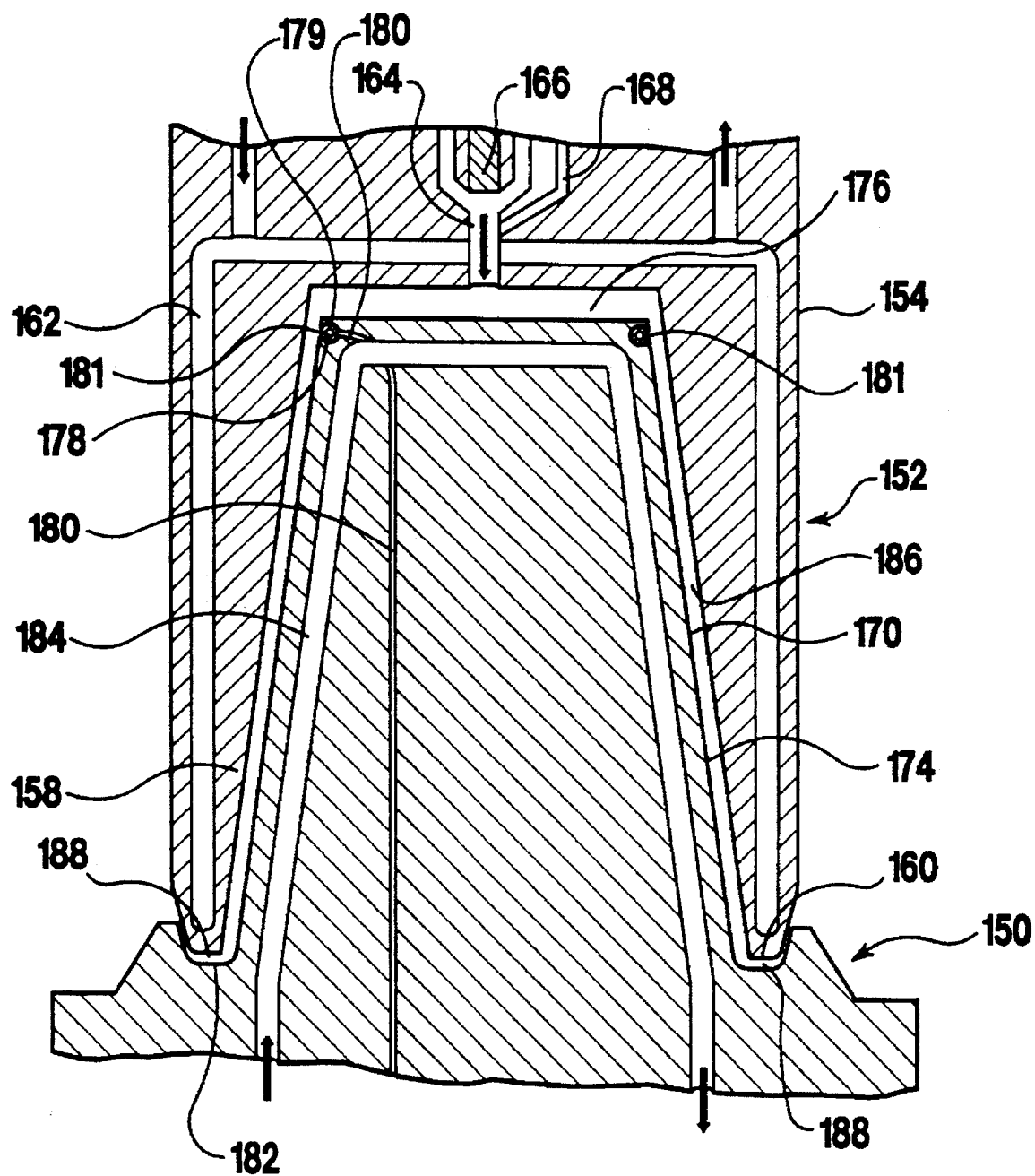
FIG. 19 is a cross-sectional view of the molds used in a conventional expanded polystyrene machine in a mated position.

During typical operation of the EPS machine, the molds are initially mated, as shown in FIG. 19, to form a mold area 186 between the molds. Air is blown through filling channel 164 into mold area 168 and exits through a vent gap 188 located between mounting lip 160 and venting groove 182. The blowing air causes a suction that pulls polystyrene beads located in filling tube 168 into mold area 186. Venting gap 188 is sufficiently small to prevent the polystyrene beads from escaping.

Once the mold area is filled with the polystyrene beads, filling channel 164 is closed by piston 166. Steam is passed into female wall cavity 162 and male wall cavity 184 heating female mold 152 and male mold 150. Steam is also blown into mold area 186 through pressure tube 180 and venting slot 181. As the steam enters chamber 178 through pressure tube 180, the pressure resulting from the steam causes vent spring 179 to expand, permitting the steam to pass through venting groove 182. Once the steam is stopped, venting spring 179 retracts, preventing material from in mold area 186 from entering into chamber 178.

As a result of the heated steam, the polystyrene beads heat, expand, and melt together forming the desired article. Cold water is then passed through female wall cavity 162 and male wall cavity 184 to cool the molds and subsequently harden the polystyrene article. Once the article is formed, the molds are separated and the article removed. The article is most easily removed by blowing air through chamber 178 which pushes the article off male mold 150.

A conventional EPS machine can be used in a couple of different methods to produce the articles of the present invention. In the first method, the EPS machine is used in substantially its normal configuration. By using a mixture having a consistency similar to that of a wet powder, the mixture can be sucked into mold area 186 by passing air through filling channel 164. However, since the mixture of the present invention hardens upon being heated, as opposed to cooled, the wail cavities 162 and 186 should be continually heated by steam or other heated liquids like oil. It is also preferred to insulate and cool filling tube 168. Heating of filling tube 168 can result in the gelation and hardening of the starch-based binder, thereby clogging tube 168. Nevertheless, by providing a cool-down cycle after the heating cycle, it is possible to demold the articles while maintaining enough moisture within the structural matrix to keep it flexible without the need for a subsequent conditioning step.

By regulating the size of vent gap 188, pressure can be built up within mold area 186, thereby producing the foamed articles in the same manner as previously discussed. One advantage of using the EPS machine in its normal configuration is that the final articles remain on male mold 150 after the molds are separated. The article can then be easily removed by blowing air through pressure tube 180.

In an alternative method, the molds of the EPS machine can be inverted so that female mold 152 is vertically aligned below male mold 150 and acts as a receptacle for the moldable mixture. The mixture can then be poured into female mold 152 through an external spout while the molds are open. The molds can then be closed and the article formed in the same manner as previously discussed.

A modified expanded polystyrene (EPS) machine can be used in forming articles from the compositions of the present invention. The modified EPS machine is an injection molding system having thin walls with a lower heat capacity so the heat can be removed easier during hot and cold cycling, which occurs through the use of hot steam and cold water. In using this system, the mold is opened and the mixture is injected therein. The mold is then closed and sealed, and the mixture is heated to about 200° C. The starch in the mixture gelates, becomes plastic, and flows in the heated mold. The vent holes are then opened to expand the material and create a foamed structural matrix. The mold is then cooled before removal of the product, and the starch gel solidifies and maintains conditioning water in the structural matrix. The mold is then opened to remove the finished product which has form stability.

C. Coatings and Coating Apparatus

It is within the scope of the present invention to apply coatings or coating materials to the articles. Coatings can be used to alter the surface characteristics of the articles in a number of ways, including sealing and protecting the article. Coatings may provide protection against moisture, base, acid, grease, and organic solvents. Coatings may also fill in voids on the surface of the article and provide a smoother, glossier, or scuff-resistant surface. Furthermore, coatings can help prevent aggregate and fiber "fly away." Coatings may also provide reflective, electrically conductive, or insulative properties. They may even reinforce the article, particularly at a bend, fold, edge or corner. Some of the coatings can also be utilized as laminating materials or as adhesives.

Application of a coating may also be used to regulate the moisture content of the present articles. It is theorized that the moisture content of an article will eventually reach a point of equilibrium with its environment. That is, relatively dry articles will adsorb moisture in a humid climate and conditioned articles will loose moisture in a dry climate. The application of a coating after conditioning the article to the proper moisture content can prevent the exchange of moisture between article and the surrounding environment.

The object of the coating process is usually to achieve a uniform film with minimal defects on the surface of the article. Selection of a particular coating process depends on a number of substrate (i.e., article) variables, as well as coating formulation variables. The substrate variables include the strength, wettability, porosity, density, smoothness, and uniformity of the article. The coating formulation variables include total solids content, solvent base, surface tension, and rheology.

The coating can be applied either during the forming process or after the article is formed. The coating can be formed during the forming process by adding a coating material that has approximately the same melting temperature as the peak temperature of the mixture. As the mixture is heated, the coating material melts and moves with the vaporized solvent to the surface of the article where it coats the surface. Such coating materials include selected waxes and cross-linking agents.

The coatings may be applied to the article after formation by using any coating means known in the art of manufacturing paper, paperboard plastic, polystyrene, sheet metal, or other packaging materials, including blade, puddle, air-knife, printing, Dahlgren, gravure, and powder coating. Coatings may also be applied by spraying the article with any of the coating materials listed below or by dipping the article into a vat containing an appropriate coating material. The apparatus used for coating will depend on the shape of the article. For example, cups will usually be coated differently than flat plates.

As the articles having a starch-based binder have a high affinity for water, the preferred coatings are non-aqueous and have a low polarity. Appropriate coatings include paraffin (synthetic wax); shellac; xylene-formaldehyde resins condensed with 4,4'-isopropylidenediphenolepichlorohydrin epoxy resins; drying oils; reconstituted oils from triglycerides or fatty acids from the drying oils to form esters with various glycols (butylene glycol, ethylene glycol), sorbitol, and trimethylol ethane or propane; synthetic drying oils including polybutadiene resin; natural fossil resins including copal (tropical tree resins, fossil and modem), damar, elemi, gilsonite (a black, shiny asphaltite, soluble in turpentine), glycol ester of damar, copal, elemi, and sandarac (a brittle, faintly aromatic translucent resin derived from the sandarac pine of Africa), shellac, Utah coal resin; rosins and rosin derivatives including rosin (gum rosin, tall oil rosin, and wood rosin), rosin esters formed by reaction with specific glycols or alcohols, rosin esters formed by reaction formaldehydes, and rosin salts (calcium resinate and zinc resinate); phenolic resins formed by reaction of phenols with formaldehyde; polyester resins; epoxy resins, catalysts, and adjuncts; coumarone-indene resin; petroleum hydrocarbon resin (cyclopentadiene type); terpene resins; urea-formaldehyde resins and their curing catalyst; triazine-formaldehyde resins and their curing catalyst; modifiers (for oils and alkyds, including polyesters); vinyl resinous substances such as polyvinyl chloride, polyvinyl acetate, polyvinyl alcohol, etc.; cellulosic materials (carboxymethylcellulose, cellulose acetate, ethylhydroxyethylcellulose, etc.); styrene polymers; polyethylene and its copolymers; acrylics and their copolymers; methyl methacrylate; ethyl methacrylate; waxes (paraffin type I, paraffin type II, polyethylene, sperm oil, bees, and spermaceti); melamine; polyamides; polylactic acid; Biopol® (a polyhydroxybutyrate-hydroxyvalerate copolymer); soybean protein; other synthetic polymers including biodegradable polymers; and elastomers and mixtures thereof. Biopol® is manufactured by ICI in the United Kingdom. Appropriate inorganic coatings include sodium silicate, calcium carbonate, aluminum oxide, silicon oxide, kaolin, clay, ceramic and mixtures thereof. The inorganic coatings may also be mixed with one or more of the organic coatings set forth above.

In some cases, it may be preferable for the coating to be elastomeric or deformable. Some coatings may also be used to strengthen places where the articles are severely bent. In such cases, a pliable, possibly elastomeric, coating may be preferred. A waterproof coating is desirable for articles intended to be in contact with water. If the articles are intended to come into contact with foodstuffs, the coating material will preferably comprise an FDA-approved coating.

Polymeric coatings such as polyethylene are useful in forming generally thin layers having low density. Low density polyethylene is especially useful in creating containers which are liquid-tight and even pressure-tight to a certain extent. Polymeric coatings can also be utilized as an adhesive when heat sealed.

Aluminum oxide and silicon oxide are useful coatings, particularly as a barrier to oxygen and moisture. The coatings can be applied to the article by any means known in the art, including the use of a high energy electron beam evaporation process, chemical plasma deposition and sputtering. Another method of forming an aluminum oxide or silicon oxide coating involves the treating of the article with an aqueous solution having an appropriate pH level to cause the formation of aluminum oxide or silicon oxide on the article due to the composition of the article.

Waxes and wax blends, particularly petroleum and synthetic waxes, provide a barrier to moisture, oxygen, and some organic liquids, such as grease or oils. They also allow an article such as a container to be heat sealed. Petroleum waxes are a particularly useful group of waxes in food and beverage packaging and include paraffin waxes and microcrystalline waxes.

The various products made from the composition of the present invention are porous so a coating needs to be used for water resistance. If there is moisture contact with an uncoated product, such as contact from food or beverages, the material of the product will be softened. While solvent based coatings can be used, it is preferable to use water based coatings. Preferred coatings that can be used include acrylic based coatings such as various acrylic emulsions, and vinyl based coatings including waxes such as paraffin wax, shellac, polyvinyl alcohol, and polylactic acid. When water based coatings are used, the water is removed to coalesce the coating particles on the surface of a formed product.

Both external and internal coating methods can be used on the articles formed from the compositions of the present invention. In the external coating method, two different systems can be used. The first is a sprinkle system in which freely powdered wax is dispensed or sprinkled onto the surface of a newly formed product sitting in an open mold, which causes the wax to melt over the surface of the product. The mold temperature is about 200° C. and the temperature on the exposed surface of the product in the open mold is about 100° C. Since the melting point of wax is about 50° C., the wax is easily melted on the surface of the product when sprinkled thereon.

The second system for external coating that may be used is a spray system in which wax is first melted and then sprayed at a temperature higher than the wax melting point so that molten wax is dispersed on the surface of a formed article. The spray system can be used to apply wax to the inside surfaces of a product in a mold or can be used to spray one or both sides of a product that has been demolded and placed on a conveyer. The spray system can be used to apply water based or hot melt coatings such that small droplets of the coating are applied to a product surface and coalescence of the coating particles takes place.

When water is added with the coating or a water-based coating is used, an additional conditioning component is added to the formed product. The structural matrix of the product will absorb the water from the coating into the matrix to provide additional moisture thereto. The coating can also be flash dried on the surface and at the same time leave the moisture on the inside of the product for conditioning of the matrix.

In one preferred internal coating method of the present invention, polyvinyl alcohol (PVA), latex, or other plastics are used as internal coatings. These coating materials are dissolved in water and built into the moldable mixture so that when a product is formed, the coating material will be dispersed throughout the formed structural matrix. When using PVA, which is made from polyvinyl acetate, a PVA with a higher hydrolysis is easier to dissolve in water. The dissolving of PVA into solution is also a function of temperature and time. A 2% solution of PVA has a long dissolution time of 15 minutes, a high molecular weight, and a high hydrolysis rate.

Another internal coating method that can be utilized is to disperse waxes, stearates, polylactic acid, shellac, latex, or other plastics internally in a moldable mixture, followed by migration of a secondary phase of coating particles to the skin at the surface of a product during molding where the coating particles coalesce to form a coating over the surface of the product.

D. Printing

It may be desirable to apply print or other indicia, such as trademarks, product information, container specifications, or logos, on the surface of the article. This can be accomplished using any conventional printing means or processes known in the art of printing paper or cardboard products, including planographic, relief, intaglio, porous, and impactless printing. Conventional printers include offset, Van Dam, laser, direct transfer contact, and thermographic printers. However, essentially any manual or mechanical means can be used.

The type of printing and printer used depends in part on the shape of the article. For example, flat plates will require a different printing apparatus than a cup. In addition, the molds can be specially designed to provide embossing on the surface of the article. The article can also be provided with a watermark. Because the articles have a relatively high porosity, the applied ink will tend to dry rapidly. One skilled in the art will appreciate that the article porosity and ink quantities must be compatible. In addition, decals, labels or other indicia can be attached or adhered to the article using methods known in the art.

E. Physical Properties of the Articles

In view of the foregoing, it is possible, by using a microstructural engineering approach, to obtain a wide variety of articles of varying shapes, strengths, flexibilities, stiffness, insulation, and other physical properties. In general, the flexural strength of the articles will preferably be in a range of about 0.5 MPa to about 8 MPa, more preferably in a range from about 0.75 MPa to about 6 MPa, and most preferably in a range from about 1 MPa to about 4 MPa. The range of strain of the articles (i.e., the amount of strain before rupture) will preferably be in a range from about 1% to about 15%, more preferably from about 1% to about 10%, and most preferably from about 1% to about 5%. The specific strength of the articles will vary in a range from about 2 MPa·cm$^3$ to about 80 MPa·cm$^3$. The fracture energy of the articles will preferably be in a range from about 5 J/m$^2$ to about 3000 J/m$^2$, more preferably from about 15 J/m$^2$ to about 1500 J/m$^2$, and most preferably from about 25 J/m$^2$ to about 600 J/m$^2$.

The products that are made from the composition of the invention have a laminate-type structure formed in situ. There is an outer skin layer on both sides having a higher density and an interior foam portion with a lower density. The outer skin layer is created instantaneously when the moldable mixture is contacted with the mold. The pores formed in the interior foam portion have a diameter of about 0.25 mm. The interior foam portion is a viscous liquid during the molding process and includes a starch gel that is placticized under high temperature and pressure between the outer skin layers. The interior foam portion hardens when the moisture is removed during the molding process. By increasing the water content, the density of the final product will be lowered, but a longer baking time is required since more water must be driven off.

VI. EXAMPLES OF THE PREFERRED EMBODIMENTS

Outlined below are a number of examples showing the manufacture of articles from the inorganically filled, starch-bound, moldable mixtures of the present invention. The examples compare the properties of the articles for varying compositions and processing conditions. In the first group of examples, articles were formed with inorganic fillers but without fibers, which articles required conditioning to obtain adequate flexibility.

Examples 1–13

Drinking cups were formed from moldable mixtures containing different types of inorganic aggregates to determine the effects of the different aggregates. Each of the moldable mixtures had the following basic mix design measured by weight:

| | |
|---|---|
| 39.8% | Stalok 400 (modified potato starch) |
| 9.95% | inorganic aggregate |
| 49.75% | water |
| 0.5% | magnesium stearate |

Each moldable mixture was prepared in a small Hobart mixer. First, the dry ingredients (including the inorganic aggregate, starch, and magnesium stearate) were completely mixed. Then the water was added slowly while the dry materials were being mixed until a homogeneous mixture was obtained. The mixtures were extracted from the Hobart mixing bowl using a syringe. The weight of the moldable material used to manufacture a cup for each mixture was determined by first weighing the syringe containing the moldable mixture, expelling the contents of the syringe into the molding apparatus, and then weighing the syringe.

The molding system included a male mold made out of tooled brass and a female mold made out of tooled steel, the molds being configured substantially according to FIG. 8. The molds were designed to produce 12 oz. drinking cups having a smooth surface and a thickness of about 4 mm. The male mold contained four vent grooves that formed four vent holes.

The cups of Examples 1–13 were obtained by heating each selected moldable mixture between the molds at a temperature of about 200° C. Once the articles became significantly form-stable, they were removed from the molds and placed in an oven for about 1.5 hours at a temperature of 105° C. to remove the remaining moisture. The moisture was removed so that subsequent testing of the cups would better reflect the effects of the component as opposed to the effects of the starch-based binder moisture content. It was assumed that the weight loss of the cup during drying in the oven was a loss of water. The measured weight loss was thus used to determine the moisture of cups upon being removed from the mold. The cups were then sealed in plastic bags to maintain a constant humidity until the cups could be tested.

Summarized below is a list of the selected inorganic aggregates and the resulting properties of the cups formed from each of the mix designs:

| Example | Inorganic Aggregate | Cup Density (g/cc) | Moisture Out of Mold (% W/W) | Thermal Conduct. (W/m.K) | Thermal Resist. (ft$^2$-h-°F./BTU-in) |
|---|---|---|---|---|---|
| 1 | Gama Sperse | 0.190 | 3.0 | 0.046 | 3.15 |
| 2 | Carbital 50 | 0.185 | 2.5 | 0.044 | 3.25 |
| 3 | R040 | 0.215 | 2.7 | 0.045 | 3.20 |
| 4 | Mica 4k | 0.205 | 2.6 | 0.048 | 3.10 |
| 5 | Glass Bubbles B38/4000 | 0.190 | 4.9 | 0.047 | 3.15 |
| 6 | Polymica 400 | 0.195 | 2.0 | 0.049 | 2.90 |
| 7 | Aerosil R972 | 0.125 | 4.2 | 0.040 | 3.68 |
| 8 | Aerosil 130 | 0.135 | 4.0 | 0.054 | 2.70 |
| 9 | Aerosil 200 | 0.145 | 4.1 | 0.046 | 3.15 |
| 10 | Aerosil 380 | 0.155 | 4.3 | 0.048 | 3.10 |
| 11 | Cabosil EH5 | 0.140 | 2.8 | 0.041 | 3.60 |
| 12 | Wollastonite | 0.195 | 2.1 | N/A | N/A |
| 13 | Sil-co-sil Silica Sand | 0.200 | 2.1 | N/A | N/A |

| Example | Inorganic Aggregate | Energy to Failure (mJ) | Displacement to Failure (%) | Peak Load (N) | Stiffness (N/m) |
| --- | --- | --- | --- | --- | --- |
| 1 | Gama Sperse | 6.0 | 3.1 | 5.00 | 2.5 |
| 2 | Carbital 50 | 9.0 | 3.5 | 5.10 | 2.7 |
| 3 | RO40 | 7.0 | 3.1 | 5.05 | 2.6 |
| 4 | Mica 4k | N/A | N/A | N/A | N/A |
| 5 | Glass Bubbles B38/4000 | 9.5 | 3.2 | 5.20 | 3.4 |
| 6 | Polymica 400 | 10.0 | 2.7 | 5.15 | 2.4 |
| 7 | Aerosil R972 | 7.0 | 4.0 | 4.95 | 1.9 |
| 8 | Aerosil 130 | 7.0 | 3.5 | 4.90 | 1.8 |
| 9 | Aerosil 200 | 9.0 | 3.5 | 5.00 | 2.1 |
| 10 | Aerosil 380 | 6.0 | 3.1 | 4.95 | 2.2 |
| 11 | Cabosil EH5 | 7.0 | 3.4 | 4.95 | 2.0 |
| 12 | Wollastonite | 8.5 | 3.1 | 5.10 | 2.9 |
| 13 | Sil-co-sil Silica Sand | 8.0 | 2.8 | 5.05 | 3.0 |

The properties analyzed include thermal properties and mechanical properties. The thermal properties include thermal conductance and thermal resistivity which were determined by a transient hot-wire method. Three measurements were recorded for the thermal conductivity of the side walls of the cups and the average value was reported. Mechanical properties were defined by developing a test that would simulate the pinching between the thumb and the other four fingers that a cup might experience during use. The results served as a means to compare cups produced from different compositions and under different conditions. The strength and ductility were not easily quantifiable due to the complex geometry. Instead the data is reported without normalization to the cross-sectional area.

The cups were positioned on an inclined platform. The inclination was adjusted so that the side edge of the cup was normal to the loading direction. The area below the top rim of the cup was chosen as the point of load application. This resulted in the most reproducible results. Loads were applied to the cups at the rate of 15 mm/min. until a clear failure was observed. The displacements and the corresponding loads were recorded.

The test provided a qualitative evaluation of the mechanical properties. Using the defined testing method, a comparison was made on the basis of peak load, maximum displacement before failure, energy absorbed during fracture, and stiffness. The energy of failure is the area under the load displacement curve measured from the origin to the point of first fracture. Each of the above properties are based on a statistical average of seven identical tests.

The tests showed that the fumed silica aggregates (Aerosil R972, 130, 200, 380 and Cabosil EH5) resulted in a density of about 30% lower compared to those where a different inorganic aggregate was added. The other inorganic aggregates had a limited effect on the density of the cups, with the exception of Polymica which also decreased the density by about 30% relative to cups using the other inorganic aggregates.

The dry peak load and stiffness of the cups containing fumed silica were affected to the same extent as the density; approximately 30% of each was lost compared to cups produced without fumed silica. The dry displacement-to-failure and energy-to-failure measurements exhibited little or no change due to the addition of inorganic materials.

The addition of Mica 4 k, glass bubbles, Wollastonite, Polymica 400, and silica sand, did not affect the energy-to-failure displacement-to-failure, peak load, and stiffness to any significant degree. The one exception was Mica 4 k which had a 30% increase in peak load. The value for thermal properties were found to be in a band width of about ±10% of the value for cups produced with no starch-based binder substitute. The values were independent of the type of inorganic aggregate used.

Based on the above tests, fumed silica aggregates appear to be less preferred since they adversely affect the mechanical properties of the articles. In contrast, the other inorganic aggregates can be used to replace at least 20% by weight of the starch-based binder without significantly affecting the mechanical properties of the articles. It is believed that fumed silicas produce a detrimental effect as a result of their low strength in comparison to the other inorganic aggregates.

Example 14–18

Cups were made using collamyl starch with different concentrations of calcium carbonate to determine the effect of using collamyl starch. The same procedures and apparatus set forth in Examples 1–13 were used to make and test the cups of Examples 14–18. A base mixture was first prepared by combining the following components by weight:

| | |
| --- | --- |
| 49.75% | collamyl starch and RO40 calcium carbonate |
| 49.75% | water |
| 0.5% | magnesium stearate. |

The calcium carbonate was added to the mixture in amounts of 20, 40, 50, and 60% by total weight of the calcium carbonate and starch-based binder. Summarized below are the properties of the articles made using different percentages of calcium carbonate.

| Example | Calcium Carbonate Aggregate (weight %) | Density (g/cc) | Thermal Conduct. (W/m · K.) | Energy to Fail. (mJ) | Displacement to Failure (%) | Peak load (N) | Stiffness (N/m) |
| --- | --- | --- | --- | --- | --- | --- | --- |
| 14 | 0 | 0.17 | 0.043 | 6 | 3.5 | 4.5 | 1.9 |
| 15 | 20 | 0.17 | 0.043 | 7 | 4.3 | 4.5 | 1.7 |
| 16 | 40 | 0.24 | 0.046 | 7 | 3.5 | 5.2 | 2.2 |
| 17 | 50 | 0.27 | 0.045 | 7 | 3.2 | 5.8 | 2.5 |
| 18 | 60 | 0.32 | 0.053 | 7 | 2.6 | 6.5 | 3.5 |

The increase in density was negligible for the first 20% of RO40 calcium carbonate that was added. For higher concentrations, the increase was substantial, being about 2% for each weight percent of added RO40. Increases in the thermal conductivity followed a similar pattern as for the density. The increase in thermal conductivity for concentrations of RO40 exceeding 20% was about 0.5% per percent of added RO40. The energy and displacement-to-failure for the cups was largely unaffected by the addition of RO40. The peak load increased linearly at the rate of about 1% per percent of added RO40. The stiffness curve was similar to the density curve; a relatively flat region up to 20% RO40 and a linear increase for higher concentrations. The rate of increase in stiffness was approximately 1% for each percent of added RO40 in mixtures exceeding 20% RO40.

Based on the above observations, collamyl starch can be used to make the articles of the present invention. Furthermore, relatively high concentrations of calcium carbonate can be added to mixtures containing collamyl starch without significantly reducing the desired mechanical properties.

Examples 19-26

Cups were made using different types of admixtures to determine their effects, if any, on the properties of the mixtures. The same procedures and apparatus set forth in Examples 1-13 were used to make and test the cups of the present examples. A base mixture was first prepared by combining the following components by weight: 39.8% Stalok 400 (modified potato starch)

| 39.8% | Stalok 400 (modified potato starch) |
|---|---|
| 9.95% | RO40 calcium carbonate |
| 49.5% | water |
| 0.5% | magnesium stearate. |

Admixtures, including Methocel® 240, Tylose® 15002 and polyvinyl alcohol (PVA), were then combined to the mixture by weight percentage of the total solids in the mixture. Summarized below is a list of the moldable mixtures and the properties resulting from their use.

| Example | Admixtures (weight %) | Density (g/cc) | Thermal Conduct. (W/m·K.) | Energy to Fail. (mJ) | Displacement to Failure (%) | Peak load (N) | Stiffness (N/m) |
|---|---|---|---|---|---|---|---|
| 19 | None | 0.26 | 0.045 | 4 | 2.2 | 4.5 | 2.8 |
| | PVA | | | | | | |
| 20 | 1.9 | 0.26 | 0.046 | 6 | 3.1 | 5.5 | 2.7 |
| 21 | 2.9 | 0.27 | 0.048 | 5 | 2.6 | 5.5 | 3.3 |
| 22 | 3.4 | 0.26 | 0.044 | 4 | 2.8 | 5.0 | 2.8 |
| | Methocel® 240 | | | | | | |
| 23 | 0.5 | 0.19 | 0.045 | 6 | 3.4 | 5.5 | 2.3 |
| 24 | 1.0 | 0.18 | 0.052 | 8 | 6.0 | 4.5 | 0.9 |
| | Tylose® 15002 | | | | | | |
| 25 | 0.5 | 0.23 | 0.044 | 7 | 4.1 | 5.0 | 1.8 |
| 26 | 1.0 | 0.19 | 0.049 | 3 | 3.1 | 3.5 | 1.7 |

The addition of PVA was shown to have little effect on the densities, thermal conductivities, or mechanical properties of the cups made therefrom. Methocel® 240 and Tylose® 15002 affected the density slightly. The density decreased just over 20% per each addition of 1% of either admixture. The thermal conductivity increased about 10% for the same additions. Methocel® 240 had a positive effect on the energy and displacement-to-failure measurements for dry cups. The energy-to-failure values doubled for each 1% addition, whereas the displacement-to-failure values showed an improvement of 2.5 times. The peak load dropped about 20% for each 1% addition of Methocel® 240, while the stiffness fell more than 70%. A 0.5% addition of Tylose® 15002 increased the energy-to-failure by 60%, the displacement-to-failure by 80% and the peak load by 10%. These increases disappeared with a further (0.5%) addition of Tylose® 15002. The stiffness of dry cups was halved by additions of 1% of either Methocel® or Tylose®.

Generally, PVA was found to have a minimal impact on the properties of the formed cups. Methocel® 240 and Tylose® 15002 were found to either maintain or improve the properties of the cups at lower concentrations. The benefits, however, were lost as the concentration of each was increased.

Examples 27-31

To study the synergistic effect of some admixtures, moldable mixtures were prepared containing varying mounts of RO40 calcium carbonate, both with and without the additives Dispex®A40 and Methocel® 240. The same procedures and apparatus set forth in Examples 1-13 were used to make and test the cups of the following examples. The cups were made from five different mixtures. Mixture 1 contained the following components by weight: 49.75% water, 0.5% magnesium stearate, 19.9% RO40 calcium carbonate, and 29.85% Stalok 400 (modified potato starch). Mix 1 further contained 2% Dispex and 0.5% Methocel® 240 by weight of the combined starch-based binder and calcium carbonate. Mixture 2 was similar to Mixture 1, except that the percentage of calcium carbonate was increased to 29.85%, while the starch-based binder was decreased to 19.9%. In Mixture 3, the calcium carbonate was further increased to 39.8%, the starch-based binder decreased to 9.95%, and the other components kept the same as in Mixture 1. Mixture 4 was similar to Mixture 1, except that Dispex was not added. Finally, Mixture 5 was similar to Mix 3, except that Methocel® 240 was not added.

Summarized below are the properties of the cups made from the five mixtures:

| Example | Mixture | Density (g/cc) | Thermal Conduct. (W/m·K.) | Energy to Fail. (mJ) | Displacement to Failure (%) | Peak load (N) | Stiffness (N/m) |
|---|---|---|---|---|---|---|---|
| 27 | Mixture 1 | 0.23 | 0.049 | 5 | 2.9 | 4.0 | 1.7 |
| 28 | Mixture 2 | 0.25 | 0.049 | 3 | 2.9 | 3.0 | 1.3 |
| 29 | Mixture 3 | 0.32 | 0.057 | — | — | — | — |
| 30 | Mixture 4 | 0.26 | 0.044 | 7 | 3.5 | 5.5 | 2.3 |
| 31 | Mixture 5 | 0.32 | 0.052 | 4 | 2.1 | 3.0 | 2.1 |

The tests demonstrate that the densities of the articles increased as the concentration of calcium carbonate was increased. The densities of the articles increased, however, if either Dispex A40 or Methocel® 240 was not included in the mix design. The thermal conductivity exhibited a similar increase with increasing calcium carbonate concentration. The energy-to-failure and displacement-to-failure decreased as higher levels of RO40 were included. The samples without Dispex A40 displayed about 30% higher values, whereas the samples produced from a mixture without Methocel® 240 had slightly lower levels of performance. The peak load and stiffness both exhibited inferior levels when Dispex A40 and Methocel® 240 were added to the mixtures.

Although the admixtures were useful in producing articles having higher concentrations of inorganic aggregates, both Dispex A40 and Methocel® 240 produced articles having lower densities and inferior mechanical properties, perhaps due to their interfering with the gelation of the unmodified starch binder.

Examples 32-36

Cups were made using different amounts of the cross-linking admixture Sunrez 747 to determine its effect on the moldable mixture. The same procedures and apparatus set forth in Examples 1-13 were used to make and test the cups of the following examples. A base mixture was first prepared by combining the following components by weight:

| 28.15% | Stalok 400 (modified potato starch) |
|---|---|
| 19.9% | RO40 calcium carbonate |
| 1.7% | PVA |

-continued

| | |
|---|---|
| 49.75% | water |
| 0.5% | magnesium stearate. |

The base mixture was then varied by incrementally increasing the concentration of Sunrez 747 by weight of total solids in the mixture over a range from 2% to 20%. Summarized below are the percentages of Sunrez 747 and the corresponding properties of the resulting cups.

| Example | Sunrez 747 (weight %) | Density (g/cc) | Thermal Conduct. (W/m·K.) | Energy to Fail. (mJ) | Displacement to Failure (%) | Peak load (N) | Stiffness (N/m) |
|---|---|---|---|---|---|---|---|
| 32 | 0 | 0.26 | 0.044 | 4 | 2.8 | 4.8 | 2.5 |
| 33 | 2 | 0.25 | 0.048 | 5 | 2.8 | 5.0 | 2.6 |
| 34 | 5 | 0.24 | 0.048 | 4 | 2.8 | 4.8 | 2.5 |
| 35 | 10 | 0.23 | 0.048 | 7 | 4.4 | 4.2 | 1.5 |
| 36 | 20 | 0.24 | 0.046 | 4 | 3.4 | 4.0 | 1.8 |

The tests showed that Sunrez 747 had limited effect on the cup density. Initially, the density decreased about 2% for each percent of added Sunrez 747. This relationship persisted up to about 5% of the admixture, after which the cup density leveled off. The thermal conductivity showed an initial increase of approximately 4% for the first 2% of added Sunrez 747, but then leveled out. The mechanical properties of the cups also peaked early with the addition of Sunrez 747. The energy and displacement-to-failure of cups showed only minor increases up to 10% and then fell off slightly again. The peak load was fairly level with an apex at 2%. The stiffness curve approximates a step function. There was a plateau where there was no effect of Sunrez 747 addition up to 5%. There was a dramatic decrease in stiffness, roughly 50%, between 5 and 10%; thereafter the stiffness was not affected. In general, moderate improvements in the various properties were found where lower concentrations of Sunrez 747 were added.

Examples 37–44

Five mix designs were evaluated using varying concentrations of calcium carbonate (RO40), and different types of starch, in order to determine the minimum processing time and filing weight at four processing temperatures (160° C., 180° C., 200° C., and 220° C.). As used in the examples, specification, and appended claims, the term "processing time" refers to the time necessary to heat the mixture into a form-stable article. The compositions of the five mixtures were as follows:

| | Stalok 400 (g) | Hylon VII (g) | RO40 (g) | Mg Stearate (g) | Water (g) |
|---|---|---|---|---|---|
| Mixture 1 | 500 | 0 | 0 | 5 | 500 |
| Mixture 2 | 350 | 50 | 100 | 5 | 450 |
| Mixture 3 | 300 | 50 | 150 | 5 | 440 |
| Mixture 4 | 250 | 50 | 200 | 5 | 425 |
| Mixture 5 | 200 | 50 | 250 | 5 | 410 |

Hylon VII is a type of modified corn starch that was substituted for part of the Stalok 400. The moldable mixtures were prepared using the procedures set forth in Example 1–13. Once the mixtures were prepared, a HAAS LB-STA machine was used to make 16 oz. cups having thicknesses of about 4 mm and waffled exteriors. The resulting filling weights and processing times at the selected temperatures are summarized as follows:

| | | Processing Time (sec) | | | | |
|---|---|---|---|---|---|---|
| Example | Temp. (°C.) | Mixture 1 | Mixture 2 | Mixture 3 | Mixture 4 | Mixture 5 |
| 37 | 220 | 40 | 40 | 40 | 40 | 40 |
| 38 | 200 | 50 | 50 | 50 | 45 | 45 |
| 39 | 180 | 75 | 75 | 75 | 75 | 75 |
| 40 | 160 | 170 | 170 | 170 | 165 | 160 |

| | | Filling Weight (g) | | | | |
|---|---|---|---|---|---|---|
| Example | Temp. (°C.) | Mixture 1 | Mixture 2 | Mixture 3 | Mixture 4 | Mixture 5 |
| 41 | 220 | 30.5 | 32.2 | 34.4 | 37.9 | 41.6 |
| 42 | 200 | 33 | 31.5 | 35.6 | 39.3 | 43.9 |
| 43 | 180 | 31.4 | 33.5 | 35.5 | 37.6 | 44.1 |
| 44 | 160 | 31.7 | 33.7 | 34.1 | 39.7 | 43.9 |

As expected, the tests revealed that the processing times decreased as the processing temperatures increased. Although the decrease in processing time was greatest for increases in processing temperatures at the lower ranges, the decrease in processing time was most dramatic where calcium carbonate was included at the higher concentration ranges. The tests also revealed that the minimum filling weight increased with higher concentrations of calcium carbonate. However, the filling weight was independent of the mold temperature.

Examples 45–49

Using the same process as in Examples 1–13, 12 oz. cups were made using dies at a temperature of 200° C. The mixture for manufacturing the cups consisted of the following components by weight:

| | |
|---|---|
| 24.95% | Stalok 400 (modified potato starch) |
| 19.9% | RO40 calcium carbonate |
| 4.9% | Hylon VII (modified corn starch) |
| 49.75% | water |
| 0.5% | magnesium stearate. |

The dried cups were placed in a high humidity chamber having a relative humidity of about 95% and a temperature of about 45° C. The cups were removed after varying levels of moisture had been absorbed by the starch-bound structural matrix of the cups and tested to determine their mechanical properties. The respective moisture contents and corresponding mechanical properties are outlined below:

| BASE MIXTURE-10% Hylon-40% CaCO3 | | | |
|---|---|---|---|
| Example | Moisture Content | Peak Load (N) | Displacement to Failure (%) | Energy (mJ) |
| 45 | 0 | 5.5 | 2.9 | 5 |
| 46 | 2 | 8.5 | 3.7 | 12 |
| 47 | 5.5 | 10.5 | 11.8 | 45 |
| 48 | 7.5 | 9.0 | 23.5 | 65 |
| 49 | 9.5 | — | 24.3 | 40 |

The test results reveal a roughly linear correlation between the moisture content and the mechanical properties for low moisture contents. As the moisture content increased, the mechanical properties improved.

Examples 50–52

Using the same processing parameters set forth in Examples 1–13, 12 oz. cups were made from moldable mixtures having varying percentages of calcium carbonate and relatively constant viscosities to determine the effect of calcium carbonate on the required water content and time for removing the water. Summarized below are the compositions tested and the required times to produce a form-stable article having a finished surface.

| Example | Calcium Carbonate (g) | Starch-based binder (g) | Magnesium Stearate (g) | water (g) | Process Time (sec) |
|---|---|---|---|---|---|
| 50 | 250 | 250 | 10 | 425 | 50–55 |
| 51 | 350 | 150 | 10 | 350 | 35–40 |
| 52 | 400 | 100 | 10 | 285 | 30 |

The results show that with increased concentrations of calcium carbonate, less water was needed to obtain a mixture having a constant viscosity. Furthermore, as a result of having less water, the required processing time to produce a form-stable article was decreased.

Examples 53–59

Articles were made using different types of calcium carbonate to determine the effect of the particle size and packing density of the inorganic aggregate. Mixtures were made from three different types of calcium carbonate: Carbital 75, RO40, and Marblend. The basic chemical composition for each type of calcium carbonate was the same; however, the particle size distribution, average particle size, and natural packing density (or non compressed packing density), as shown below, varied greatly.

| Type of Calcium Carbonate | Average Particle Size (μm) | Natural Packing Density |
|---|---|---|
| Carbital 75 | 2.395 | 0.3593 |
| RO40 | 40.545 | 0.6869 |
| Marblend | 68.468 | 0.7368 |

The gradation for each type of calcium carbonate was as follows:

| Gradation of Carbital 75 | | |
|---|---|---|
| Sieve Opening (μm) | Retained % | Passing % |
| 18.000 | 0.00 | 100.00 |
| 5.470 | 10.00 | 90.00 |
| 3.043 | 25.00 | 75.00 |
| 1.583 | 50.00 | 50.00 |
| 0.862 | 75.00 | 25.00 |
| 0.490 | 90.00 | 10.00 |

| Gradation of RO40 | | |
|---|---|---|
| Sieve Opening (μm) | Retained % | Passing % |
| 275.000 | 0.00 | 100.00 |
| 134.700 | 10.00 | 90.00 |
| 82.150 | 25.00 | 75.00 |
| 41.308 | 50.00 | 50.00 |
| 14.190 | 75.00 | 25.00 |
| 2.782 | 90.00 | 10.00 |

| Gradation of Marblend | | |
|---|---|---|
| Sieve Opening (μm) | Retained % | Passing % |
| 1000.00 | 0.00 | 100.00 |
| 338.100 | 10.00 | 90.00 |
| 212.200 | 25.00 | 75.00 |
| 36.190 | 50.00 | 50.00 |
| 12.160 | 75.00 | 25.00 |
| 3.761 | 90.00 | 10.00 |

These tables show that, of the three types of calcium carbonate tested, Carbital 75 had by far the smallest average particle size and the smallest particle size distribution, Marblend had the largest, and RO40 was intermediate. Each mixture contained one type of calcium carbonate, Stalok 400 potato starch and water, while no mold releasing agent was used. The mixtures were prepared according to the procedures set forth in Examples 1–13 and then placed between molds having a temperature of about 200° C. The articles were removed from the molds once they had obtained form-stability. The molds were nickel-Teflon coated and had complementary shapes defined to produce a platter. The formed platters were approximately 25 cm long, 18 cm wide, and 3 mm thick. Outlined below are the components for each mixture, the weight of the final platter, and the processing time.

| Example | Calcium Carbonate (g) | Stalok 400 (g) | Water (g) | Platter weight (g) | Processing Time (sec) |
|---|---|---|---|---|---|
| Calcium Carbonate Carbital 75 | | | | | |
| 53 | 100 | 900 | 800 | 31.6 | 40 |
| 54 | 200 | 800 | 800 | 32.5 | 40 |
| 55 | 300 | 700 | 800 | NA | NA |
| Calcium Carbonate RO40 | | | | | |
| 56 | 700 | 300 | 800 | 30.2 | 40 |
| 57 | 800 | 200 | 800 | NA | NA |
| Calcium Carbonate Marblend | | | | | |
| 58 | 700 | 300 | 800 | 30.2 | 40 |
| 59 | 800 | 200 | 800 | NA | NA |

Examples 53 and 54 produced form-stable articles having negligible cracks or defects, although the plates of Example 53 were of somewhat higher quality than those of Example 54. In example 55, where the Carbital 75 was increased to 30% by weight of the total solids, crack-free, form-stable articles could not be made, regardless of the processing time. Examples 56 and 58 produced form-stable articles having negligible cracks or defects using 70% by weight of total solids RO40 and Marblend. The best articles were formed in Example 58. Crack-free, form-stable articles could not be made in Examples 57 and 59 where the concentration of RO40 and Marblend was increased to 80% by weight of the solids.

The above examples teach that functional articles can be made with higher concentrations of inorganic aggregate by using an aggregate material which (1) has a larger average diameter (which yields an aggregate material having a lower specific surface area), and (2) which has a greater particle size distribution (which yields an aggregate material having a higher particle packing density). The maximum amount of Carbital 75 that could be used to produce functional articles was 20% by weight of the solids. In comparison, functional articles could be made using 70% by weight of either RO40 or Marblend. The difference in the concentration of aggregate that could be used is attributed to the fact that RO40 and Marblend had a natural packing density approximately twice that of Carbital 75. The difference is further attributed to the fact that RO40 and Marblend had an average particle size that was approximately twenty to thirty times larger than Carbital 75.

To illustrate, Carbital 75 had a relatively low packing density of about 0.36. As the concentration of Carbital 75 increased and the concentration of starch-based binder decreased, respectively, the volume of interstitial space between the particles increased. As a result, more of the starch-based binder and water was being used to fill the interstitial space as opposed to coating the particles. Furthermore, since the Carbital 75 had a relatively small average particle size (and, hence, a larger specific surface area), more water and starch-based binder were needed to coat the aggregate particles. Eventually, when the concentration of Carbital 75 reached 30% by weight of the solids, the volume of interstitial space was so large that there was insufficient water to adequately disperse the starch-based binder and insufficient starch-based binder to adequately bind the aggregate particles into a form-stable, crack-free structural matrix.

In contrast, the Marblend had a much higher packing density of about 0.73 and a larger average particle size. Accordingly, even at the higher concentration of 70% Marblend by weight of solids, the interstitial space was sufficiently small to permit the starch-based binder and water to adequately bind the aggregate particles into a functional article. At 80% Marblend by weight of solids, however, the volume of interstitial space was again too large for the starch-based binder and water to adequately bind the aggregate particles into a form-stable, crack-free structural matrix. However, it would be expected that by using an aggregate having a packing density higher then that of Marblend, an article could be made having an even higher concentration of inorganic aggregates.

It is also noteworthy that the viscosity of the mixtures decreased as the concentration of Carbital 75 increased and that the viscosity of the mixtures increased with increased concentrations of RO40 and Marblend. As previously discussed, the starch-based binder absorbs the solvent. By replacing a portion of the starch-based binder with an inorganic aggregate, the amount of solvent that would have been absorbed by the starch-based binder is free to lubricate the aggregate particles. However, the inorganic aggregate replacing the starch-based binder also produces interstitial space which must be filled by the solvent. Accordingly, if the amount of solvent freed by the removal of the starch-based binder is smaller than the volume of interstitial space created by the addition of the aggregate, then the viscosity of the mixture increases. This process is illustrated by the use of Carbital 75. In contrast, if the amount of solvent freed by the removal of the starch-based binder is larger than the volume of interstitial space created by the addition of more aggregate, then the viscosity of the mixture decreases. This process is illustrated by the RO40 and Marblend.

Examples 60–64

In the following examples, each of the components was held constant except for the starch-based binder, which was gradually substituted with rice flour. Because rice flour includes a high percentage of starch, along with some protein, it would be expected to have a binding effect within the structural matrix. In addition, the inert fraction would be expected to act as an inert organic filler. All concentrations are expressed as a percentage by weight of the overall mixture.

| Example | Stalok 400 | Rice Flour | RO40 | Water | Magnesium Stearate |
| --- | --- | --- | --- | --- | --- |
| 60 | 24.8% | 0% | 24.8% | 49.5% | 0.5% |
| 61 | 19.8% | 5.0% | 24.8% | 49.5% | 0.5% |
| 62 | 14.9% | 9.9% | 24.8% | 49.5% | 0.5% |
| 63 | 9.9% | 14.9% | 24.8% | 49.5% | 0.5% |
| 64 | 5.0% | 19.8% | 24.8% | 49.5% | 0.5% |

The compositions of these examples resulted in molded articles in which the average cell diameter of the cells decreased as the percentage of the rice flour was increased and the amount of Stalok 400 (potato starch) was decreased. Hence, these examples show that the cell size can be regulated through the use of controlled mixtures of starch-based binder of different origin. This, in turn, results in articles having significantly different physical and mechanical properties. In this manner, rice flour (or similar grain flours or alternative starch sources) can be used in varying amounts in order to carefully control the physical and mechanical properties of the resulting articles manufactured therefrom. The following are the average cell diameters and skin thicknesses of the articles manufactured using the mix designs of these examples:

| Example | Average Cell Diameter | Wall Thickness | Skin Thickness |
| --- | --- | --- | --- |
| 60 | 670 μm | 2.2 mm | 300 μm |
| 61 | 450 μm | 2.4 mm | 370 μm |
| 62 | 370 μm | 2.5 mm | 330 μm |
| 63 | 300 μm | 2.3 mm | 350 μm |
| 64 | 300 μm | 2.1 mm | 200 μm |

Examples 65–68

Moldable mixtures containing varying amounts of polyvinyl alcohol ("PVA") were used to manufacture articles. It was found that the use of PVA decreased the processing time.

| Example | Starch-based binder (StaLok) | Calcium Carbonat | Mg Stearate | Water | Polyvinyl Alcohol | Process Time |
| --- | --- | --- | --- | --- | --- | --- |
| 65 | 500 g | 500 g | 20 g | 883 g | 1.7 g | 45–50 sec |
| 66 | 500 g | 500 g | 20 g | 917 g | 3.33 g | 40–45 sec |
| 67 | 500 g | 500 g | 20 g | 950 g | 5.0 g | 40–45 sec |
| 68 | 500 g | 500 g | 20 g | 983 g | 6.7 g | 35–40 sec |

Examples 69–71

Mixtures were prepared that contained the following components and concentrations in order to show the effect of solvent concentration on the density and insulation ability of the articles manufactured therefrom.

| Example | Potato Starch (g) | Calcium Carbonate RO40 (g) | Magnesium Stearate (g) | Water (g) |
|---|---|---|---|---|
| 69 | 500 | 500 | 10 | 100 |
| 70 | 500 | 500 | 10 | 200 |
| 71 | 500 | 500 | 10 | 300 |

The articles manufactured from the mixtures of these examples demonstrated that using less water resulted in a molded article having smaller cells, higher density, and lower insulation (higher thermal conductivity).

Example 72

A study was performed to determine the effect of varying the number of vent holes within the molding apparatus used to manufacture cups on the structure of the resulting molded cups. The moldable mixture of Example 1 was formed into cups using different molding apparatus in which the number of vent holes was varied so that there were 2, 4, 6, 8, or 10 vent holes of standard size, respectively. The density of the walls of the resulting cups increased as the number of vent holes increased, presumably because of the decrease in pressure that was able to build up, which led to a lower expansion of the cells within the structural matrix of the cup walls. Hence, using fewer vent holes results in a molded article having walls that are less dense and which having larger cells within the structural matrix.

Examples 73-80

Moldable mixtures are made which have a lightweight aggregate in order to yield a more lightweight article having greater insulation ability and lower density. The mixtures used to form such articles are set forth as follows:

| Example | Potato Starch (g) | Perlite (% by volume of mixture) | Magnesium Stearate (g) | Water (g) |
|---|---|---|---|---|
| 73 | 500 | 5 | 10 | 500 |
| 74 | 500 | 10 | 10 | 500 |
| 75 | 500 | 15 | 10 | 500 |
| 76 | 500 | 25 | 10 | 500 |
| 77 | 500 | 40 | 10 | 500 |
| 78 | 500 | 55 | 10 | 500 |
| 79 | 500 | 65 | 10 | 500 |
| 80 | 500 | 85 | 10 | 500 |

The mixtures are formed into cups using the systems and methods set forth above. As the amount of perlite is increased, the resulting cup has a lower density, thermal conductivity, increased stiffness, and increased brittleness. The cups having the optimal balance of the foregoing properties are obtained by using a moldable mixture in which the concentration of perlite ranges from between about 25% to about 55% perlite by volume of the moldable mixture. However, using more or less than these amounts may be desired for certain articles.

In the following group of examples, longer-length fibers were dispersed within the moldable mixtures by first preparing a preblended mixture of high viscosity. The result of adding fibers dramatically increased the fracture energy, toughness, and flexibility of the newly demolded articles compared to the articles that were prepared without the use of fibers. In addition, the articles did not require further conditioning but retained adequate flexibility due to the remainder of adequate moisture within the starch-bound cellular matrix, as well as because of the strengthening effect of the fibers dispersed throughout the cellular matrix.

Example 81

A moldable mixture for use in forming foamed articles was prepared having the following ingredients in the respective amounts:

| | |
|---|---|
| Potato Starch | 500 grams |
| Calcium Carbonate (RO40) | 500 grams |
| Softwood Fibers | 100 grams |
| Magnesium Stearate | 10 grams |
| Water | 1300 grams |

The moldable mixture was prepared by mixing 100 g of the potato starch with all of the fibers and 800 g of water to form a preblended mixture. This preblended mixture was then put into a microwave oven and heated up above the gelation point of 65° C. so that the starch would gelate and create a liquid with fibers suspended therein with a much higher viscosity. The preblended mixture was then mixed at high shear for 10 minutes resulting is a complete dispersion of the fibers. The calcium carbonate, and the remaining amount of starch and water were then added to the preblended mixture and mixed to form the moldable mixture.

Examples 82-96

Clam shell containers were formed from different moldable mixtures having five different types of starches and varying water content. Each of the moldable mixtures of these examples had the following basic mix design:

| | |
|---|---|
| Starch | 500 g |
| Calcium Carbonate (RO40) | 500 g |
| Softwood fiber (C33) | 100 g |
| Water | 900, 1100, 1300 g |
| Magnesium Stearate | 20 g |

The following starch samples that were utilized in the various moldable mixtures of these example included Western Polymer (potato starch), Collamyl 910050, Waxy Corn 7351, Staley Pearl Starch, and Sta Lok 400 (modified potato starch ). The water content of the moldable mixtures varied at levels of 900, 1100, and 1300 g per 500 g of starch used. The softwood fibers were included at a level of 10% by weight of the combined starch and calcium carbonate. A stock fibrous sheet comprising individual softwood fibers was broken into small fragments before being added to the mixture. Colored water was made by adding 2.55 g Egg Yellow, 0.52 g Blue, and 0.34 g Double Strength Red, all colors of Iris brand, to 100 g of the water used in each mixture.

Each of the moldable mixtures of these examples were prepared by the following procedure. The total 100 g amount of chopped fiber pieces was soaked in 800 g of the water for about 30 minutes. The soaked fibers and water were then placed in a mixing bowl of either a Hobart or Kitchen Aid mixer and mixed at slow to medium speed for about 4 minutes to form an initial mixture. The mixing action broke the fibrous sheet fragments into small nodules. A weighed quantity of 100 g of starch was then added to the initial mixture and the mixing was continued at medium speed for 1 minute to form a preblended mixture. The mixer was stopped and the preblended mixture was placed in a plastic beaker and subjected to microwave energy in a standard kitchen microwave oven for 10 minutes at high power in order to gelate the starch. The hot, thickened preblended mixture was removed from the microwave oven and was shear mixed at slow, medium and high speeds for a total of 15 minutes to disperse the fiber therein. Thereafter, 500 g of calcium carbonate, 400 g of starch, and 20 g of magnesium stearate were added to the preblended mixture, which was mixed at slow to medium speed with additional water for about 5 minutes so that a final, homogeneous, moldable mixture was obtained. The additional water included 100 g of colored water and the remaining water as required in the batch.

The moldable mixtures of these examples were then placed between male and female molds designed to produce clam shell containers. The baking time was 75 seconds and the baking temperature of the female molds was 180° C. and of the male molds was 190° C. The molded clam shell containers were thereafter removed from the molds.

Summarized below is a list of the selected starches used with the varying amounts of water in Examples 82–96, as well as the resulting properties of the clam shell containers formed from each of the moldable mixtures.

decrease in gross weight. Additional properties of the formed clam shells were also tested, including strength, fracture energy, and strain, which are listed below.

| Example | Strength (MPa) | Fracture Energy (J/m$^2$) | Strain (%) |
|---|---|---|---|
| 82 | 6.2 | 740 | 2 |
| 83 | 5.5 | 780 | 1.8 |
| 84 | 4.5 | 650 | 1.7 |
| 85 | 5.5 | 600 | 1.7 |
| 86 | 4.3 | 620 | 1.6 |
| 87 | 2.5 | 430 | 1.5 |
| 88 | 3.8 | 500 | 1.7 |
| 89 | 3 | 350 | 1.65 |
| 90 | 2.5 | 200 | 1.65 |
| 91 | 11 | 680 | 1.85 |
| 92 | 7 | 550 | 1.6 |
| 93 | 6 | 480 | 1.55 |
| 94 | 5.2 | 570 | 2.1 |
| 95 | 4.8 | 350 | 1.45 |
| 96 | 4.5 | 270 | 1.3 |

As shown above, as the water content went up and the specific gravity or density went down the strength decreased from about 11MPa to about 2.5 MPa, the fracture energy

| Example | Starch | Water Content (g) | K. (W/m °K.) | Thickness (mm) | Cond. Wt. (g) | Moisture (Wt %) | Spec. Grav. (g/cm$^3$) | Shell Wt. (g) |
|---|---|---|---|---|---|---|---|---|
| 82 | Western Polymer | 900 | 0.065 | 1.643 | 4.360 | 4.808 | 0.358 | 31.44 |
| 83 | Western Polymer | 1100 | 0.057 | 1.660 | 3.218 | 3.573 | 0.303 | 24.66 |
| 84 | Western Polymer | 1300 | 0.063 | 1.635 | 3.057 | 8.906 | 0.243 | 20.47 |
| 85 | Collamyl | 900 | 0.064 | 1.643 | 3.585 | 4.549 | 0.310 | 27.37 |
| 86 | Collamyl | 1100 | 0.054 | 1.593 | 2.904 | 4.536 | 0.251 | 21.47 |
| 87 | Collamyl | 1300 | 0.052 | 1.403 | 2.414 | 4.683 | 0.237 | 16.03 |
| 88 | Waxy Corn | 900 | 0.058 | 1.618 | 3.342 | 4.340 | 0.296 | 24.59 |
| 89 | Waxy Corn | 1100 | 0.053 | 1.220 | 2.158 | 4.302 | 0.246 | 15.61 |
| 90 | Waxy Corn | 1300 | 0.057 | 1.543 | 2.463 | 4.188 | 0.229 | 17.77 |
| 91 | Staley Pearl Starch | 900 | 0.066 | 1.663 | 5.438 | 4.077 | 0.458 | 34.82 |
| 92 | Staley Pearl Starch | 1100 | 0.059 | 1.672 | 3.106 | 4.054 | 0.289 | 27.32 |
| 93 | Staley Pearl Starch | 1300 | 0.061 | 1.671 | 3.106 | 7.251 | 0.282 | 22.56 |
| 94 | Sta Lok 400 | 900 | 0.065 | 1.317 | 3.847 | 5.196 | 0.409 | 28.55 |
| 95 | Sta Lok 400 | 1100 | 0.063 | 1.311 | 3.317 | 4.670 | 0.350 | 22.83 |
| 96 | Sta Lok 400 | 1300 | 0.061 | 1.640 | 2.631 | 4.988 | 0.219 | 18.90 |

The properties analyzed for these examples included thermal properties and mechanical properties. The thermal properties included thermal conductivity (K). Three measurements were recorded for the thermal conductivity of the walls of the clam shells and the average K value was reported. Other properties measured included the thickness of the formed clam shell walls, the moisture content, the specific gravity, and the clam shell weight.

As shown above, an increasing amount of water in the moldable mixture resulted in the specific gravity or density of the formed clam shell decreasing with an accompanying decreased from about 780 J/m$^2$ to about 200 J/m$^2$, and the strain decreased from about 2.1% to about 1.3%.

Examples 97–135

Clam shell containers were formed from different moldable mixtures having two different types of starches, including Sta Lok 400 potato starch and waxy corn starch, with a varying fiber and water content. Each of the moldable mixtures of these examples was prepared according to the procedure described above for Examples 82–96, and were then molded to form clam shell containers.

Summarized below is a list of the fiber amounts of 5, 10, 15, and 20 weight % fiber with varying amounts of water from 800 g to 1500 g used in Examples 97–135, along with the final weight of the clamshell.

| Example | Fiber Content Wt-% | Water Content (g) |
|---|---|---|
| 97 | 20 | 900 |
| 98 | 20 | 1000 |
| 99 | 20 | 1100 |
| 100 | 20 | 1200 |
| 101 | 20 | 1300 |
| 102 | 20 | 1400 |
| 103 | 20 | 1500 |
| 104 | 5 | 800 |
| 105 | 5 | 900 |
| 106 | 5 | 1000 |
| 107 | 5 | 1100 |
| 108 | 5 | 1200 |
| 109 | 5 | 1300 |
| 110 | 5 | 1400 |
| 111 | 5 | 1500 |
| 112 | 15 | 800 |
| 113 | 15 | 900 |
| 114 | 15 | 1000 |
| 115 | 15 | 1100 |
| 116 | 15 | 1200 |
| 117 | 15 | 1300 |
| 118 | 15 | 1400 |
| 119 | 15 | 1500 |
| 120 | 10 | 800 |
| 121 | 10 | 900 |
| 122 | 10 | 1000 |
| 123 | 10 | 1100 |
| 124 | 10 | 1200 |
| 125 | 10 | 1300 |
| 126 | 10 | 1400 |
| 127 | 10 | 1500 |
| 128 | 10 | 800 |
| 129 | 10 | 900 |
| 130 | 10 | 1000 |
| 131 | 10 | 1100 |
| 132 | 10 | 1200 |
| 133 | 10 | 1300 |
| 134 | 10 | 1400 |
| 135 | 10 | 150 |

There was a steady decrease in the weight of the product as the water content was increased. The weight of the product also decreased as the fiber content was lowered.

Example 136

Preblended mixtures were prepared having two sample concentrations in order to determine the effect of starch concentration on the viscosity and yield stress of the resulting preblended mixtures:

1. 100 g of Western Polymer potato starch in 800 g of water;

2. 50 g of above starch in 800 g of water.

These mixtures were then microwaved for 10 minutes with frequent stirring. The stirring was needed to avoid settling of the starch. A very homogeneous starch gel was obtained in this manner.

On each sample, a single point measurement was made at a shear rate of 5 $s^{-1}$. Sample 1 had a viscosity of 12.5 Pa·s and Sample 2 had a viscosity of 75 Pa·s. The measurements were made on a Paar Physica MC-20 Rheometer with a cone/plate configuration. The angle of the cone was 1° with a 0.05 mm truncation. The diameter of the plate was 50 mm. The single point measurements were double checked with a 12.5 mm parallel plate.

Figure 20:
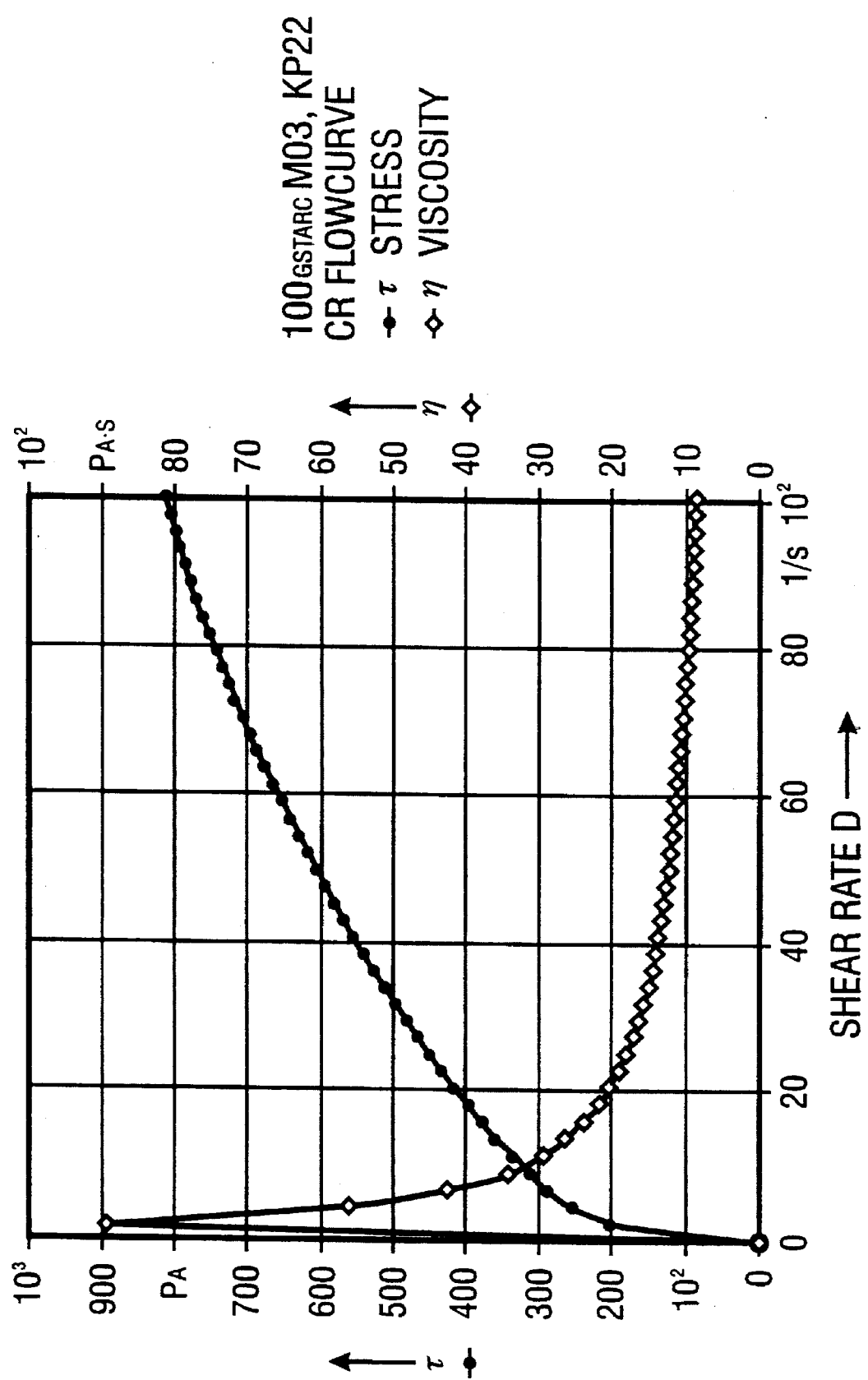
FIG. 20 shows a graph illustrating the yield stress and viscosity of a mixture containing 50 g gelated starch and 800 g water.
Figure 21:
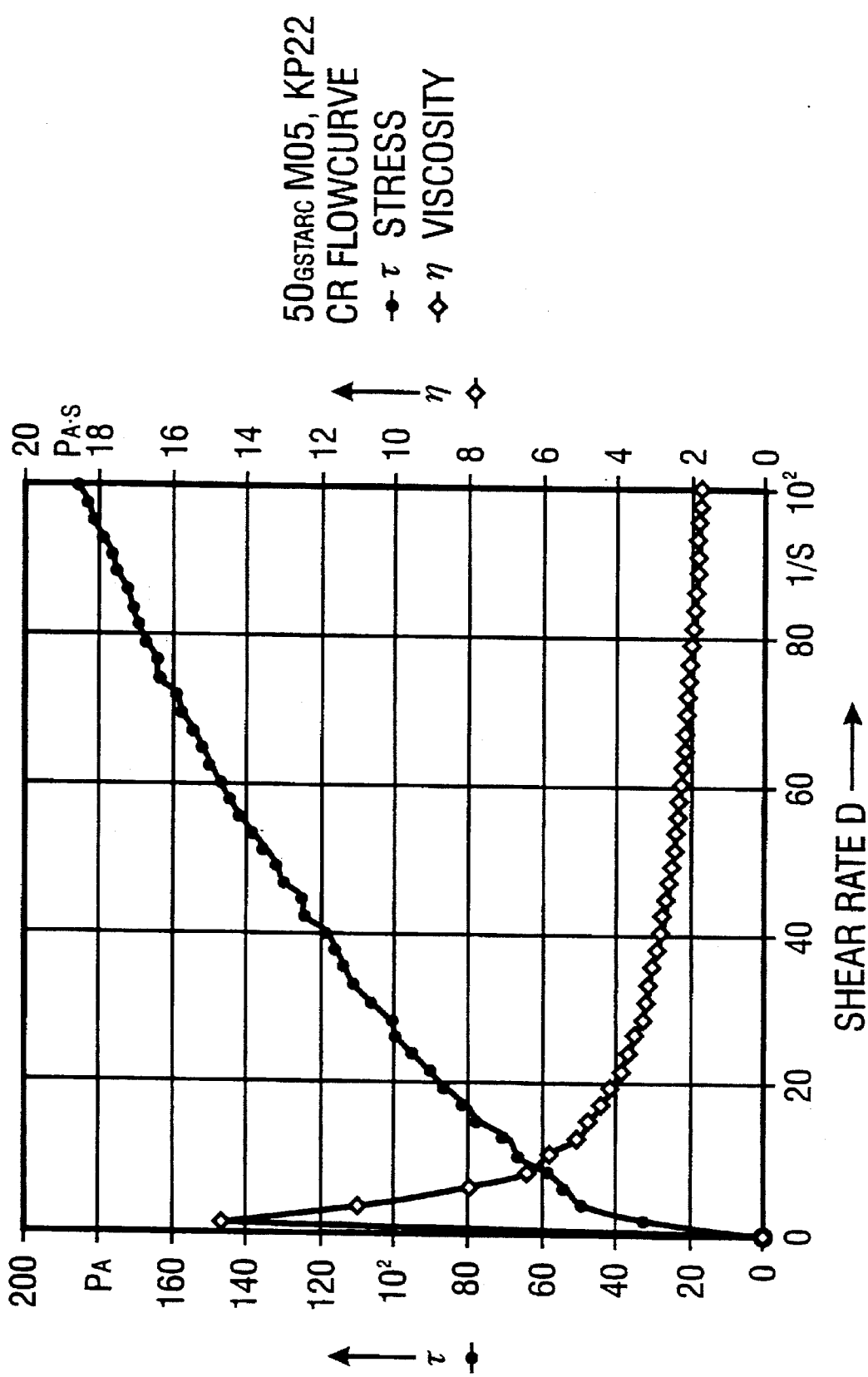
FIG. 21 shows a graph illustrating the yield stress and viscosity of a mixture containing 100 g gelated starch and 800 g water.
Figure 22:
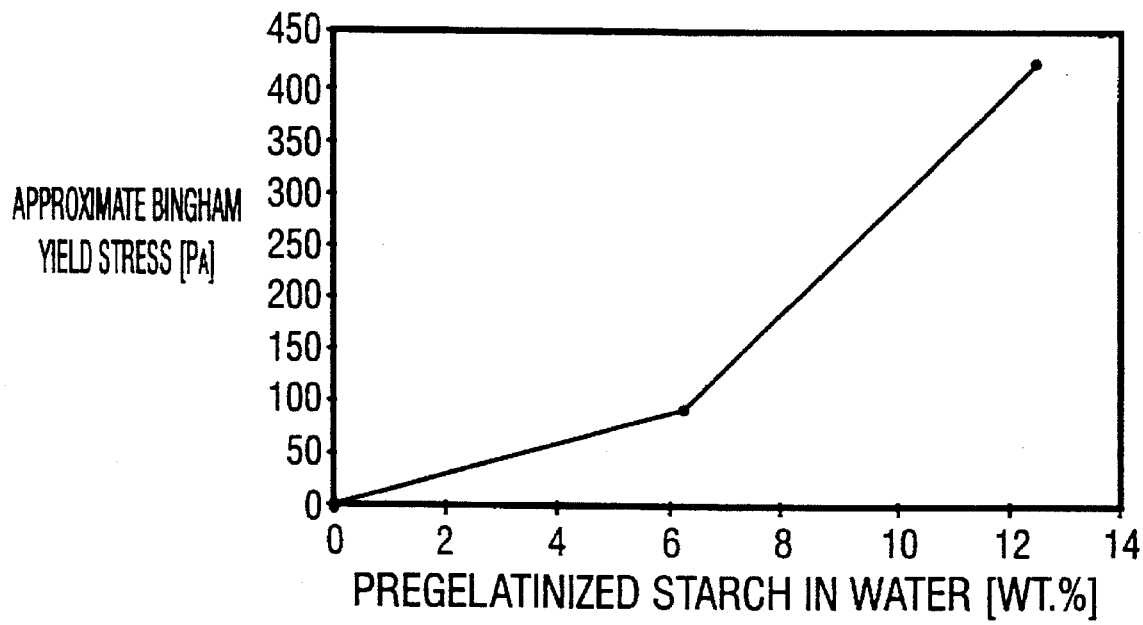
FIG. 22 shows a graph illustrating the effect of including varying amounts of pregelatinized starch on yield stress.
Figure 23:
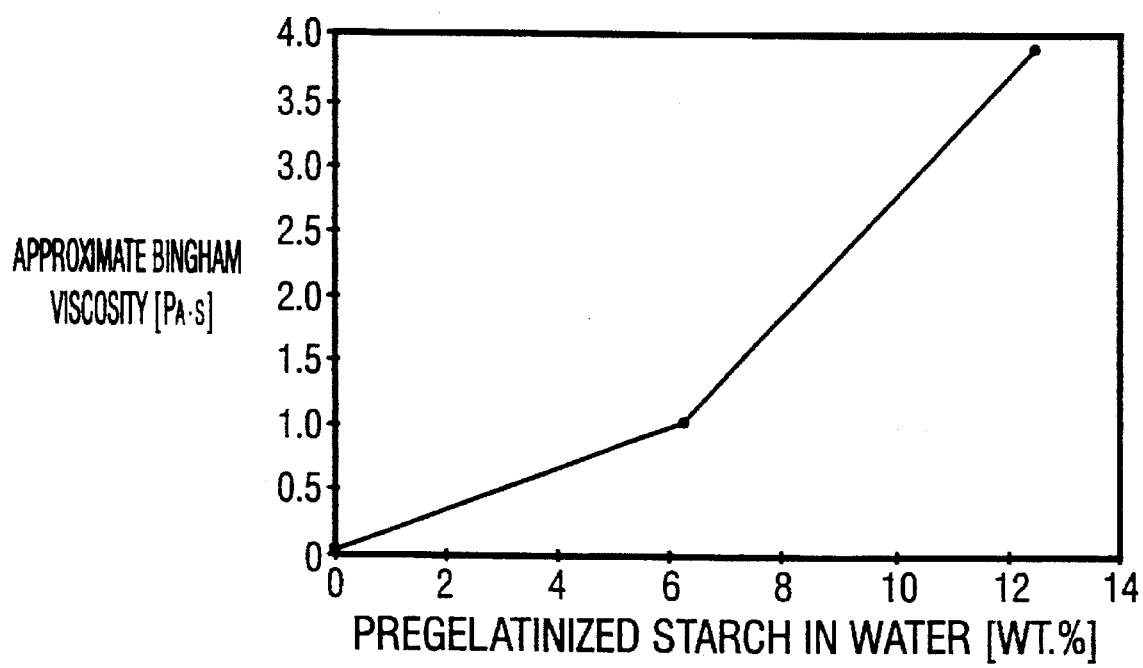
FIG. 23 shows a graph illustrating the effect of including varying mounts of pregelatinized starch on viscosity.

A flow curve was then generated with a shear rate range of 0–100 $s^{-1}$. The measurement included an up-curve over 180 s followed by a down-curve over 60 s. The down-curve was run to indicate if there was any permanent effect of shear on the viscosity of the gel. FIGS. 20 and 21 show graphs of the flow curves for each of Samples 1 and 2. At both concentrations of Samples 1 and 2, it was found that the down-curve deviated from the up-curve on the first measurement, by a small amount. When a second measurement was made on the same sample of material, this difference disappeared, indicating a steady state in viscosity. As shown in FIG. 20 for Sample 1, when the shear rate went up the viscosity went down to a steady state of about 9 Pa·s. As shown in FIG. 21 for Sample 2, when the shear rate went up the viscosity went down to a steady state of about 1.9 Pa·s. FIGS. 22 and 23 show the effect of pregelatinized starch on the yield stress and viscosity of a liquid system. The pregelatinized starch increases both the yield stress and the viscosity dramatically at about 6 weight % and higher.

Examples 137–146

Clam shell containers were formed from different moldable mixtures having two different types of starches and a varying water content. Each of the moldable mixtures of these examples was prepared according to the procedure described above for Examples 82–96, and were then molded to form clam shell containers.

Summarized below is a list of the selected starches used with the varying amounts of water, as well as the resulting properties of the clam shells formed from each of the moldable mixtures.

| Example | Starch | Water Cont. (g) | Av. Density g/cm$^3$ | Av. weight (g) |
|---|---|---|---|---|
| 137 | Western Polymer | 900 | 0.338857 | 31.476 |
| 138 | Western Polymer | 1100 | 0.273672 | 23.545 |
| 139 | Western Polymer | 1300 | 0.213098 | 17.82429 |
| 140 | Western Polymer | 1500 | 0.20624 | 14.75167 |
| 141 | Western Polymer | 1700 | 0.156326 | 11.905 |
| 142 | Staley Pearl | 900 | 0.383888 | 30.96333 |
| 143 | Staley Pearl | 1100 | 0.343341 | 26.93333 |
| 144 | Staley Pearl | 1300 | 0.218775 | 17.86333 |
| 145 | Staley Pearl | 1500 | 0.189838 | 15.20333 |
| 146 | Staley Pearl | 1700 | 0.231291 | 15.40167 |

As shown above, when the water content in the moldable mixture increased, average density and weight of the final product decreased.

Example 147

A viscosity measurement was conducted on a moldable mixture of the invention on a Paar-Physica instrument. A parallel plate configuration was used with a gap setting of 1 min. This unusually large gap setting was used since the material was very inhomogeneous, and a large sample was needed for a representative number. It was determined that the measurements had to be made quickly and at relatively low shear rates to avoid segregation and fiber alignment. The viscosity was found to be 446 Pa·s (or 446,000 cps) at 5 $s^{-1}$. This number was an average of three single point measurements that varied between 419 and 472 Pa·s.

Figure 24:
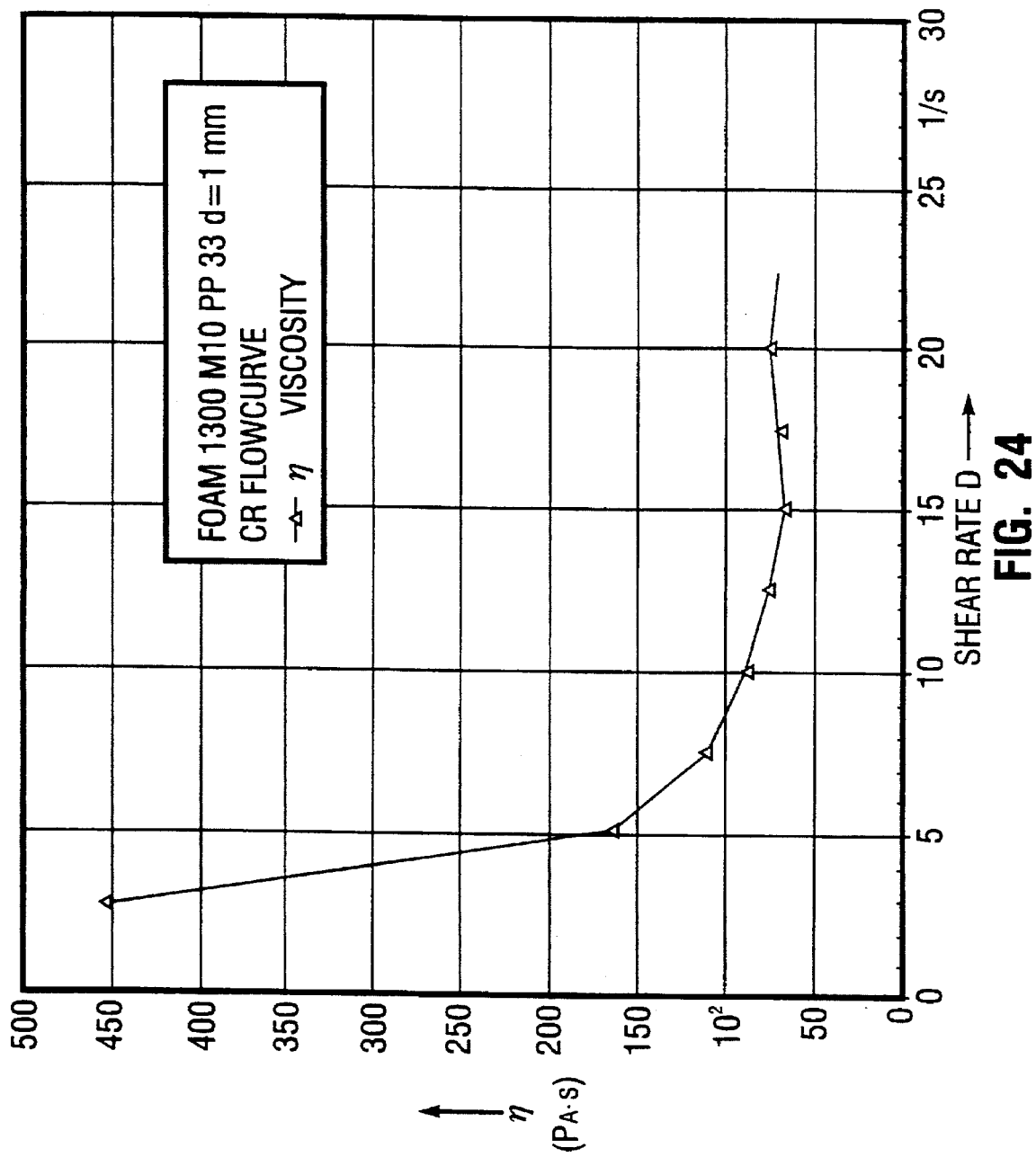
FIG. 24 shows a graph illustrating the effect of shear rate on viscosity for a preblended mixture containing 50 g starch and 800 g water.
Figure 25:
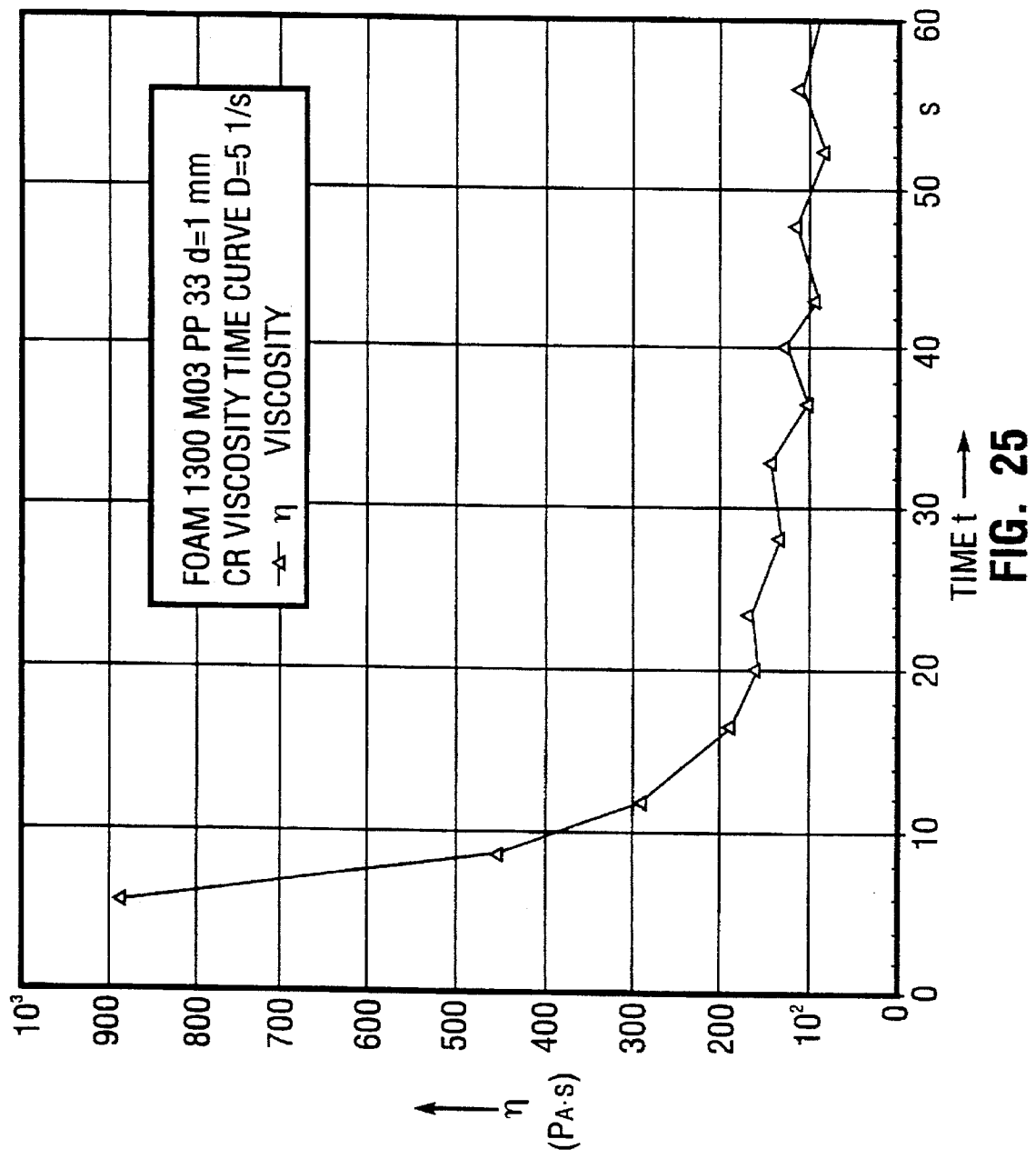
FIG. 25 shows a graph illustrating the effect of shear rate on viscosity for a preblended mixture containing 100 g starch and 800 g water.

FIGS. 24 and 25 show flow curves for a composition of the present invention. FIG. 24 shows a drop in viscosity with increasing shear rates, and FIG. 25 shows a drop in viscosity with time. This is most likely due to the alignment of fibers in the direction of shear.

Figure 26:
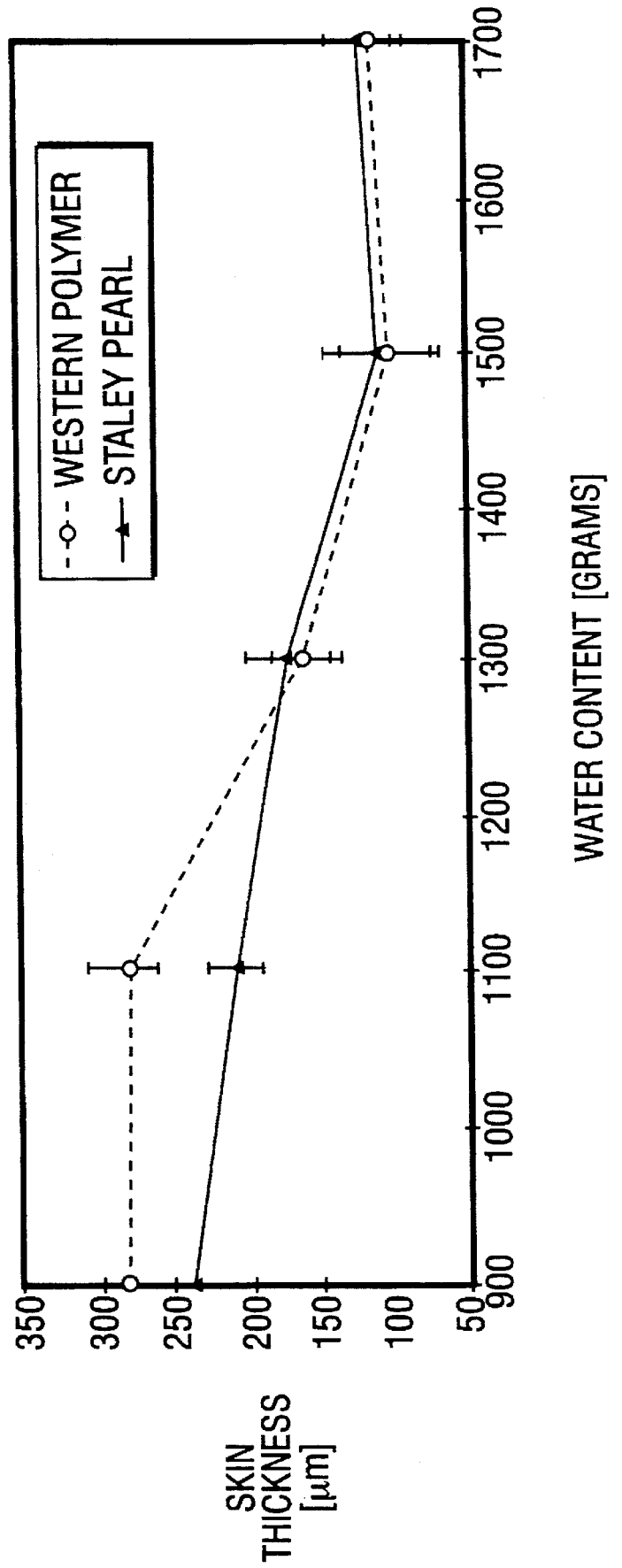
FIG. 26 shows a graph illustrating the effect of water content in a moldable mixture on the skin thickness of a final product.
Figure 27:
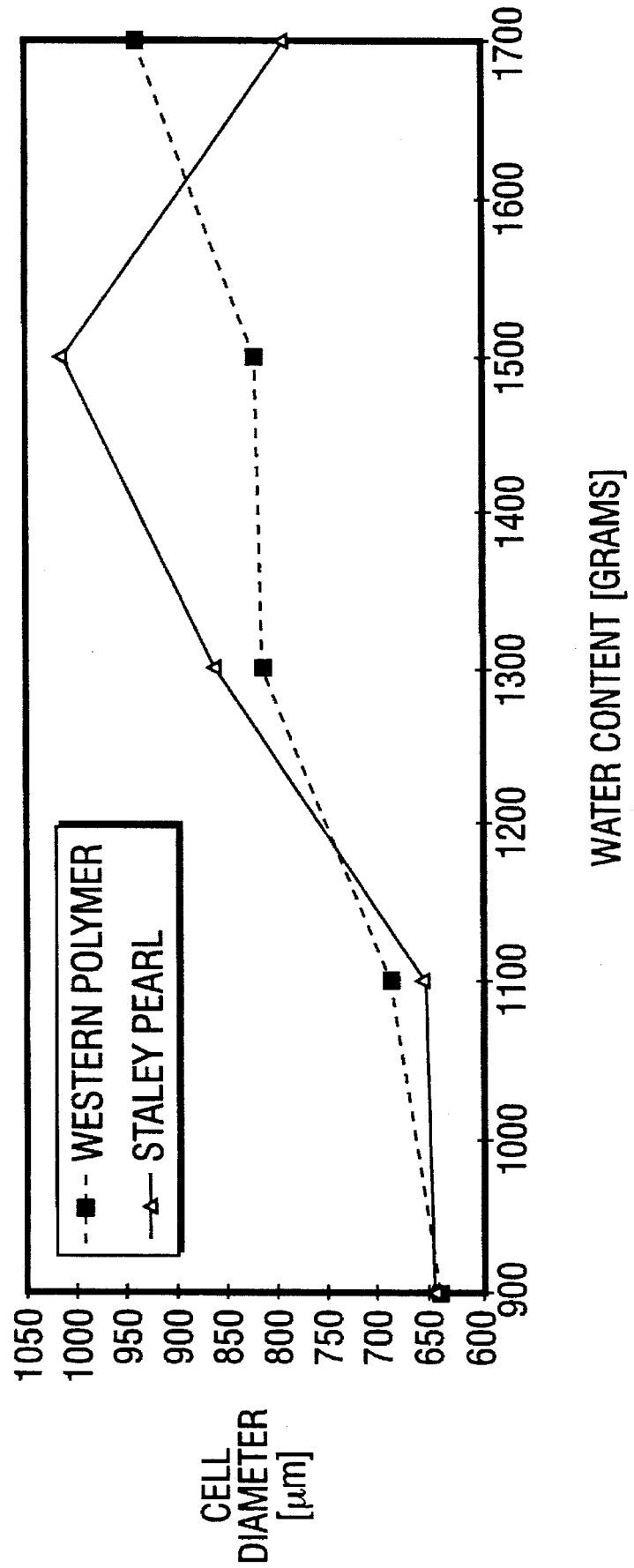
FIG. 27 shows a graph illustrating the effect of water content in a moldable mixture on the cell diameter of a foamed product.

FIG. 26 is a graph of the skin thickness as a function of water content for a formed product of the invention, showing that as the water content increased in the moldable mixture, the skin thickness decreased in the final product. FIG. 27 is a graph of the average internal cell diameter as a function of water content for a formed product of the invention, showing that as the water content increased the cell diameter also increased.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A starch-based composition for molding into an article having a starch-bound cellular matrix, the starch-based composition comprising water, a starch-based binder in a concentration greater than about 20% by weight of the starch-based composition, and a fibrous material having an average fiber length greater than about 2 mm and an aspect ratio greater than about 10:1, wherein the fibers are substantially homogeneously dispersed throughout the starch-based composition, wherein the starch-based binder includes a substantially ungelatinized component comprising unmodified starch granules in an amount in a range from about 50% to about 90% by weight of the starch-based binder and a substantially gelatinized component comprising gelatinized starch in an amount in a range from about 10% to about 50% by weight of the starch-based binder prior to molding the composition into the article.

2. A composition as defined in claim 1, wherein the starch-based binder includes a potato starch or a waxy corn starch.

3. A composition as defined in claim 1, wherein the starch-based binder includes a plurality of different kinds of starches.

4. A composition as defined in claim 1, wherein the starch-based binder is included in an mount in a range from about 20% to about 80% by weight of total solids.

5. A composition as defined in claim 1, wherein the starch-based binder is included in an amount in a range from about 40% to about 60% by weight of the total solids.

6. A composition as defined in claim 1, wherein the fibrous material is selected from the group consisting of natural cellulose fibers, glass fibers, synthetic polymer fibers, and mixtures thereof.

7. A composition as defined in claim 1, wherein the fibers have an average diameter in a range from about 10 μm to about 50 μm.

8. A composition as defined in claim 1, wherein the fibrous material is included in an amount in a range from about 1% to about 20% by weight of total solids.

9. A composition as defined in claim 1, further including an inorganic aggregate selected from the group consisting of calcium carbonate, perlite, zeolites, vermiculite, sandstone, glass beads, aerogel, mica, clay, kaolin, gravel, exfoliated rock, derivatives thereof, and mixtures thereof.

10. A composition as defined in claim 9, wherein the inorganic aggregate is included in an mount in a range from about 20% to about 80% by weight of the starch-based composition.

11. A composition as defined in claim 9, wherein the inorganic aggregate includes individual particles having a plurality of different sizes.

12. A composition as defined in claim 11, wherein the sizes of the individual particles are selected to maximize the natural packing density of the inorganic aggregate within the starch-based composition.

13. A composition as defined in claim 12, wherein the sizes of the individual particles are selected so that the natural packing density of the inorganic aggregate is in a range from about 0.5 to about 0.9.

14. A composition as defined in claim 9, wherein the inorganic aggregate has a specific surface area in a range from about 0.1 $m^2/g$ to about 50 $m^2/g$.

15. A composition as defined in claim 9, wherein the inorganic aggregate has a specific surface area in a range from about 0.2 $m^2/g$ to about 2 $m^2/g$.

16. A composition as defined in claim 9, wherein the inorganic aggregate is included in an amount sufficient to yield an article having a specific heat in a range from about 0.1 J/g·K to about 400 J/g·K at 20° C.

17. A composition as defined in claim 1, wherein the water has a concentration in a range from about 15% to about 80% by weight.

18. A composition as defined in claim 1, having a viscosity greater than about 10 Pa·s measured at a shear rate of $1\ s^{-1}$.

19. A composition as defined in claim 1, having a viscosity in a range from about 50 to about 100 Pa·s measured at a shear rate of $1\ s^{-1}$.

20. A composition as defined in claim 1, having a viscosity in a range from about 200 to about 500 Pa·s measured at a shear rate of $1\ s^{-1}$.

21. A composition as defined in claim 1, wherein the average fiber length is greater than about 4 mm.

22. A composition as defined in claim 1, wherein the average fiber length is greater than about 8 mm.

23. An inorganically filled starch-based composition for molding into an article, the composition comprising:
 (a) a starch-based binder in a concentration greater than about 20% by weight of the starch-based composition, the starch-based binder including a substantially ungelatinized component comprising unmodified starch granules in an amount in a range from about 50% to about 90% by weight of the starch-based binder and a substantially gelatinized component comprising gelatinized starch in an amount in a range from about 10% to about 50% by weight of the starch-based binder prior to molding the composition into the article:
 (b) fibers in a concentration greater than about 1% by weight of the starch-based composition and having an average fiber length greater than about 2 mm and an aspect ratio greater than about 10:1, wherein the fibers are substantially homogeneously dispersed throughout the starch-based composition; and
 (c) an inorganic aggregate in a concentration greater than about 5% by weight of the starch-based composition.

24. An inorganically filled starch-based composition as defined in claim 23, wherein the fibers have a concentration greater than about 5% by weight of the starch-based composition.

25. An inorganically filled starch-based composition as defined in claim 23, wherein the fibers have a concentration greater than about 10% by weight of the starch-based composition.

26. An inorganically filled starch-based composition as defined in claim 23, wherein the average fiber length is greater than about 4 mm.

27. An inorganically filled starch-based composition as defined in claim 23, wherein the average fiber length is greater than about 8 mm.

28. An inorganically filled starch-based composition as defined in claim 23, wherein the inorganic aggregate is included in an amount greater than about 15% by weight of the starch-based composition.

29. An inorganically filled starch-based composition as defined in claim 23, wherein the inorganic aggregate is included in an amount greater than about 30% by weight of the starch-based composition.

30. A starch-based composition for forming an article of manufacture having a foamed structural matrix, the composition comprising:
  (a) a starch-based binder having a concentration of about 20% to about 80% by weight of solids within the starch-based composition;
  (b) an inorganic aggregate having a concentration of about 0% to about 80% by weight of solids within the starch-based composition;
  (c) a fibrous material having a concentration of about 2% to about 50% by weight of solids within the starch-based composition, said fibrous material having an average fiber length greater than about 2 mm and being substantially uniformly dispersed throughout the starch-based composition; and
  (d) water having a concentration of about 15% to about 80% by weight of the starch-based composition;

wherein the starch-based binder includes a gelatinized component comprising gelatinized starch in an amount from about 5% to about 70% by weight of the starch-based binder, and wherein the balance of the starch-based binder comprises an ungelatinized component comprising ungelatinized, unmodified starch granules prior to forming the composition into an article, wherein said gelatinized component aids in the dispersion of the fibrous material throughout the starch-based composition during mixing.

31. A starch-based moldable mixture for forming an article of manufacture, the moldable mixture comprising water, a starch-based binder in a concentration greater than about 20% by weight, and a fibrous material having an average fiber length greater than about 2 mm, and an aspect ratio of at least about 10:1, wherein the moldable mixture has a viscosity greater than about 10 Pa·s, wherein the starch-based binder includes a gelatinized component comprising gelatinized starch in an amount from about 5% to about 70% by weight of the starch-based binder, and wherein the balance of the starch-based binder comprises an ungelatinized component comprising ungelatinized, unmodified starch granules prior to forming the composition into an article, wherein said gelatinized component aids in the dispersion of the fibrous material throughout the starch-based composition during mixing.

* * * * *